United States Patent [19]
Izaki et al.

[11] Patent Number: 6,018,154
[45] Date of Patent: Jan. 25, 2000

[54] HIGH-FREQUENCY INVERTER AND INDUCTION COOKING DEVICE USING THE SAME

[75] Inventors: Kiyoshi Izaki, Kadoma; Hideki Omori, Akashi; Hidekazu Yamashita, Hashimoto; Taizo Ogata, Minoo; Takeshi Kitaizumi, Osaka, all of Japan; Kamli Mokhtar, Wilaya D'ech-chelife, Algeria

[73] Assignee: Matsushita Electric Industrial Co., Ltd., Osaka, Japan

[21] Appl. No.: 09/142,556

[22] PCT Filed: Mar. 13, 1997

[86] PCT No.: PCT/JP97/00792

§ 371 Date: Sep. 11, 1998

§ 102(e) Date: Sep. 11, 1998

[87] PCT Pub. No.: WO97/34446

PCT Pub. Date: Sep. 18, 1997

[30] Foreign Application Priority Data

| Mar. 13, 1996 | [JP] | Japan | 8-055726 |
| Mar. 13, 1996 | [JP] | Japan | 8-055727 |
| Nov. 20, 1996 | [JP] | Japan | 8-308965 |
| Nov. 22, 1996 | [JP] | Japan | 8-311655 |
| Nov. 29, 1996 | [JP] | Japan | 8-319109 |

[51] Int. Cl.$^7$ .............. H05B 6/08; H05B 6/12; H02M 7/48
[52] U.S. Cl. .......... 219/625; 219/626; 219/663; 219/661; 219/665; 363/49; 363/97
[58] Field of Search .................. 219/625, 626, 219/661, 663, 664, 665; 363/49, 21, 97, 98

[56] References Cited

U.S. PATENT DOCUMENTS

| 4,764,652 | 8/1988 | Lee | 219/626 |
| 5,248,866 | 9/1993 | Tanaka | 219/663 |
| 5,354,971 | 10/1994 | Chen | 219/661 |
| 5,571,438 | 11/1996 | Izaki et al. | 219/625 |
| 5,622,643 | 4/1997 | Morizot | 219/625 |

FOREIGN PATENT DOCUMENTS

| 59-187091 | 12/1984 | Japan . |
| 63-2387 | 1/1988 | Japan . |
| 6-76933 | 3/1994 | Japan . |
| 7-254482 | 10/1995 | Japan . |

Primary Examiner—Philip H. Leung
Attorney, Agent, or Firm—Wenderoth, Lind & Ponack, L.L.P.

[57] ABSTRACT

A high-frequency inverter having a simple circuit construction capable of executing a constant-frequency operation and a zero-volt switching operation and an induction heating cooker using the high-frequency inverter are disclosed. The high-frequency inverter is comprised of an inverter circuit for converting a direct current from a DC power source into a high-frequency current and a control circuit for controlling the inverter circuit. The inverter circuit is comprised of: a one-transistor inverter constructed of a heating coil whose one terminal is connected to one terminal of a DC power source, a first switching element connected in series between the other terminal of the heating coil and the other terminal of the DC power source, and a first resonance capacitor connected so as to form a resonance circuit with the heating coil; and a series circuit connected in parallel with the heating coil and constructed of a second switching element and a second resonance capacitor.

96 Claims, 46 Drawing Sheets

| SET VALUE | VOUT2 (V) |
|---|---|
| 5 | 4.0 |
| 4 | 2.4 |
| 3 | 1.6 |
| 2 | 1.0 |
| 1 | 0.6 |

AT RATED CONSUMPTION POWER

HIGH-FREQUENCY INVERTER AND INDUCTION COOKING DEVICE USING THE SAME

FIELD OF THE INVENTION

The present invention relates to a high-frequency inverter which operates at a constant frequency effective for a multi-burner induction heating cooker having a plurality of burners and the like and an induction heating cooker using the high-frequency inverter.

BACKGROUND OF THE INVENTION

In a prior art high-frequency inverter, the operating frequency has varied according to a type of the load (pan) to be heated or a change in an input power. When such a high-frequency inverter is applied to a multi-burner induction heating cooker having a plurality of heating burners, there has been the problem that a pan interference noise is generated due to a frequency difference among the burners. As a high-frequency inverter for solving this problem, there is one disclosed in U.S. Pat. No. 5,571,438 as shown in FIG. 71. In this figure, the high-frequency inverter is comprised of a DC power source 101, an inverter circuit 102 for converting a direct current from the DC power source 101 into a high-frequency current and a control circuit 103 for controlling this inverter circuit 102. The inverter circuit 102 is constructed of a reverse current blocking type first switching element 104, a reverse current conducting type second switching element 105, a coil 106 for heating use, a first resonance capacitor 107, a second resonance capacitor 108 and a diode 109. The control circuit 103 includes a drive section 110 which makes the first switching element 104 and the second switching element 105 alternately conductive at a constant frequency f0.

FIG. 72 shows operation waveforms at several portions of the high-frequency inverter constructed as above. As shown in FIG. 72, the drive circuit 110 drives the inverter circuit 102 by alternately turning on the first switching element during a time ton1 and the second switching element during a time ton2 in a constant cycle t0. As apparent from FIG. 72, a zero voltage switching operation is achieved in this high-frequency inverter. FIG. 73 shows an input power control characteristic of this high-frequency inverter. As shown in this figure, the electric power inputted to the high-frequency inverter is controlled by the conducting time ton1 of the first switching element. That is, in the high-frequency inverter, an input power $P_{in}$ is controlled by changing the ratio (ton1/t0) of the conducting time ton1 of the first switching element 104 relative to the constant cycle t0 at the constant operating frequency f0.

As described above, the prior art high-frequency inverter can execute the input power control at the constant operating frequency. Therefore, when it is applied to the multi-burner induction heating cooker, the pan interference noise attributed to the frequency difference between the burners can be solved. Also, the zero voltage switching operation can be achieved with the two switching elements, and this can achieve a reduced power loss and a reduced generated noise in the switching operation.

The multi-burner induction heating cooker is expected to be further popularized in future for its high convenience. In accordance with it, a further improvement is expected for the high-frequency inverter to be applied to the induction heating cooker, and a high-frequency inverter achieving further reductions in size and cost is desired.

The present invention has been developed for solving the aforementioned problems and provides a high-frequency inverter which operates at a constant frequency implemented by a simple circuit construction and an induction heating cooker to which the inverter is applied.

SAMMARY OF THE INVENTION

The present invention provides a high-frequency inverter comprising: a coil whose one terminal is connected to a DC power source; a first switching element connected in series with the coil to the DC power source; a first resonance capacitor which is connected so as to form a resonance circuit with the coil; a series circuit which is constructed of a second resonance capacitor and a second switching element and forms a resonance circuit with the coil and connected in parallel with the coil or the first switching element; and a control circuit which controls the conduction of the first switching element and the second switching element, the control circuit executing conduction control for alternately turning on the switching elements at a constant frequency and changing the conduction ratios for the switching elements to control input power.

In the high-frequency inverter, the first resonance capacitor may have its one terminal connected to a connection point of the second switching element and the second resonance capacitor. The capacitance of the first resonance capacitor may be considerably smaller than the capacitance of the second resonance capacitor. The first switching element may be provided by IGBT (Insulated Gate Bipolar Transistor) with a built-in reverse conducting diode. The first switching element may be a reverse conduction blocking type.

In the high-frequency inverter constructed as above, the zero voltage switching operation can be achieved by the operation of the series circuit of the second switching element and the second resonance capacitor, and therefore, the power loss and heat generation in the switching operation can be reduced. Further, a constant frequency operation can be achieved, and therefore, when the inverter is applied to the multi-burner induction heating cooker, the possible occurrence of the inter-burner pot interference noise can be prevented. Also, the inverter can be provided with a simpler circuit construction than that of the prior art and the power efficiency is increased. With this arrangement, the inverter can be constructed of elements having a small rating, so that the reductions in size and cost can be achieved.

The induction heating cooker of the present invention, having the high-frequency inverter applied thereto, detects a current inputted to the high-frequency inverter and executes feedback control of the input power by controlling the conduction ratios of the switching elements on the basis of this input current.

Another induction heating cooker according to the present invention detects a current inputted to the high-frequency inverter and executes feedback control of the input power of the high-frequency inverter by controlling the conduction ratios of the switching elements on the basis of this input current value and an inputted set value.

Another induction heating cooker according to the present invention controls the conduction ratios of the switching elements within a range where the input current is within a specified range set based on the conducting times of the first and second switching elements. The characteristic of the input current of the inverter relative to conducting times of the switching elements depends on the type of the load to be inductively heated. Therefore, the above-mentioned induction heating cooker can realize a control within an input range where the inverter is not damaged even if using a load that is accompanied with a large loss in the inverter, so that the inverter can be prevented from being damaged.

Another induction heating cooker according to the present invention detects the voltage across both terminals of the first switching element or the voltage across both terminals of the second switching element and controls the conduction ratios of the switching elements on the basis of this detected voltage. With this arrangement, when the load to be inductively heated is a specific one, the input control can be achieved by a simple low-cost method, and the voltages of the switching elements can be limited so that they do not exceed the withstand voltages.

Another induction heating cooker according to the present invention detects the voltages across both terminals of the first and second switching elements and controls the conduction ratios of the switching elements on the basis of this detected voltage within a range of the voltage across both terminals of the first switching element set according to the voltage of the second switching element. The characteristic of the input current of the inverter relative to conducting times of the switching elements depends on the type of the load to be inductively heated. Therefore, the above-mentioned induction heating cooker can realize the control within the input range where the inverter is not damaged even if using a load that is accompanied with a large loss in the inverter, so that the inverter can be prevented from being damaged.

Another induction heating cooker according to the present invention detects the voltages across both terminals of the first and second switching elements and controls the conduction ratios of both the switching elements so that a voltage difference between the voltage across both terminals of the first switching element and the voltage across both terminals of the second switching element becomes not greater than a specified value. The characteristic of the input current of the inverter relative to conducting times of the switching elements depends on the type of the load to be inductively heated. Therefore, the above-mentioned induction heating cooker can achieve the control within the input range where the inverter is not damaged even if using a load that is accompanied with the large inverter loss, so that the inverter can be prevented from being damaged.

Another induction heating cooker according to the present invention detects the current of the coil, the current of the first switching element or the current of the second switching element and controls the conduction ratios of the switching elements on the basis of this detection current. With this arrangement, when the load to be inductively heated is a specific one, feedback control of the input power can be executed with the current of the coil, the current of the first switching element or the current of the second switching element. Also, the current of the coil, the current of the first switching element or the current of the second switching element can be limited so that they do not exceed a predetermined value. Therefore, the power loss of the elements constituting the inverter, particularly in the switching elements can be made not greater than a specified value.

Another induction heating cooker according to the present invention controls the conduction ratios of the switching elements within a range where the current of the second switching element is within a predetermined range set according to the conducting times of the first and second switching elements. The characteristic of the conducting times of the switching elements relative to the current of the second switching element depends on the type of the load to be inductively heated. Therefore, the above-mentioned induction heating cooker can achieve the control within the range where the inverter is not damaged even if using a load that is accompanied with the large inverter loss, so that the inverter can be prevented from being damaged.

Another induction heating cooker according to the present invention detects an inappropriate load and stops the driving of both the switching elements when the inappropriate load is detected. With this arrangement, the inappropriate load of knife, fork, spoon or the like is not heated, allowing the security to be improved.

Another induction heating cooker according to the present invention detects the operating state of the high-frequency inverter and detects the inappropriate load by the operating state. With this arrangement, the detection of the inappropriate load can be easily achieved.

Another induction heating cooker according to the present invention detects the input current to the high-frequency inverter and the voltage of the first switching element or the second switching element and detects the inappropriate load by the input current value of the high-frequency inverter and the voltage values of the first or second switching element. The characteristics of the input current of the high-frequency inverter relative to the voltages of the switching elements depends on the type of the load, and therefore, the inappropriate load can be easily detected by the aforementioned induction heating cooker.

Another induction heating cooker according to the present invention outputs a start signal for starting the high-frequency inverter and a stop signal for stopping the high-frequency inverter. The high-frequency inverter starts the switching elements with a delay for a predetermined time after receiving the start signal. With this arrangement, the inverter starts its operation after becoming in a stabilized state subsequent to the start of the induction heating cooker. Therefore, the reliability can be improved.

The DC power source for supplying an electric power to the inverter may be comprised of a commercial power source, a rectifier for rectifying the commercial power source and a smoothing capacitor connected to the output of the rectifier. In this case, another induction heating cooker according to the present invention monitors the power state of the commercial power source and stops driving the switching elements when detecting the abnormal state of the commercial power source. With this arrangement, the operation can be stopped when the DC power source for supplying an electric power to the inverter becomes abnormal, so that the inverter can be prevented from being damaged.

Another induction heating cooker according to the present invention outputs a signal for gradually increasing the input power from a predetermined minimum input power when the high-frequency inverter is started, and controls the conduction ratio between the switching elements on the basis of this signal. With this arrangement, the inverter operation can shift gradually from an operation state where the voltage and current loads are small to an operation state where those are large, thereby allowing a secure operation to be achieved.

Another induction heating cooker according to the present invention receives a set value of the input power of the high-frequency inverter, compares a reference voltage whose value gradually varies to a voltage set based on this input set value with a predetermined triangular wave voltage and controls the conduction ratios of the switching elements on the basis of an output voltage generated according to the comparison result. With this arrangement, the inverter operation can progress gradually from the operation state where the voltage and current loads are small, thereby allowing a secure operation to be achieved.

Another induction heating cooker according to the present invention has a dead time which is a period in which both the first and second switching elements are nonconductive at the time of changing the conducting periods of the first and second switching elements. This arrangement can prevent the concurrent conduction of both the switching elements, thereby allowing the reliability to be improved.

In the above-mentioned induction heating cooker, the dead time of both the switching elements may be set on the basis of the operating state of the high-frequency inverter. With this arrangement, a switching operation with a timing appropriate for each switching element can be executed, thereby allowing an optimum inverter operation to be achieved.

Another induction heating cooker according to the present invention sets the dead time to a predetermined time. Thus, the dead time can be easily set.

Another induction heating cooker according to the present invention makes a dead time from the end point of the conducting period of the first switching element to the start point of the conducting period of the second switching element differ from a dead time from the end point of the conducting period of the second switching element to the start point of the conducting period of the first switching element. With this arrangement, a switching operation with a timing appropriate for each switching element can be executed by an easy method, thereby allowing an optimum inverter operation to be achieved.

Another induction heating cooker according to the present invention changes the capacitance of the first resonance capacitor according to the load to be heated by the coil. With this arrangement, an inverter operation appropriate for the load to be inductively heated can be achieved.

Another induction heating cooker according to the present invention changes the capacitance of the second resonance capacitor according to the load to be heated by the coil. With this arrangement, an inverter operation appropriate for the load to be inductively heated can be achieved.

Another induction heating cooker according to the present invention changes the inductance of the coil according to the load to be heated by the coil. With this arrangement, an inverter operation appropriate for the load to be inductively heated can be achieved.

Another induction heating cooker according to the present invention changes the length of a gap between the coil and the load according to the load to be heated by the coil. With this arrangement, an inverter operation appropriate for the load to be inductively heated can be achieved.

Another induction heating cooker according to the present invention may detect the load to be inductively heated, by which an inverter operation appropriate for the load can be achieved.

BRIEF DESCRIPTION OF THE DRAWINGS

FIG. 64 is a timing chart for explaining the operation of the induction heating cooker of the twenty-second embodiment when a relay is turned on.

DETAIL DESCRIPTION OF THE INVENTION

Preferred embodiments of the high-frequency inverter and the induction heating cooker to which the inverter is applied according to the present invention will be described below with reference to the accompanying drawings.

Embodiment 1

Figure 1:
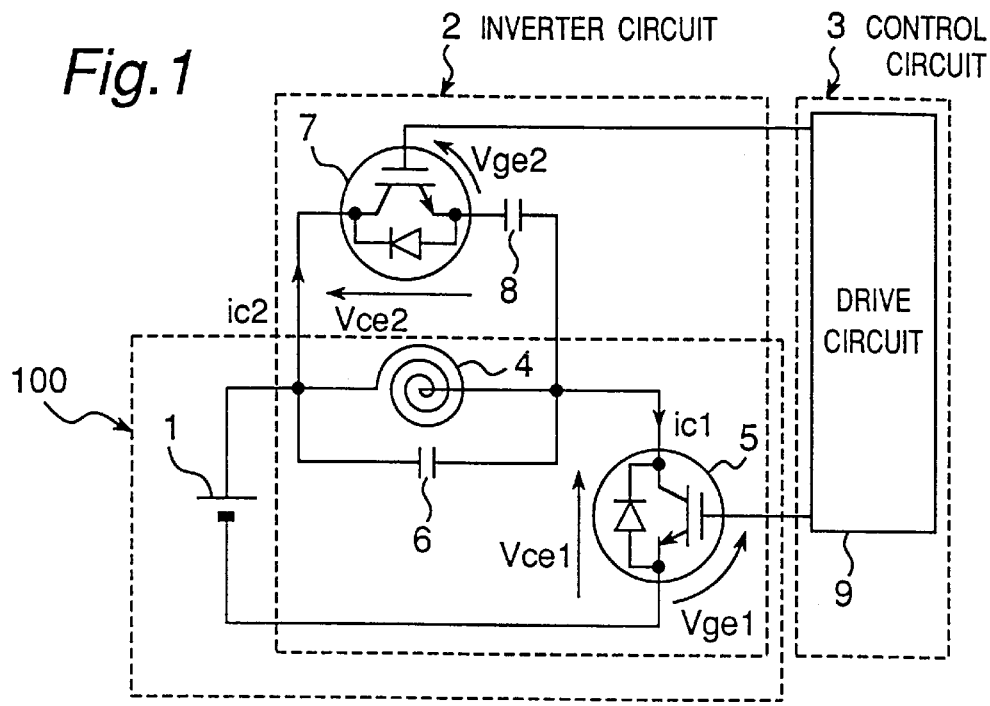
FIG. 1 is a circuit diagram of a high-frequency inverter according to a first embodiment.

FIG. 1 shows a circuit diagram of an induction heating cooker employing a high-frequency inverter according to a first embodiment. In FIG. 1, the induction heating cooker includes: an inverter circuit 2 for converting a direct current from a DC power source 1 into a high-frequency current; and a control circuit 3 for controlling the inverter circuit 2. The inverter circuit 2 is comprised of: a one-transistor inverter 100 constructed of a heating coil 4 which serves as a heating use coil whose one terminal is connected to the positive side of the DC power source 1, an IGBT (Insulated Gate Bipolar Transistor) 5 provided with a built-in reverse conducting diode which serves as a first switching element connected between the other terminal of the heating coil 4 and the negative side of the DC power source 1 and a first resonance capacitor 6 connected in parallel with the heating coil 4; and a series circuit constructed of an IGBT 7 provided with a built-in reverse conducting diode which serves as a second switching element and a second resonance capacitor 8. The series circuit of the IGBT 7 and the second resonance capacitor 8 is connected in parallel with the heating coil 4. This series circuit operates as an auxiliary switch for achieving a constant frequency operation by clamping the first switching element at a high voltage. The control circuit 3 includes a drive circuit 9 for driving the IGBT 5 and the IGBT 7. The drive circuit 9 makes the IGBT 5 and the IGBT 7 alternately conductive at a constant operating frequency f0. It is to be noted that the capacitance of the first resonance capacitor 6 is set to a value considerably smaller than the capacitance of the second resonance capacitor 8.

The operation of the high-frequency inverter constructed as above will be described below.

Figure 2:
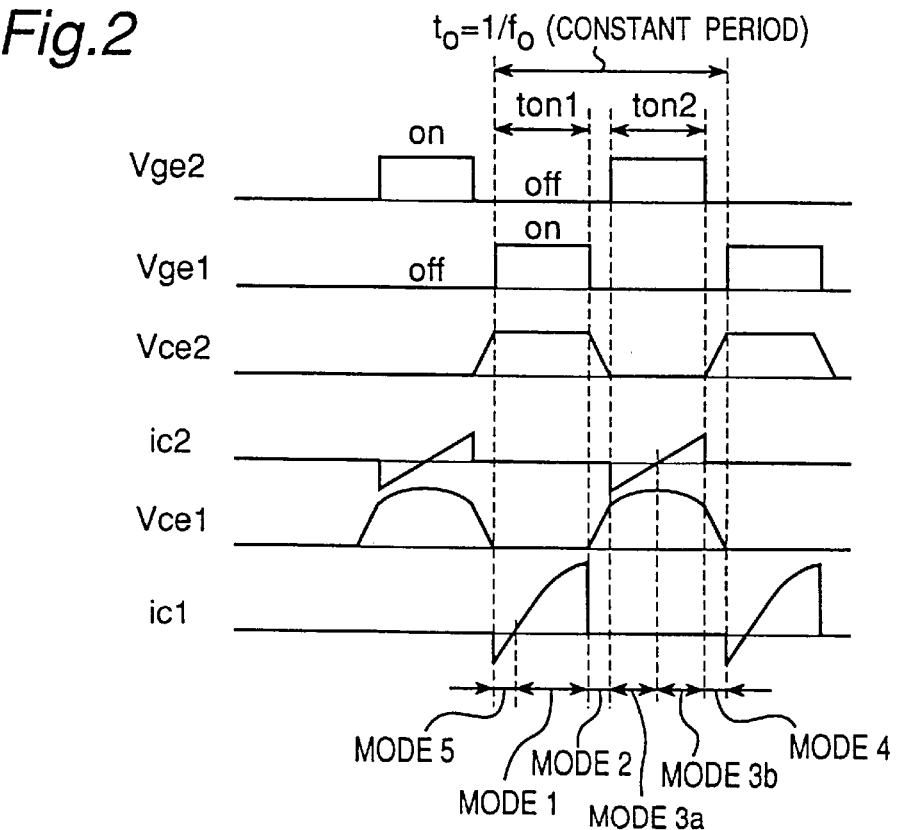
FIG. 2 is a chart of operating waveforms at several parts of the high-frequency inverter of the first embodiment.
Figure 3:
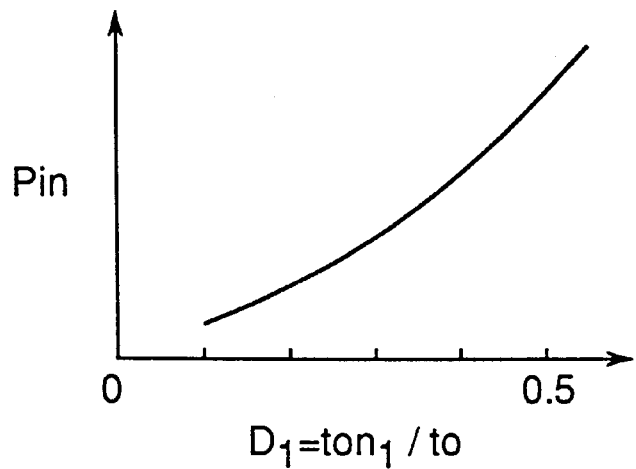
FIG. 3 is a graph of a characteristic of the conduction ratio relative to the input power of the high-frequency inverter in the first embodiment.

FIG. 2 shows operation waveforms at several portions of the inverter circuit 2. In FIG. 2, the IGBT 5 is turned on when a gate-emitter voltage vge1 is at high level, and the IGBT 7 is turned on when a gate-emitter voltage vge2 is at high level. In FIG. 2, $v_{ce1}$ denotes the collector-emitter voltage of the IGBT 5, vce2 denotes the collector-emitter voltage of the IGBT 7, ic1 denotes the collector current of the IGBT 5, and ic2 denotes the collector current of the IGBT 7. The drive circuit 9 controls the input power by varying the time ton1 during which the IGBT 5 is turned on. That is, the drive circuit 9 executes the input power control by varying a conduction ratio D1 (=ton1/t0) that is the ratio of the conducting (ON) time ton1 of the first switching element 5 relative to the constant operating cycle t0 of the inverter circuit 2. FIG. 3 is a graph of a characteristic of the conduction ratio of the inverter circuit 2 relative to the input power. As shown in this figure, increasing the conduction ratio D1 can also increase the input power pin.

The operation during one cycle of the present high-frequency inverter can be considered to be divided into six modes as shown in FIG. 2. Each of the modes in the steady state will be described below.

(Mode 1) In this mode, the first switching element 5 is turned on and the second switching element 7 is turned off. In this stage, the current path extends sequentially from DC power source 1→heating coil 4→first switching element 5→DC power source 1. After a lapse of the conducting time ton1, the first switching element 5 is turned off and the system operation shifts to Mode 2.

(Mode 2) In this mode, the first and second switching elements 5 and 7 are both turned off. In this stage, the heating coil 4 and the first resonance capacitor 6 constitute a resonance circuit. In this stage, the voltage vc1 across both terminals of the first resonance capacitor 6 increases, and when the voltage vc1 across both terminals of the first resonance capacitor 6 becomes greater than the voltage vc2 across both terminals of the second resonance capacitor 8, the reverse conducting diode of the second switching element 7 is turned on and the system operation shifts to Mode 3a.

(Mode 3a) In this mode, the first switching element 5 is turned off and the second switching element 7 is turned on. The current path extends sequentially from heating coil 4→second resonance capacitor 8→reverse conducting diode of second switching element 7→heating coil 4 and also extends sequentially from heating coil 4→first resonance capacitor 6→heating coil 4. In the present mode, by turning on the second switching element 7 while the current is flowing through the reverse conducting diode of the second switching element, the second switching element 7 can be turned on with the voltage across both the terminals at zero volt. When the resonance current formed by the heating coil 4 and the first and second resonance capacitors 6 and 8 is inverted, the system operation shifts to Mode 3b.

(Mode 3b) In this mode, the first switching element 5 is turned off and the second switching element 7 is turned on. The current path extends sequentially from heating coil 4→second switching element 7→second resonance capacitor 8→heating coil 4 and also extends sequentially from heating coil 4→first resonance capacitor 6→heating coil 4. After a lapse of the conducting time ton2, the second switching element 7 is turned off and the system operation shifts to Mode 4.

(Mode 4) In this mode, the first and second switching elements 5 and 7 are both turned off. The current path extends sequentially from heating coil 4→first resonance capacitor 6→heating coil 4. In this stage, the heating coil 4 and the first resonance capacitor 6 constitute a resonance circuit. When vc1<-E (E is the voltage of the DC power source 1), the reverse conducting diode of the first switching element 5 is turned on and the system operation shifts to Mode 5.

(Mode 5) In this mode, the first switching element 5 is turned on and the second switching element 7 is turned off. In this stage, the current path extends sequentially from DC power source 1→reverse conducting diode of first switching element 5→heating coil 4→DC power source 1. When the current ic1 flowing through the first switching element 5 is inverted, the system operation shifts to Mode 1.

As described above, the high-frequency inverter of the present embodiment can be provided by connecting the voltage resonance one-transistor inverter circuit with the series circuit of the second switching element which operates as an auxiliary switch of which the conduction current and application voltage are relatively small and the second resonance capacitor, and therefore it can be implemented with a simple construction. The high-frequency inverter of the present embodiment can achieve the zero voltage switching operation, and therefore it can reduce the power loss, heat generation and noises at the two switching elements in the switching operation. The present high-frequency inverter drives the inverter circuit at a constant operating frequency, and therefore, it can make the operating frequencies of the burners identical when used in the multi-burner induction heating cooker and solve the problem of the interference noises between the burners.

In general, the inductance value of the inductor element (the heating coil 4 in this case) employed in the high-frequency inverter described above preferably has a large value in terms of the power loss at the elements in the circuit, however, its upper limit is restricted for the purpose of securing a specified input power. In the high-frequency inverter of the embodiment constructed as above, the upper limit value of the inductance value of the heating coil 4 can be increased by 20 to 30% as compared with that of the prior art. With this arrangement, the magnitude of the current flowing through the circuit can be reduced in order to obtain an identical input power. For this reason, the inverter circuit 2 can employ some elements having small rated values. For the reason that the heat generation can be reduced, a heat sink and so forth having a small size can be employed, and this can achieve the overall reduction in size of the inverter circuit and cost reduction.

Figure 4:
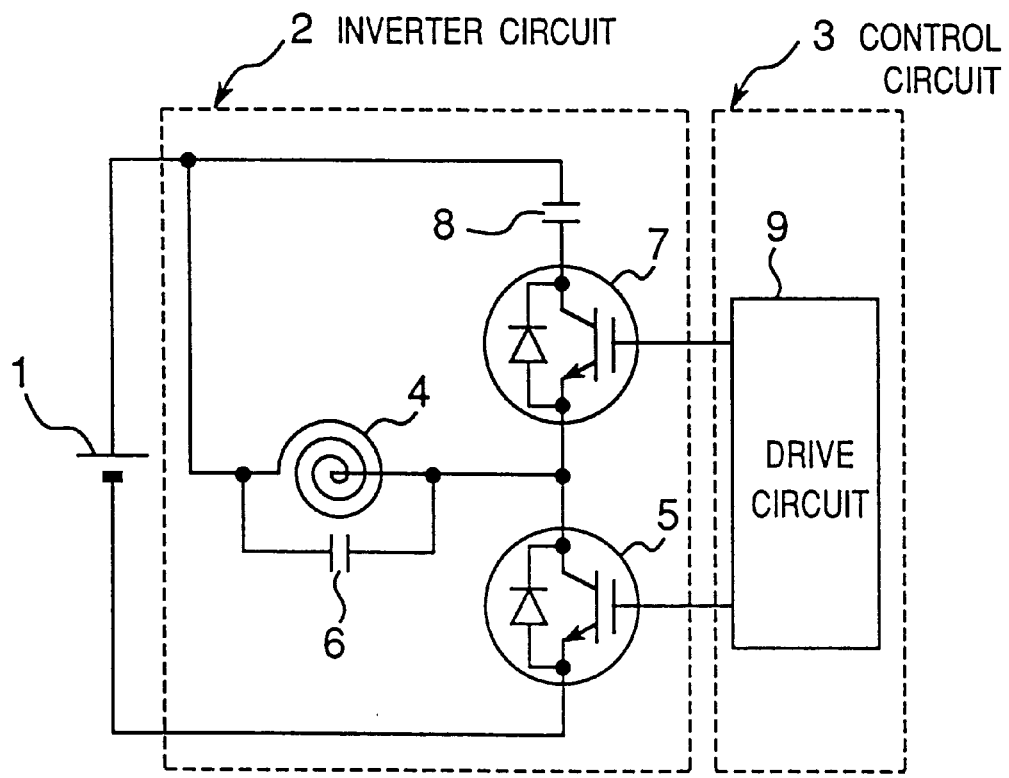
FIG. 4 is a circuit diagram of a modification example of the high-frequency inverter of the first embodiment.

In the inverter circuit 2, the IGBT 7 and the second resonance capacitor 8 may have a positional relationship as shown in FIG. 4 reverse to that of the case shown in FIG. 1, where an effect similar to that of the aforementioned inverter circuit can be obtained.

Figure 5:
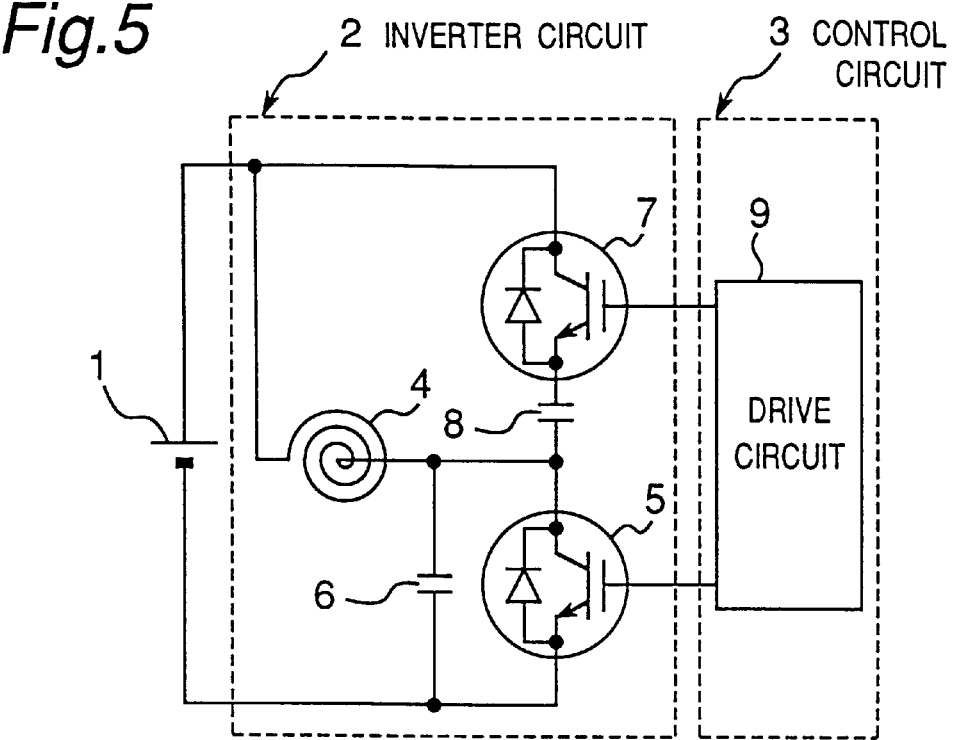
FIG. 5 is a circuit diagram of another modification example of the high-frequency inverter of the first embodiment.
Figure 6:
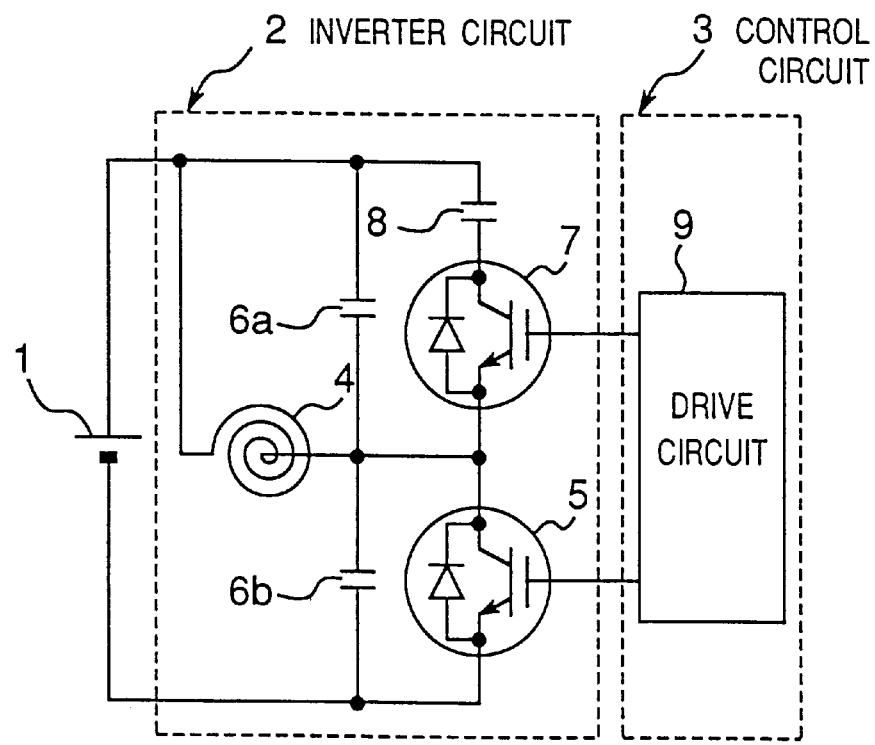
FIG. 6 is a circuit diagram of yet another modification example of the high-frequency inverter of the first embodiment.

In the inverter circuit 2, the connection of the first resonance capacitor 6 may be changed so that the first resonance capacitor 6 is connected in parallel with the IGBT 5 which serves as the first switching element as shown in FIG. 5. In the inverter circuit 2, it is acceptable to divide the first resonance capacitor 6 into two capacitors 6a and 6b and connect the capacitors 6a and 6b in parallel with the IGBTs 7 and 5, respectively, as shown in FIG. 6.

Figure 7:
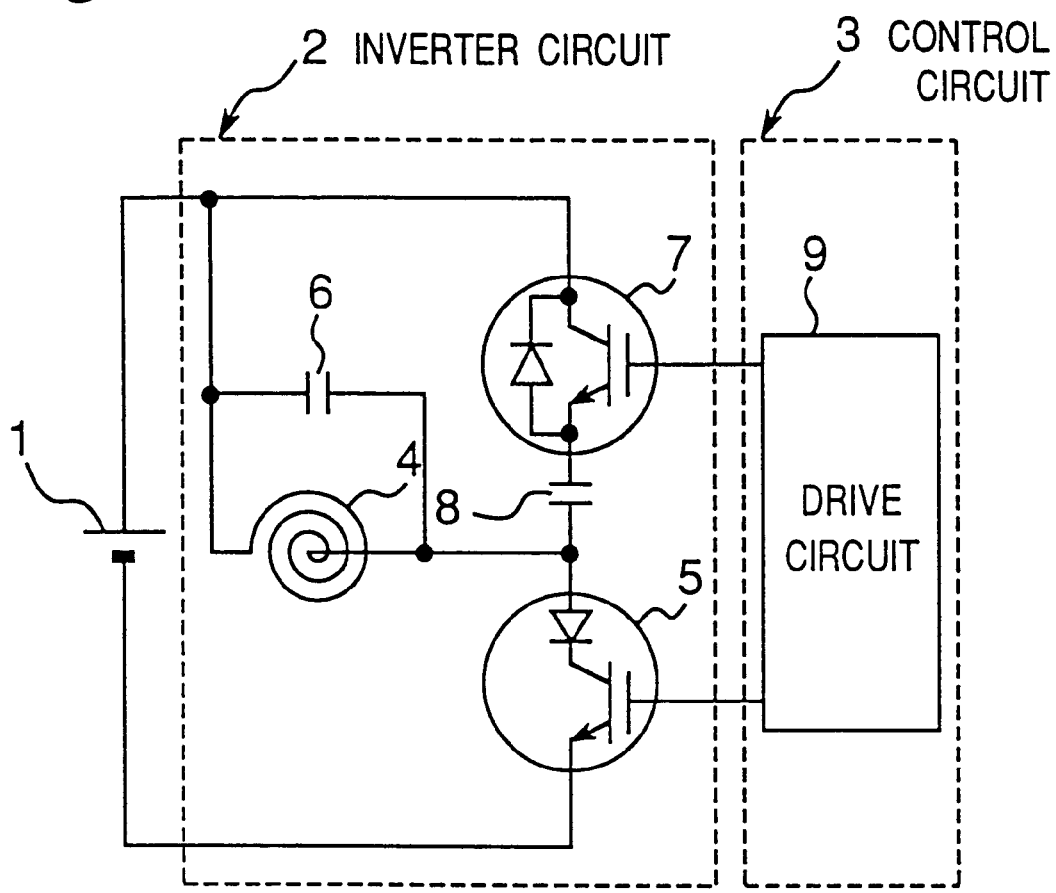
FIG. 7 is a circuit diagram of yet another modification example of the high-frequency inverter of the first embodiment.

Further, in the inverter circuit 2, the first switching element may be provided with a reverse current blocking type element as shown in FIG. 7.

Embodiment 2

Figure 8:
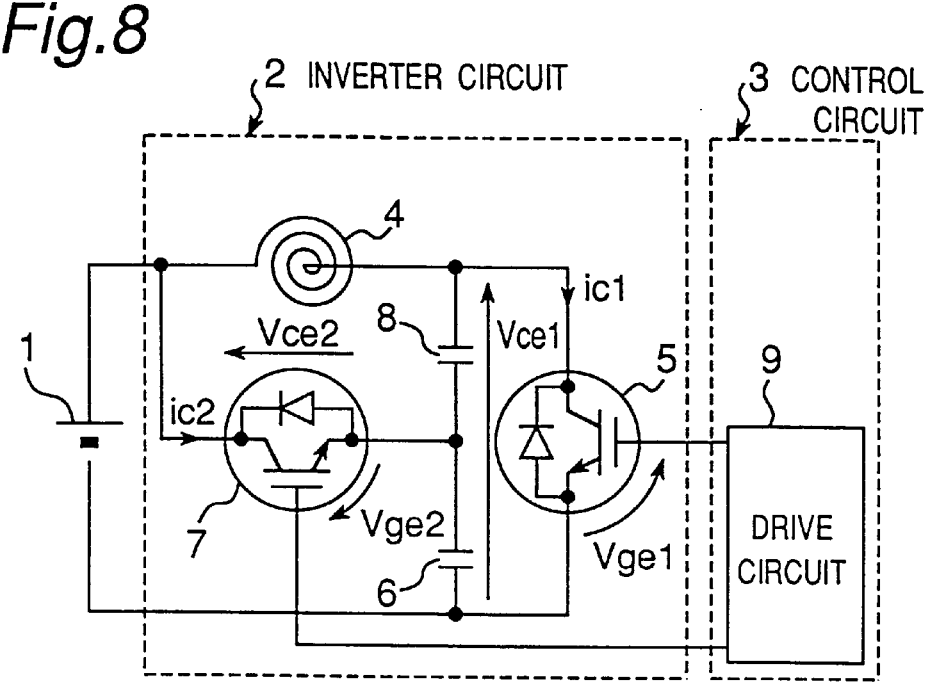
FIG. 8 is a circuit diagram of a high-frequency inverter according to a second embodiment.

FIG. 8 shows a circuit diagram of an induction heating cooker employing a high-frequency inverter according to a second embodiment. In FIG. 8, the induction heating cooker includes: an inverter circuit 2 for converting a direct current from the DC power source 1 into a high-frequency current; and a control circuit 3 for controlling the inverter circuit 2. The inverter circuit 2 is comprised of: a heating coil 4 whose one terminal is connected to the positive side of the DC power source 1; an IGBT 5 provided with a built-in reverse conducting diode which serves as a first switching element connected between the other terminal of the heating coil 4 and the negative side of the DC power source 1; a series circuit constructed of an IGBT 7 provided with a built-in reverse conducting diode which serves as a second switching element and a second resonance capacitor 8, the series circuit connected in parallel with the heating coil 4; and a first resonance capacitor 6 connected between the connection point of the IGBT 7 and the second resonance capacitor 8 and one terminal on the low potential side of the DC power source 1 of the IGBT 5.

The series circuit of the IGBT 7 and the second resonance capacitor 8 operates as an auxiliary switch for achieving constant frequency control by clamping the voltage across both terminals of the first switching element 5 at a high voltage. The control circuit 3 includes a drive circuit 9 for driving the IGBT 5 and the IGBT 7. The drive circuit 9 makes the IGBT 5 and the IGBT 7 alternately conductive at a constant operating frequency f0 and controls input power by varying a conduction ratio D1=ton1/t0 that is the ratio of the conducting time ton1 of the first switching element 5 relative to the constant operating cycle t0 (=1/f0) of the inverter circuit 2.

Figure 9:
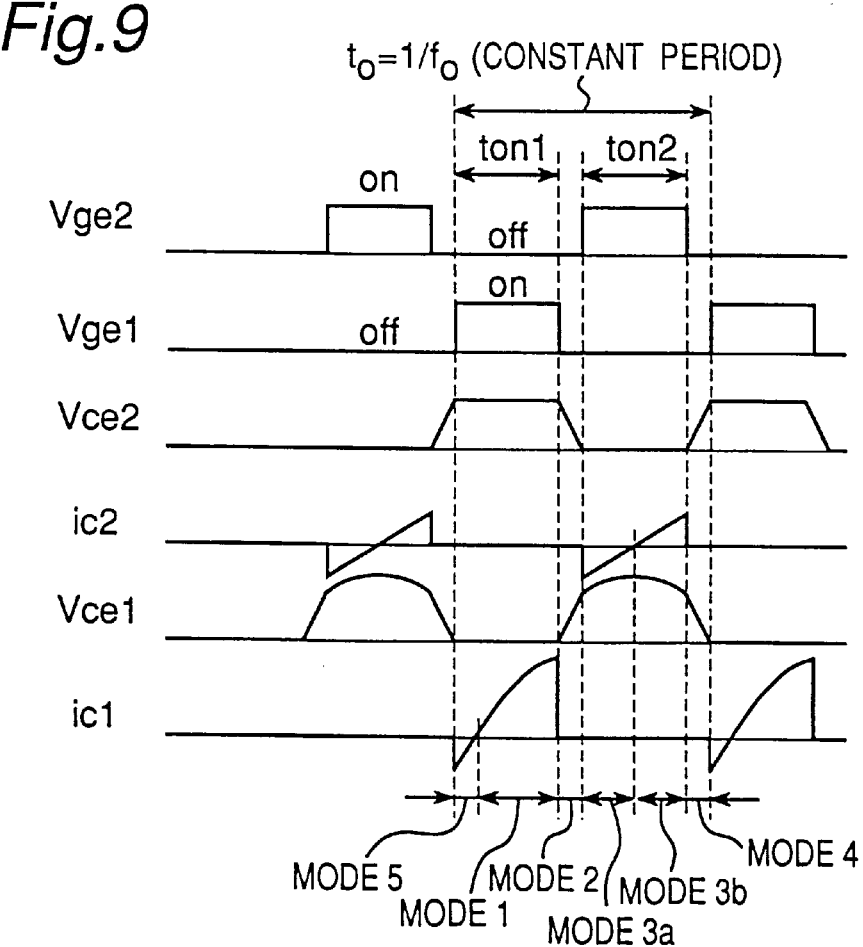
FIG. 9 is a chart of operating waveforms at several parts of the high-frequency inverter of the second embodiment.

FIG. 9 shows operation waveforms at several portions of the inverter circuit 2. In FIG. 9, vge1 denotes the gate-emitter voltage of the IGBT 5, vge2 denotes the gate-emitter voltage of the IGBT 7, vce1 denotes the collector-emitter voltage of the IGBT 5, vce2 denotes the collector-emitter voltage of the IGBT 7, ic1 denotes the collector current of the IGBT 5 and ic2 denotes the collector current of the IGBT 7.

The operation during one cycle of the present high-frequency inverter can be considered to be divided into six modes as follows. Each of the modes in the steady state will be described below.

(Mode 1) In this mode, the first switching element 5 is turned on and the second switching element 7 is turned off. In this stage, the current path extends sequentially from DC power source 1→heating coil 4→first switching element 5→DC power source 1. After a lapse of the conducting time ton1, the first switching element 5 is turned off and the system operation shifts to Mode 2.

(Mode 2) In this mode, the first and second switching elements 5 and 7 are both turned off. In this stage, the heating coil 4, the second resonance capacitor 8 and the first resonance capacitor 6 constitute a resonance circuit to generate a resonance current. That is, the current path extends sequentially from heating coil 4→second resonance capacitor 8→first resonance capacitor 6→DC power source 1→heating coil 4. When the voltage vc1 across both terminals of the first resonance capacitor 6 increases and becomes greater than the voltage E of the DC power source 1, the reverse conducting diode of the second switching element 7 is turned on and the system operation shifts to Mode 3a.

(Mode 3a) In this mode, the first switching element 5 is turned off and the second switching element 7 is turned on. The current path extends sequentially from heating coil 4→second resonance capacitor 8→first resonance capacitor 6→DC power source 1→heating coil 4→and also extends sequentially from heating coil 4→second resonance capacitor 8→reverse conducting diode of second switching element 7→heating coil 4. In this mode, further resonance is caused by the heating coil 4 and the second resonance capacitor 8 in addition to the resonance of the Mode 2. In the present mode, by turning on the second switching element 7 while the current is flowing through the reverse conducting diode of the second switching element, the second switching element 7 can be turned on with the voltage across both the terminals at zero volt. The resonance current is inverted and the system operation shifts to Mode 3b.

(Mode 3b) In this mode, the first switching element 5 is turned off and the second switching element 7 is turned on. The current path extends sequentially from heating coil 4→DC power source 1→first resonance capacitor 6→second resonance capacitor 8→heating coil 4 and extends sequentially from heating coil 4→second switching element 7→second resonance capacitor 8→heating coil 4. That is, a resonance current is formed by the resonance of the heating coil 4 and the first and second resonance capacitors 6 and 8. After a lapse of the conducting time ton2, the second switching element 7 is turned off and the system operation shifts to Mode 4.

(Mode 4) In this mode, the first and second switching elements 5 and 7 are both turned off. The current path extends sequentially from heating coil 4→DC power source 1→first resonance capacitor 6→second resonance capacitor 8→heating coil 4. When the voltage vc1 of the first resonance capacitor 6 becomes vc1<0, the reverse conducting diode of the first switching element 5 is turned on and the system operation shifts to Mode 5.

(Mode 5) In this mode, the first switching element 5 is turned on and the second switching element 7 is turned off.

In this stage, the current path extends sequentially from heating coil 4→DC power source 1→reverse conducting diode of first switching element 5→heating coil 4. When the current ic1 flowing through the first switching element is inverted, the system operation shifts to Mode 1.

As described above, the high-frequency inverter of the present embodiment also operates similar to that of the first embodiment. Therefore, an effect similar to that of the first embodiment can be obtained also by the high-frequency inverter of the present embodiment.

Figure 10:
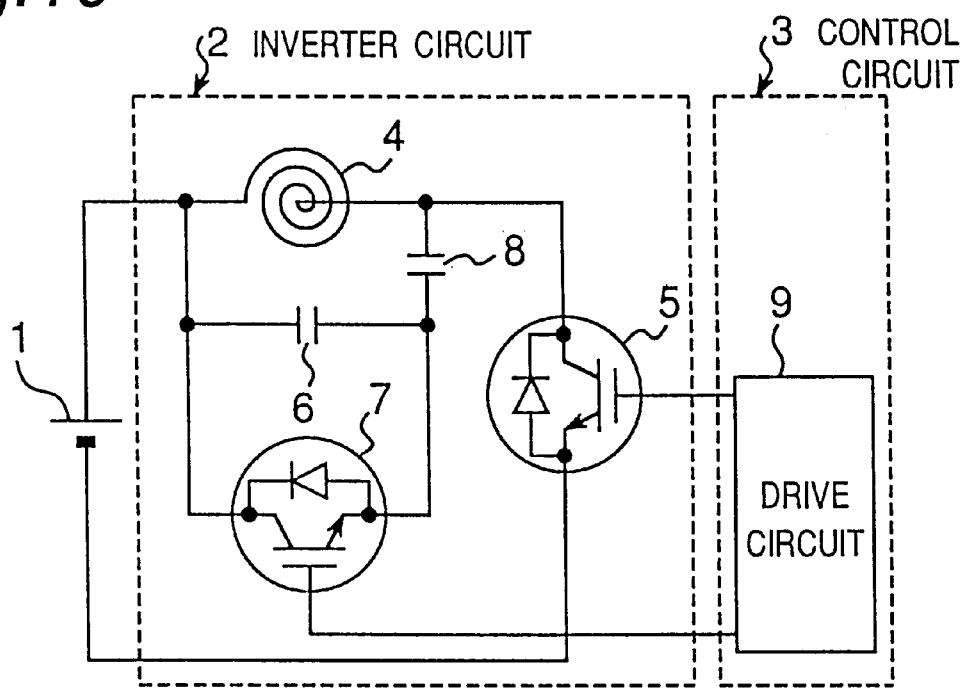
FIG. 10 is a circuit diagram of a modification example of the high-frequency inverter of the second embodiment.
Figure 11:
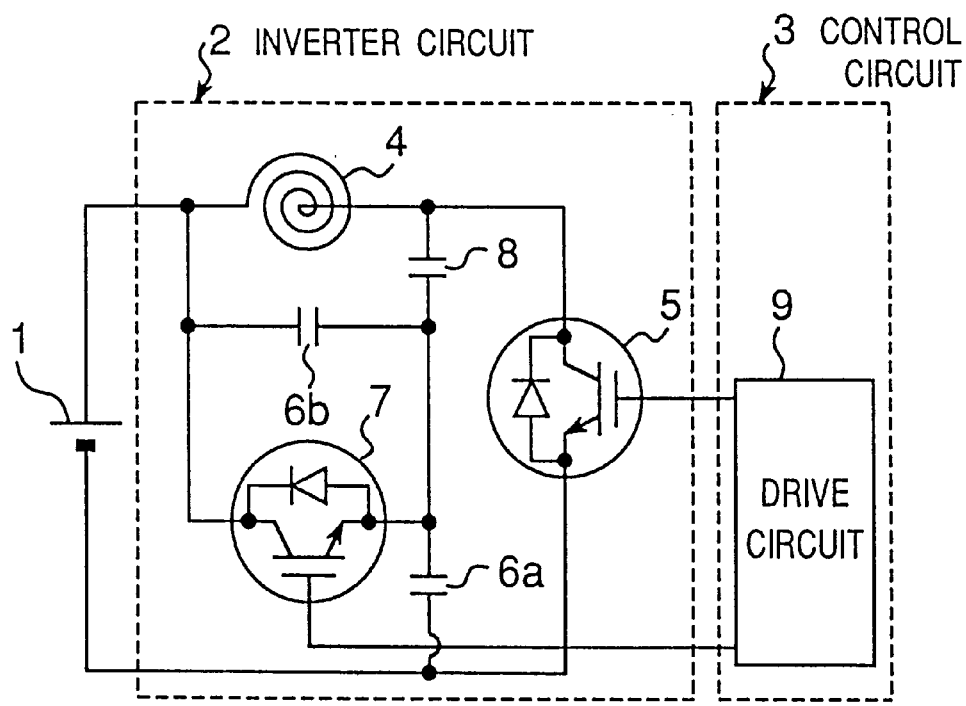
FIG. 11 is a circuit diagram of another modification example of the high-frequency inverter of the second embodiment.

In the inverter circuit 2 shown in FIG. 8, the first resonance capacitor 6 is connected between the negative side of the DC power source 1 and the connection point of the IGBT 7 and the second resonance capacitor 8. However, as shown in FIG. 10, there may be a construction in which the capacitor is connected between the positive side of the DC power source 1 and the connection point of the IGBT 7 and the second resonance capacitor 8. In the inverter circuit 2, it is acceptable to divide the first resonance capacitor 6 into two capacitors 6a and 6b, connect the capacitor 6a between the negative side of the DC power source 1 and the connection point of the IGBT 7 and the second resonance capacitor 8 and connect the capacitor 6b between the positive pole of the DC power source 1 and the connection point of the IGBT 7 and the second resonance capacitor 8 as shown in FIG. 11.

Figure 12:
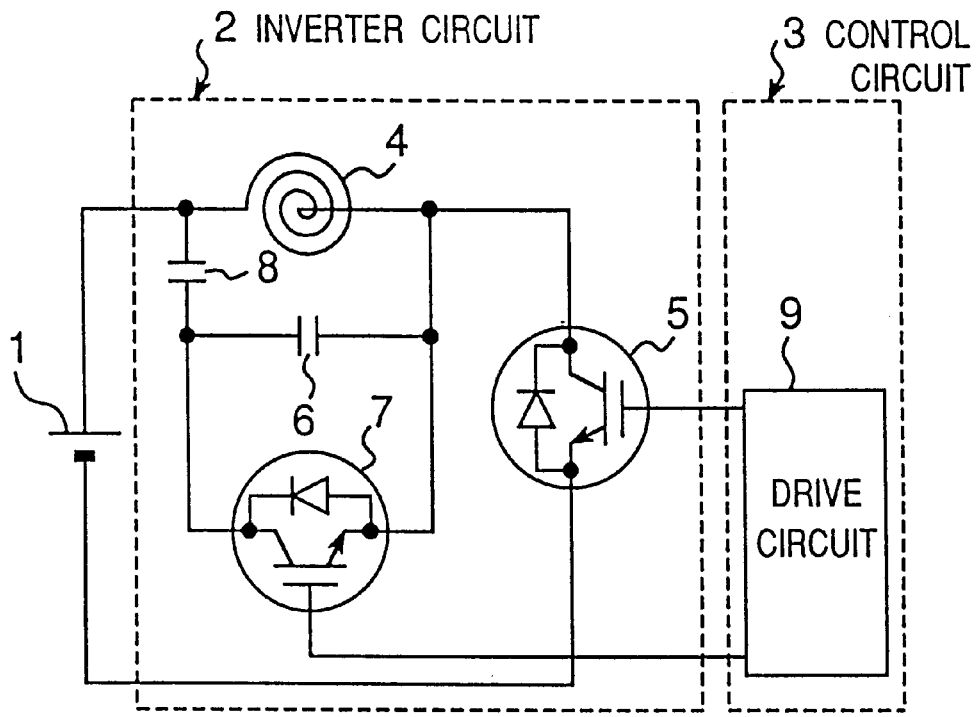
FIG. 12 is a circuit diagram of yet another modification example of the high-frequency inverter of the second embodiment.

In the inverter circuit 2 shown in FIG. 10, there may be a construction in which the second resonance capacitor 8 is inserted between the collector terminal of the IGBT 7 and the connection point of the DC power source 1 and the heating coil 4 as shown in FIG. 12.

Figure 13:
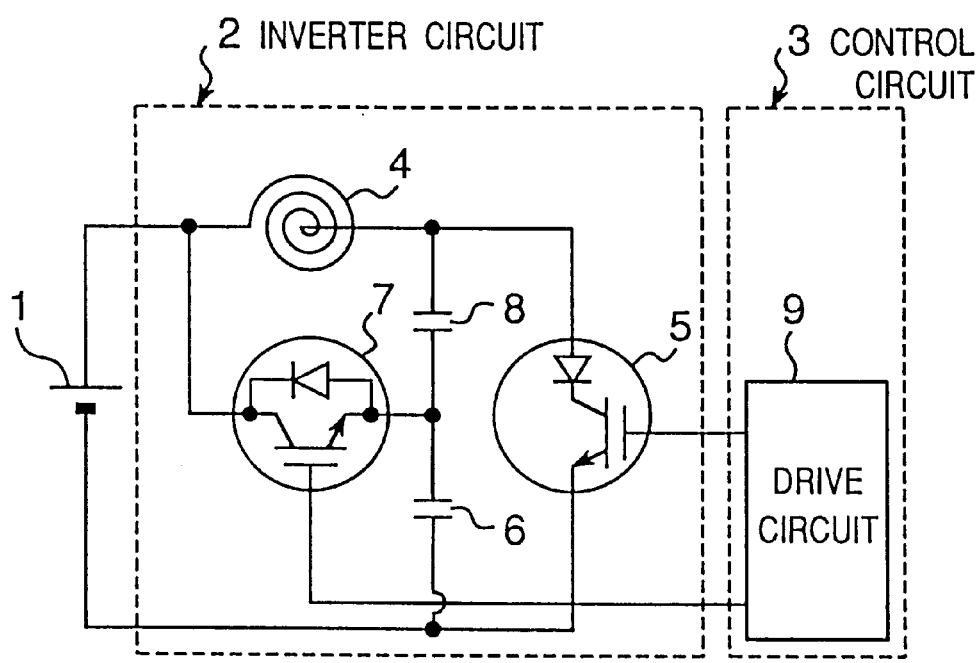
FIG. 13 is a circuit diagram of yet another modification example of the high-frequency inverter of the second embodiment.

Further, in the inverter circuit 2, the first switching element 5 may be comprised of a reverse current blocking type element as shown in FIG. 13.

Embodiment 3

Figure 14:
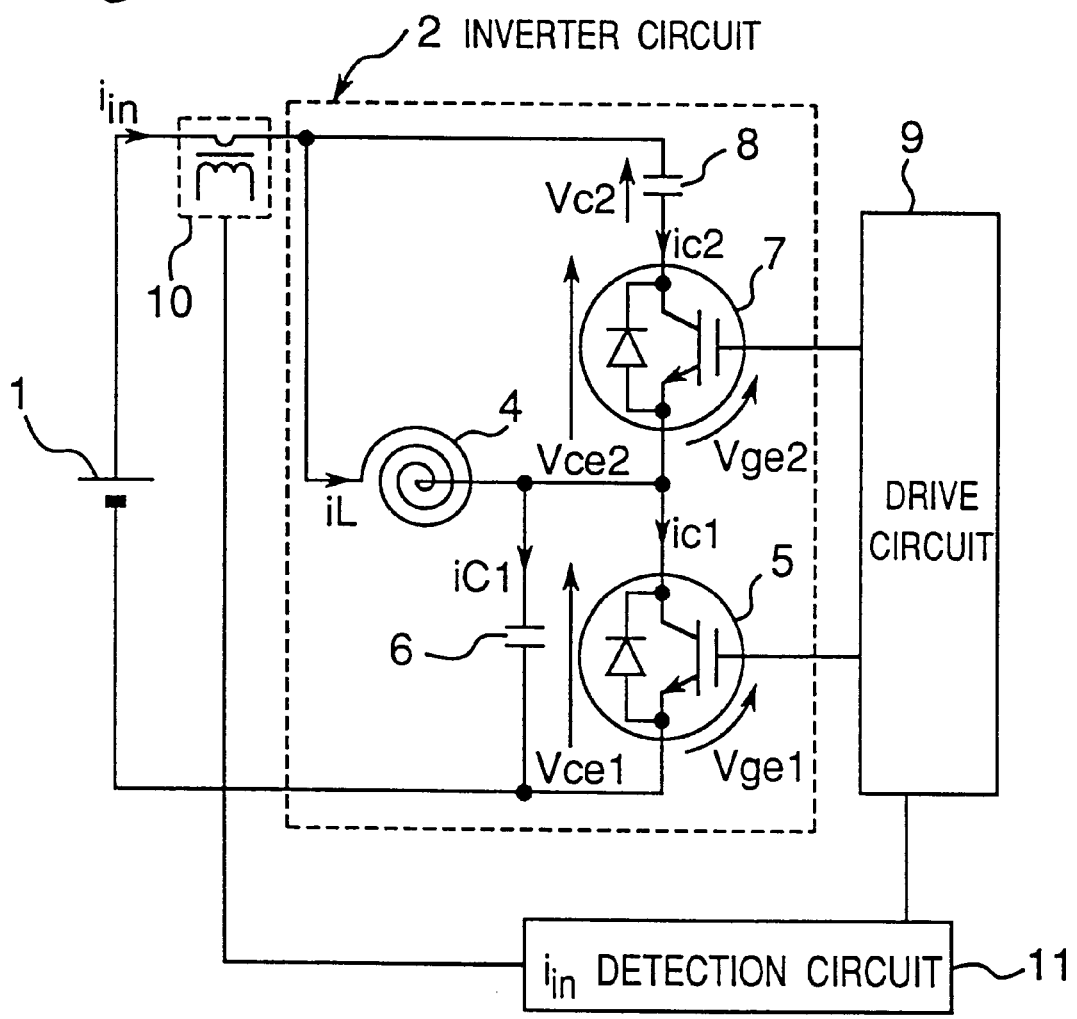
FIG. 14 is a circuit diagram of an induction heating cooker according to a third embodiment.

FIG. 14 shows a circuit diagram of an induction heating cooker according to a third embodiment. In FIG. 14, the induction heating cooker includes: an inverter circuit 2 for converting a direct current from a DC power source 1 into a high-frequency current; a drive circuit 9 for controlling the inverter circuit 2; a current transformer 10 for detecting a current inputted to the inverter circuit 2; and an $i_{in}$ detection circuit 11 for outputting a voltage based on an output from the current transformer 10. In this case, the current transformer 10 and the $i_{in}$ detection circuit 11 constitute an input current detecting means for detecting the input current to the inverter circuit 2.

The inverter circuit 2 is comprised of: a heating coil 4 whose one terminal is connected to the positive side of the DC power source 1 via the primary side of the current transformer 10; an IGBT 5 provided with a built-in reverse conducting diode which serves as a first switching element connected between the other terminal of the heating coil 4 and the negative side of the DC power source 1; a first resonance capacitor 6 which is connected in parallel with the IGBT 5 and forms a resonance circuit with the heating coil 4; and a series circuit constructed of an IGBT 7 provided with a built-in reverse conducting diode which serves as a second switching element and a second resonance capacitor 8, the series circuit connected in parallel with the heating coil 4.

Further, the secondary side of the current transformer 10 is connected to the $i_{in}$ detection circuit 11, the output of the $i_{in}$ detection circuit 11 is connected to the drive circuit 9, and the drive circuit 9 is connected to the gate terminal of the IGBT 5 and the gate terminal of the IGBT 7.

The operation of the induction heating cooker constructed as above will be described below.

Figure 15:
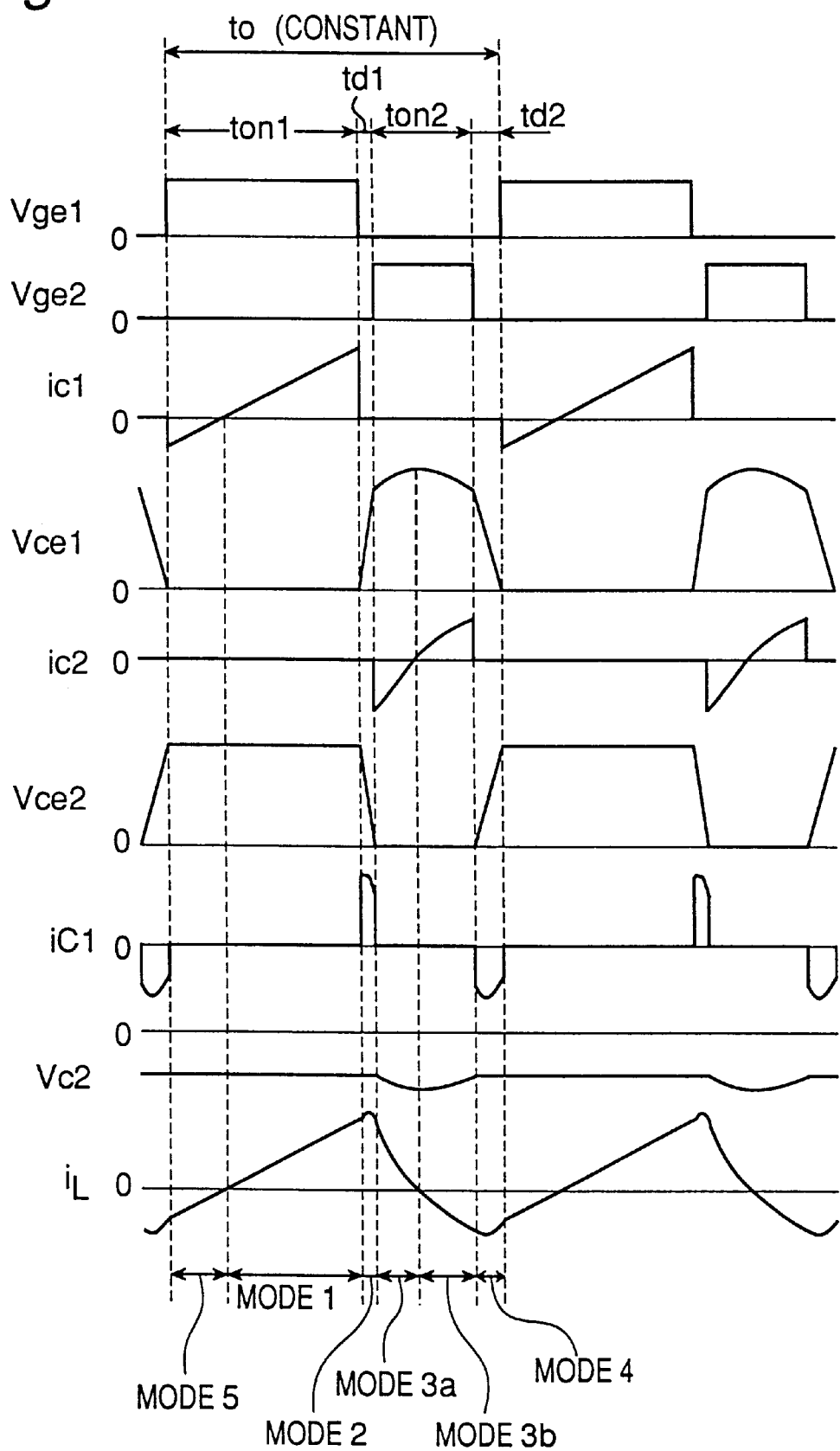
FIG. 15 is a chart of operating waveforms at several parts of the inverter circuit of the induction heating cooker of the third embodiment.

FIG. 15 shows operation waveforms at several parts of the inverter circuit 2 of the induction heating cooker. In FIG. 15, vge1 denotes the gate-emitter voltage of the IGBT 5, vge2 denotes the gate-emitter voltage of the IGBT 7, vce1 denotes the collector-emitter voltage of the IGBT 5, vce2 denotes the collector-emitter voltage of the IGBT 7, ic1 denotes the collector current of the IGBT 5, ic2 denotes the collector current of the IGBT 7, lc1 denotes the current of the first resonance capacitor 6, vc2 denotes the voltage of the second resonance capacitor 8 and $i_L$ denotes the current of the heating coil 4. Further, t0 denotes the operating cycle of the inverter circuit 2, ton1 denotes the conducting time of the IGBT 5, ton2 denotes the conducting time of the IGBT 7, td1 and td2 each denote a "dead time" in which the IGBT 5 and the IGBT 7 are both nonconductive. The operating cycle t0 of the inverter circuit 2 is controlled to be consistently constant.

The operation during one cycle of this inverter circuit 2 can be considered to be divided into six modes as follows. Each of the modes in the steady state will be described below.

(Mode 1) In this mode, the first switching element 5 is turned on and the second switching element 7 is turned off. In this stage, the current path extends sequentially from DC power source 1→heating coil 4→first switching element 5→DC power source 1. After a lapse of the conducting time ton1, the first switching element 5 is turned off and the system operation shifts to Mode 2.

(Mode 2) In this mode, the first and second switching elements 5 and 7 are both turned off. The current path extends sequentially from heating coil 4→first resonance capacitor 6→DC power source 1→heating coil 4. In this stage, the heating coil 4 and the first resonance capacitor 6 constitute a resonance circuit. When the voltage vce1 across both terminals of the first switching element 5 increases and becomes greater than a value obtained by subtracting a voltage vc2 across both terminals of the second resonance capacitor 8 from the voltage of the DC power source 1, the reverse conducting diode of the second switching element 7 is turned on and the system operation shifts to Mode 3a.

(Mode 3a) In this mode, the first switching element 5 is turned off and the second switching element 7 is turned on. The current path extends sequentially from heating coil 4→reverse conducting diode of second switching element 7→second resonance capacitor 8→heating coil 4 and also extends sequentially from heating coil 4→first resonance capacitor 6→DC power source 1→heating coil 4. When a resonance current caused by the resonance of the heating coil 4 and the first and second resonance capacitors 6 and 8 is inverted, the system operation shifts to Mode 3b.

(Mode 3b) In this mode, the first switching element 5 is turned off and the second switching element 7 is turned on. The current path extends sequentially from heating coil 4→second resonance capacitor 8→second switching element 7→heating coil 4 and also extends sequentially from heating coil 4→DC power source 1→first resonance capacitor 6→heating coil 4. In this mode, a resonance current is caused by the resonance of the heating coil 4 and the first and second resonance capacitors 6 and 8. After a lapse of the conducting time ton2, the second switching element 7 is turned off and the system operation shifts to Mode 4.

(Mode 4) In this mode, the first and second switching elements 5 and 7 are both turned off. The current path extends sequentially from heating coil 4→DC power source 1→first resonance capacitor 6→heating coil 4. In this stage, a current is formed by the resonance of the heating coil 4 and the first resonance capacitor 6, and the vce1 across both terminals of the first switching element 5 is lowered. When the voltage vce1 becomes vce1<0, the reverse conducting diode of the first switching element 5 is turned on and the system operation shifts to Mode 5.

(Mode 5) In this mode, the first switching element 5 is turned on and the second switching element 7 is turned off. In this stage, the current path extends sequentially from heating coil 4→DC power source 1→reverse conducting diode of first switching element 5→heating coil 4. When the current ic1 flowing through the first switching element is inverted, the system operation shifts to Mode 1.

When the induction heating cooker is operated by the operation of the inverter circuit 2 as described above, the current transformer 10 detects the input current $i_{in}$ of the inverter circuit 2, and the $i_{in}$ detection circuit 11 outputs a detection result according to the magnitude of the input current $i_{in}$ on the basis of the output from the current transformer 10. The drive circuit 9 detects the input current $i_{in}$ on the basis of the detection result outputted from the $i_{in}$ detection circuit 11, sets the conduction ratio D1 (=ton1/t0) on the basis of the value and drives the IGBT 5 and the IGBT 7.

Assuming that the voltage of the DC power source 1 is E, then the input power $P_{in}$ can be obtained according to the following equation.

$$P_{in} = \frac{1}{t_0}\int_0^{t_0} EI_{in}\,dt = E\frac{1}{t_0}\int_0^{t_0} i_{in}\,dt = Ei_{in}(ave) \tag{1}$$

wherein $i_{in}$ (ave) represents the average value of the input current $i_{in}$. Therefore, the input power $p_{in}$ can be detected by detecting the input current $i_{in}$ of the inverter circuit 2. The drive circuit 9 detects the input power $p_{in}$ on the basis of the input current $i_{in}$, compares the detected value of the input power $p_{in}$ with a control target value of the input power and controls the conduction ratio D1 so that the input power approaches the control target value on the basis of the difference. That is, the conduction ratio D1 is controlled so that it is decreased when the detected value of the input power $p_{in}$ is greater than the control target value or increased when the detected value of the input power $p_{in}$ is smaller than the control target value. As described above, the drive circuit 9 makes the IGBT 5 and the IGBT 7 alternately conductive at the constant operating frequency f0 (=1/t0), and therefore, the constant frequency operation of the inverter circuit 2 can be achieved. In this case, as the control target value, for example, a set value inputted by an operator, a specified value set inside the heating cooker or the like is used.

As described above, the present embodiment can execute the feedback control of the input power of the inverter circuit 2 by controlling the conduction ratio D1 so that the input power $p_{in}$ approaches the control target value on the basis of the detected input current $i_{in}$, thereby allowing the input power $p_{in}$ to be correctly controlled.

It is to be noted that another circuit as described in connection with the first embodiment or the second embodiment may be used as the inverter circuit 2 in the present embodiment or the subsequent embodiments.

Embodiment 4

Figure 16:
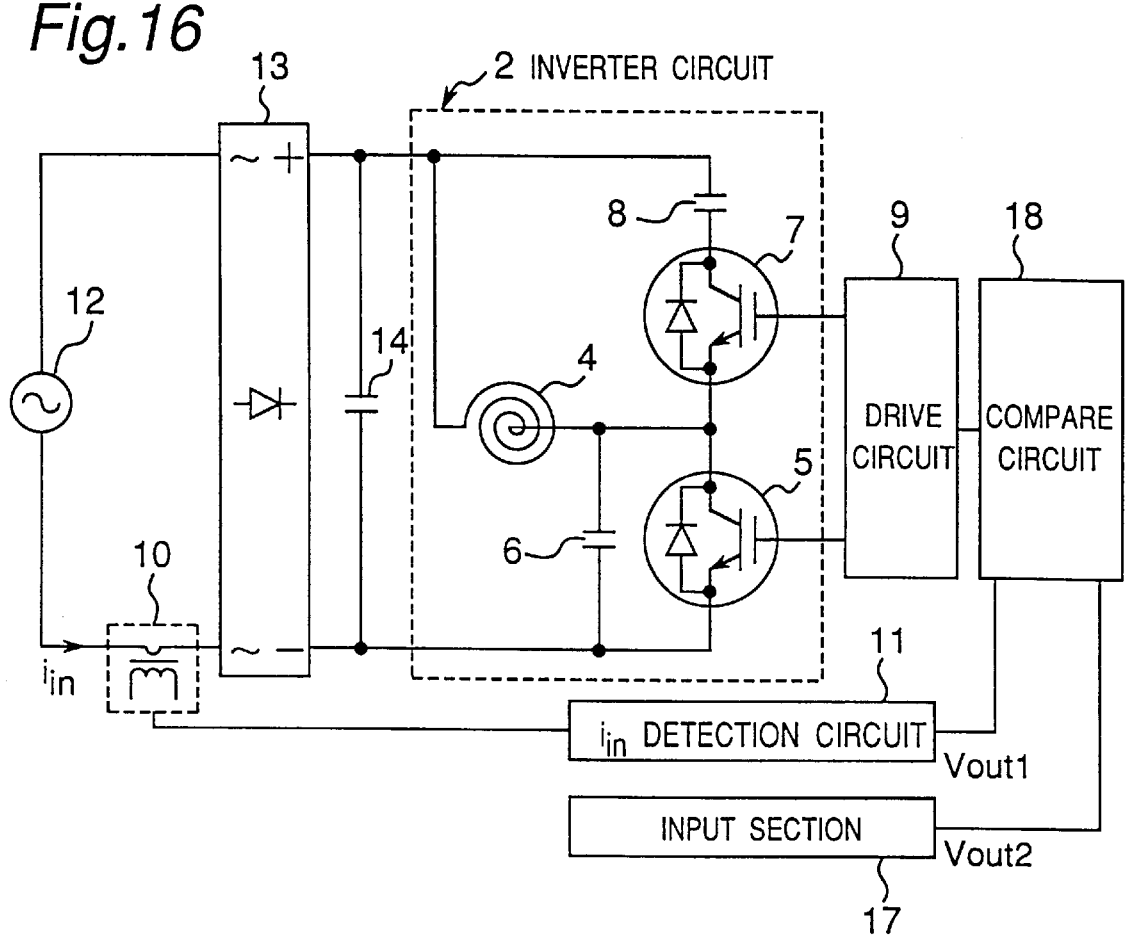
FIG. 16 is a circuit diagram of an induction heating cooker according to a fourth embodiment.

FIG. 16 shows a circuit diagram of an induction heating cooker according to a fourth embodiment. In the circuit shown in FIG. 16, an AC voltage supplied from a commercial power source 12 is rectified by a diode bridge 13, and an output from the diode bridge 13 is smoothed by a smoothing capacitor 14, thereby obtaining a DC voltage. That is, the smoothing capacitor 14 operates as a DC power source for supplying the DC voltage to an inverter circuit 2.

The inverter circuit 2 of the present embodiment has the same construction as that of the inverter circuit shown in the third embodiment. The primary side of a current transformer 10 is connected between the commercial power source 12 and the negative side of the diode bridge 13, while the secondary side of the current transformer 10 is connected to the input of an $i_{in}$ detection circuit 11. The output of the $i_{in}$ detection circuit 11 and the output of an input section 17 are connected to the input of a compare circuit 18, the output of the compare circuit 18 is connected to a drive circuit 9, and the drive circuit 9 is connected to the gates of an IGBT 5 and an IGBT 7.

Figures 17, 18:
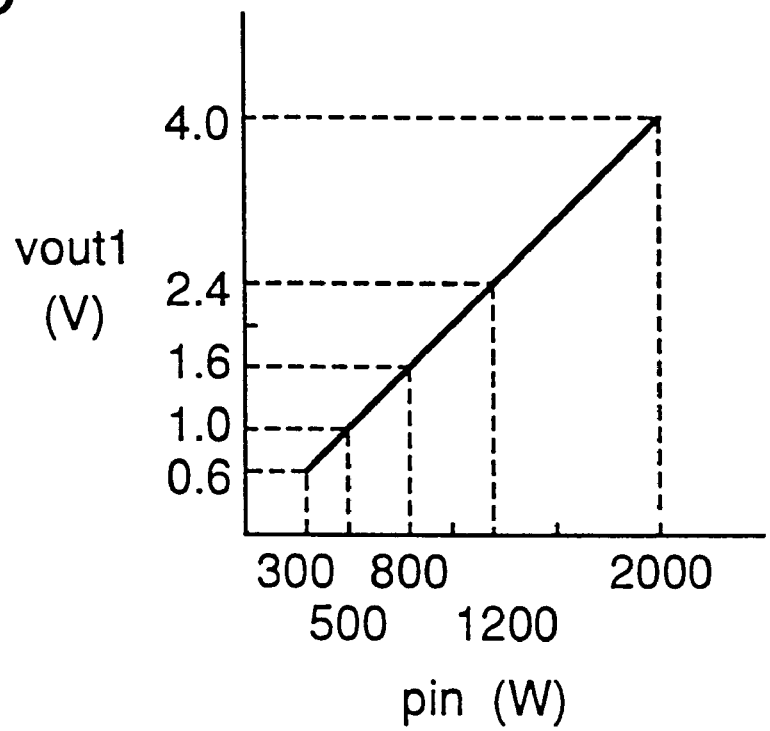
FIG. 17 is a graph of a characteristic of the input power relative to $v_{out1}$ of the induction heating cooker of the fourth embodiment.
FIG. 18 is a table showing a relationship between set values and the input power at the input section of the induction heating cooker of the fourth embodiment.

The operation of the induction heating cooker of the present embodiment constructed as above will be described with reference to FIG. 17 through FIG. 19.

When an arbitrary input power $p_{in}$ is set in the input section 17, the induction heating cooker starts its operation, by which the input section 17 outputs a specified voltage vout2 corresponding to the set value of the input power $p_{in}$. The current transformer 10 detects an input current $i_{in}$ inputted from the commercial power source 12 to the induction heating cooker, and the $i_{in}$ detection circuit 11 outputs a voltage as vout1 corresponding to the magnitude of the input current $i_{in}$. Since the input power can be detected from the input current as described before, the output voltage vout1 comes to have a value corresponding to the input power. FIG. 17 shows a relationship between the input power $p_{in}$ and the output voltage vout1 in the $i_{in}$ detection circuit 11. As shown in this graph, the magnitude of the input power $p_{in}$ is specified by the output voltage vout1. FIG. 18 shows relationships between the set values of the input power in the input section 17 and an output voltage vout2 of the input section 17 corresponding to the set values. Although the set values are in five steps in this case, the set values may be set in a greater number of steps or a smaller number of steps. FIG. 19 shows a relationship between the set values of the input power in the input section 17 and the output voltage vout2 corresponding to the set values. From the relationships shown in FIG. 18 and FIG. 19, a relationship between the set values of the input power and the output voltage vout2 of the input section 17 can be found. The compare circuit 18 compares the output voltage vout1 of the $i_{in}$ detection circuit 11 with the output voltage vout2 of the input section 17 and outputs a voltage corresponding to a difference between these output voltages to the drive circuit 9. Based on the magnitude of the difference between the set value set by the input section 17 and the detected input current value, detected by the output of the comparator circuit 18, the drive circuit 9 controls the conduction ratio D1 so that the difference decreases to drive the IGBT 5 and the IGBT 7 with the conduction ratio D1. In concrete, the drive circuit 9 executes control so as to decrease the conduction ratio D1 when the detected value of the input power based on the input current is greater than the set value of the input power and increase the conduction ratio D1 when the detected value of the input power based on the input current is smaller than the set value of the input power.

As described above, by detecting the input current $i_{in}$ and comparing the same with the input set value, feedback control of the input power can be executed, thereby allowing the input power to be correctly controlled to an input power of an arbitrary magnitude conforming to the product specifications.

Embodiment 5

Figures 19, 20:
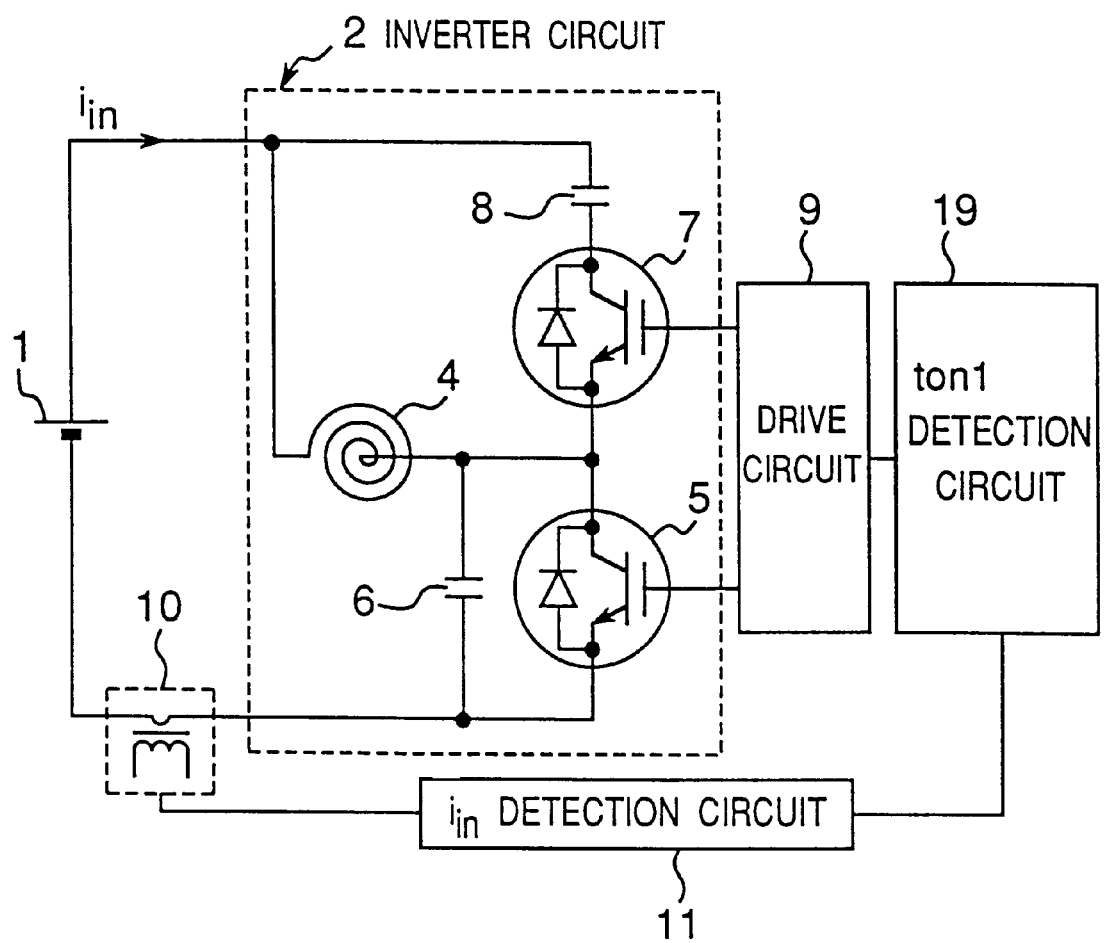
FIG. 19 is a table showing a relationship between set values and $v_{out2}$ at the input section of the induction heating cooker of the fourth embodiment.
FIG. 20 is a circuit diagram of an induction heating cooker according to a fifth embodiment.

FIG. 20 shows a circuit diagram of an induction heating cooker according to a fifth embodiment. In FIG. 20, the induction heating cooker includes: an inverter circuit 2 for converting a direct current from a DC power source 1 into a high-frequency current; a current transformer 10 and an $i_{in}$ detection circuit 11 for detecting an input current; a drive circuit 9 for controlling the inverter circuit 2; and a ton1 detection circuit 19 for detecting the conducting time of the first switching element of the inverter circuit 2. The DC power source 1, inverter circuit 2, current transformer 10 and $i_{in}$ detection circuit 11 are the same as those of the third embodiment.

The current transformer 10 is connected between the negative side of the DC power source 1 and the low-voltage side input terminal of the inverter circuit 2. The output of the $i_{in}$ detection circuit 11 is connected to the drive circuit 9. The ton1 detection circuit 19 which serves as a conducting time detecting means for detecting the conducting time ton1 of the IGBT 5 is connected to the drive circuit 9.

The operation of the induction heating cooker of the present embodiment constructed as above will be described.

Similar to the case of the third embodiment, the drive circuit 9 sets the conduction ratio D1 based on the output of the input current detecting means constructed of the current transformer 10 and the $i_{in}$ detection circuit 11 and drives the IGBT 5 and the IGBT 7 with the conduction ratio D1. That is, feedback control of the input power $p_{in}$ is executed by the input current $i_{in}$.

The ton1 detection circuit 19 detects the conducting time ton1 of the IGBT 5 and outputs a voltage corresponding to the duration of the conducting time ton1. When the drive circuit 9 executes the feedback control of the input power $p_{in}$ by the input current $i_{in}$ as described above, the drive circuit controls the conduction ratio D1 based on the conducting time ton1 of the IGBT 5 detected by the ton1 detection circuit 19 so that the input current $i_{in}$, i.e., the input power $p_{in}$ does not exceed the upper limit value determined according to the conducting time ton1 of the IGBT 5.

Figure 21:
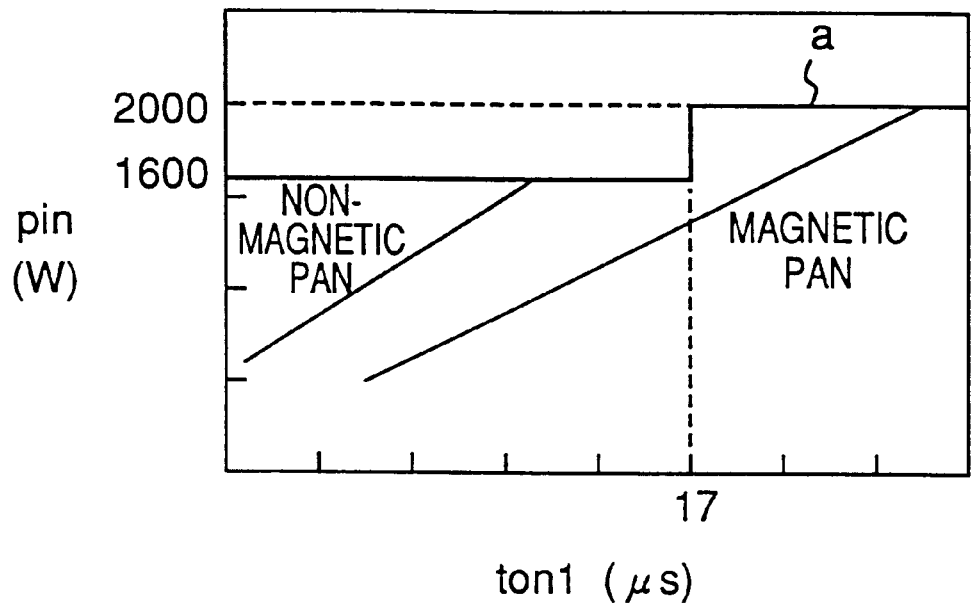
FIG. 21 is a graph of a characteristic of the conducting time relative to the input power of the first switching element of the induction heating cooker of the fifth embodiment.

FIG. 21 shows a graph of a characteristic of the conducting time ton1 of the IGBT 5 relative to the input power $p_{in}$ in the case where the load is a magnetic pan and that in the case where the load is a nonmagnetic pan. The thick solid line "a" in the graph represents the upper limit value of the input power $p_{in}$, and the upper limit value of the input power $p_{in}$ varies depending on the conducting time ton1. That is, the upper limit value is set to 2000 W when the conducting time ton1 is not smaller than 17 μs, and the upper limit value is set to 1600 W when the conducting time ton1 is smaller than 17 μs. In this case, the input power $p_{in}$ is controlled within a range of not greater than 1600 W when the load to be inductively heated is a nonmagnetic pan, and the input power $p_{in}$ is controlled within a range of not greater than 2000 W when the load is a magnetic pan.

A power loss at each element constituting the inverter circuit 2 becomes greater in the case of the nonmagnetic pan than in the case of the magnetic pan if they are compared with respect to an identical input power $p_{in}$. Therefore, by setting the upper limit value of the input power $p_{in}$ corresponding to the conducting time ton1 as shown in FIG. 21, the maximum value of the input power $p_{in}$ of the magnetic pan is limited to 2000 W and the maximum value of the input power $p_{in}$ of the nonmagnetic pan is limited to 1600 W. Consequently, regardless of whether the load is the magnetic pan or the nonmagnetic pan, the heating operation can be executed without making excessive loss at each element of the inverter circuit 2.

Figure 22:
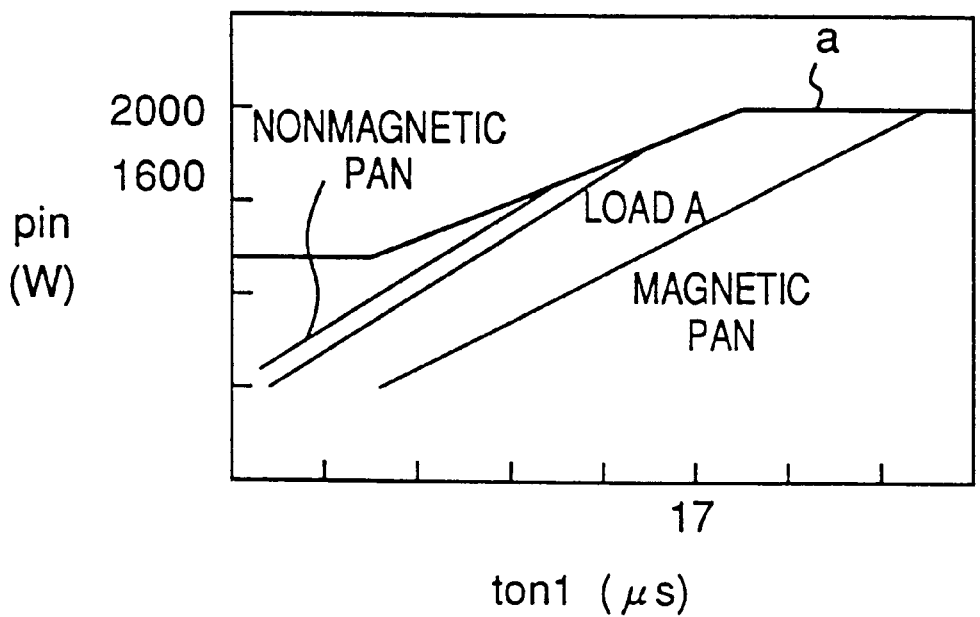
FIG. 22 is another graph of the characteristic of the conducting time relative to the input power of the first switching element of the induction heating cooker of the fifth embodiment.

The upper limit value of the input power $p_{in}$ determined for each value of the conducting time ton1 of the IGBT 5 may be set as shown in FIG. 22 or to another value. For example, when the upper limit value of the input power is set so as to smoothly vary with respect to the conducting time ton1 as shown in FIG. 22, a load A whose characteristic of input power $p_{in}$ relative to the conducting time ton1 is intermediate between that of the nonmagnetic pan and that of the magnetic pan can be heated at an optimum operating point taking both the loss of the components of the inverter circuit 2 and the upper limit value of the input power $p_{in}$ into consideration.

Embodiment 6

Figure 23:
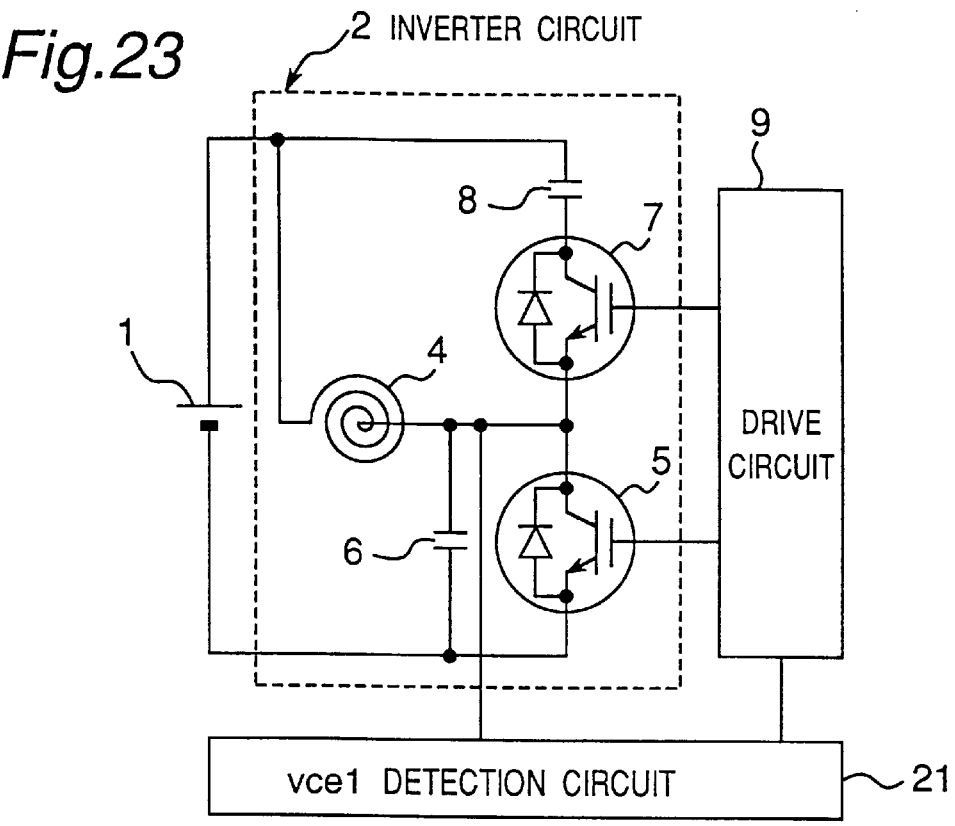
FIG. 23 is a circuit diagram of an induction heating cooker according to a sixth embodiment.

FIG. 23 shows a circuit diagram of an induction heating cooker according to a sixth embodiment.

In FIG. 23, the induction heating cooker includes: an inverter circuit 2 for converting a direct current from a DC power source 1 into a high-frequency current; a vce1 detection circuit 21 for detecting a voltage across both terminals of the first switching element of the inverter circuit 2; and a drive circuit 9 for controlling the inverter circuit 2. In FIG. 23, the DC power source 1 and the inverter circuit 2 are the same as those of the third embodiment. The vce1 detection circuit 21 is connected to the collector of the IGBT 5 which serves as the first switching element, the output of the vce1 detection circuit 21 is connected to the drive circuit 9, and the drive circuit 9 is connected to the gate terminals of the IGBT 5 and the IGBT 7.

The operation of the induction heating cooker constructed as above will be described. When the induction heating cooker operates, the vce1 detection circuit 21 detects the collector-emitter voltage vce1 of the IGBT 5 which serves as the first switching element and outputs a voltage corresponding to the magnitude of this voltage vce1. The drive circuit 9 sets the conduction ratio D1, i.e., the conducting times ton1 and ton2 of the IGBT 5 and the IGBT 7, respectively, based on the magnitude of the output voltage of the vce1 detection circuit 21, and drives the IGBT 5 and the IGBT 7 according to those conducting times.

Figure 24:
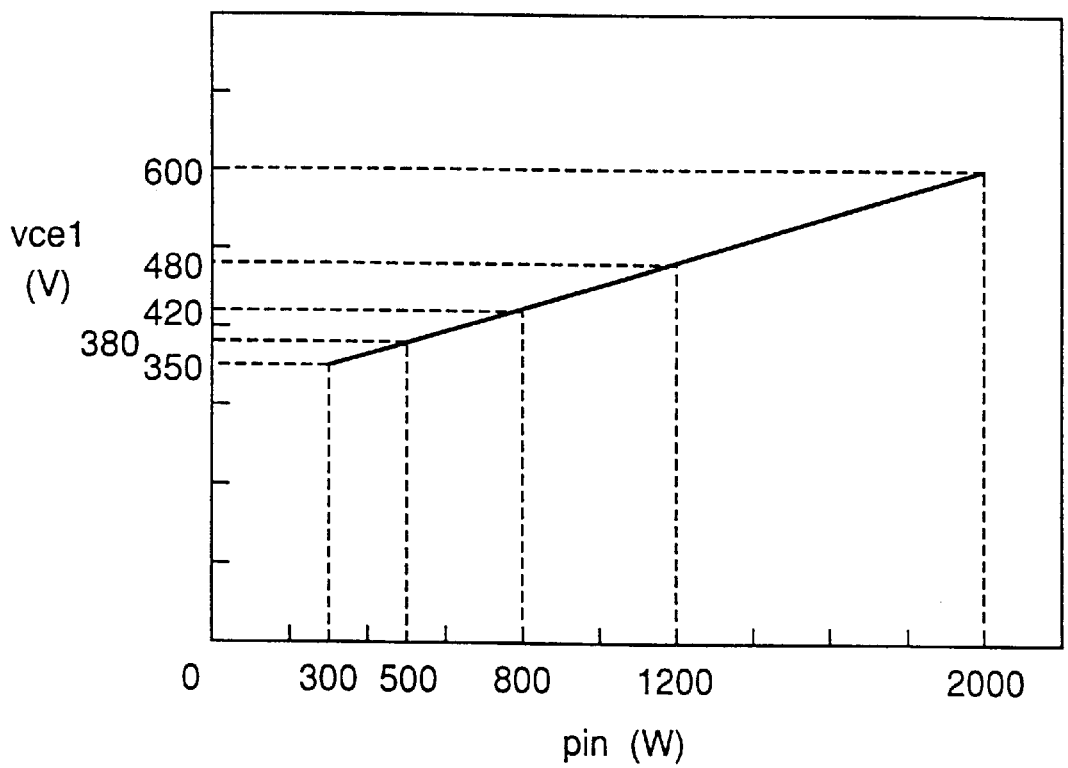
FIG. 24 is a graph of a characteristic of the input power relative to the voltage across both terminals of the first switching element of the induction heating cooker of the sixth embodiment.

The characteristic of the collector-emitter voltage vce1 relative to the input power $p_{in}$ of the induction heating cooker becomes as shown in FIG. 24. From this characteristic, the vce1 detection circuit 21 can indirectly detect the input power $p_{in}$ by detecting the voltage across both terminals of the first switching element in the operating stage, i.e., the collector-emitter voltage vce1 of the IGBT 5. The drive circuit 9 varies the conduction ratio of the IGBT 5 and 7 based on the magnitude of the collector-emitter voltage vce1 of the IGBT 5 detected by the vce1 detection circuit 21. Therefore, the feedback control of the input power $p_{in}$ by the collector-emitter voltage vce1 of the IGBT 5 can be executed, so that the input power $p_{in}$ can be correctly controlled with respect to the control target value of the input power similar to the third embodiment.

Embodiment 7

Figure 25:
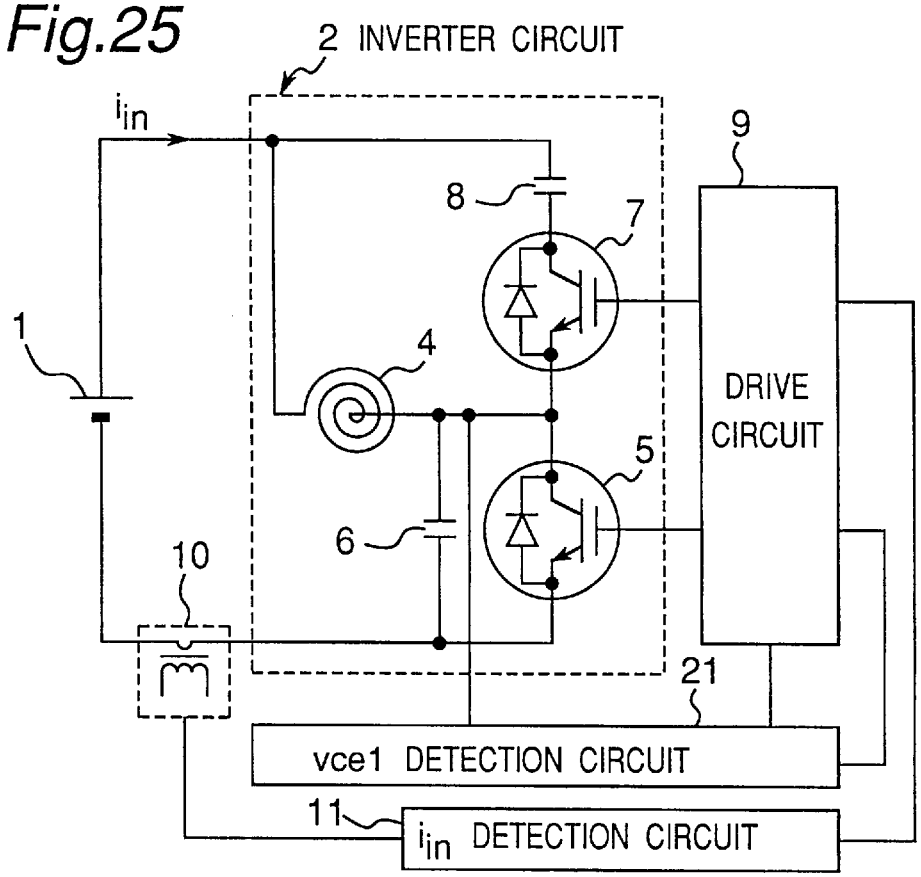
FIG. 25 is a circuit diagram of an induction heating cooker according to a seventh embodiment.

FIG. 25 shows a circuit diagram of an induction heating cooker according to a seventh embodiment.

In FIG. 25, the induction heating cooker includes: an inverter circuit 2 for converting a direct current from a DC power source 1 into a high-frequency current; a vce1 detection circuit 21 for detecting a voltage across both terminals of the first switching element 5 of the inverter circuit 2; a current transformer 10 and an $i_{in}$ detection circuit 11 for detecting an input current flowing into the inverter circuit 2;

and a drive circuit 9 for controlling the inverter circuit 2. In this case, the DC power source 1, inverter circuit 2, current transformer 10 and $i_{in}$ detection circuit 11 are the same as those of the third embodiment. The vce1 detection circuit 21 is the same as that of the sixth embodiment. The output of the vce1 detection circuit 21 and the output of the $i_{in}$ detection circuit 11 are both connected to the drive circuit 9.

The operation of the induction heating cooker constructed as above will be described.

The input current detecting means constructed of the current transformer 10 and the $i_{in}$ detection circuit 11 detects the input current $i_{in}$ of the inverter circuit 2, while the $i_{in}$ detection circuit 11 outputs a voltage corresponding to the magnitude of the input current $i_{in}$. The vce1 detection circuit 21 detects the voltage across both terminals of the first switching element, i.e., the collector-emitter voltage vce1 of the IGBT 5 and outputs a voltage corresponding to the magnitude of the collector-emitter voltage vce1 of the IGBT 5. The drive circuit 9 drives the IGBT 5 and the IGBT 7 based on both the values of the output voltage of the $i_{in}$ detection circuit 11 and the output voltage of the vce1 detection circuit 21. That is, when the collector-emitter voltage vce1 of the IGBT 5 detected by the vce1 detection circuit 21 is lower than a predetermined voltage (assumed to be 700 V in this case), the drive circuit 9 controls the inverter circuit 2 based on the output of the $i_{in}$ detection circuit 11. That is, the feedback control of the input power $p_{in}$ is executed by the input current $i_{in}$. When the voltage vce1 detected by the vce1 detection circuit 21 is 700 V, the drive circuit 9 controls the inverter circuit 2 based on the output of the vce1 detection circuit 21. That is, when the voltage vce1 detected by a vce1 detection circuit 21 becomes 700 V, the drive circuit 9 limits the conduction ratio D1 so that the voltage vce1 does not exceed 700 V. That is, when the voltage vce1 becomes 700 V, the conduction ratio D1 is decreased so that the voltage vce1 does not exceed 700 V.

Figure 26:
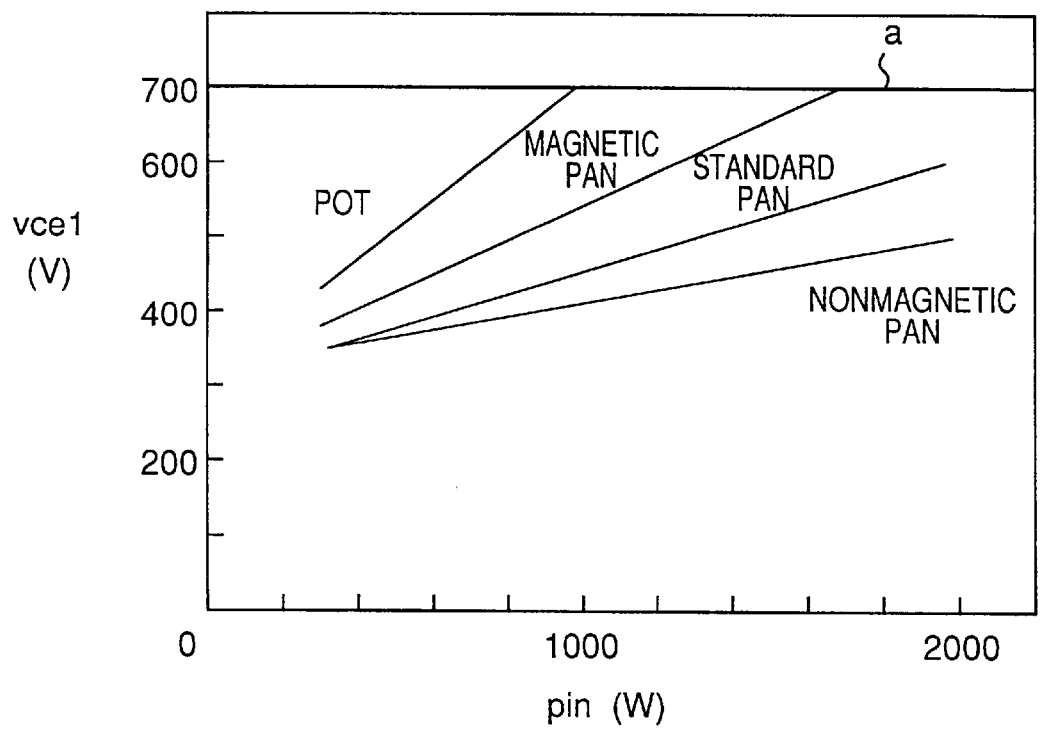
FIG. 26 is a graph of a characteristic of the input power relative to the voltage across both terminals of the first switching element of the induction heating cooker of the seventh embodiment.

FIG. 26 shows the characteristic of the collector-emitter voltage vce1 of the IGBT 5 relative to the input power $p_{in}$ with respect to a type of load. As shown in this graph, the collector-emitter voltage vce1 of the IGBT 5, i.e., the voltage across both terminals of the first switching element does not exceed 700 V regardless of the type of the load, and therefore, the inverter circuit 2 can assure a safe operating state.

Embodiment 8

Figure 27:
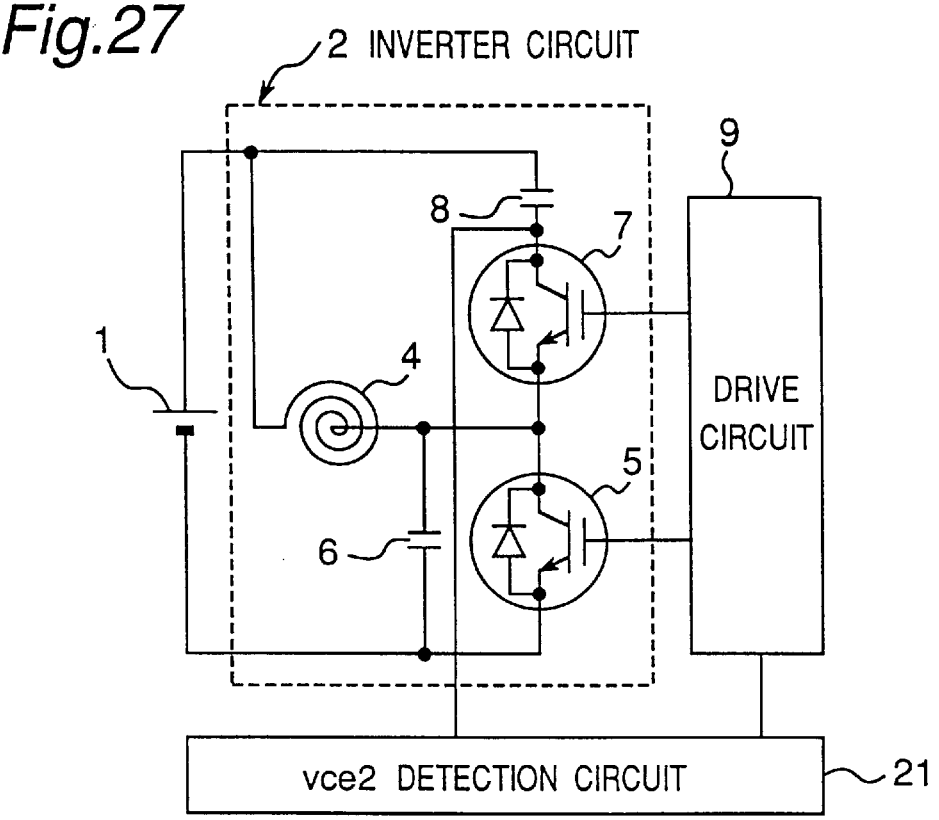
FIG. 27 is a circuit diagram of an induction heating cooker according to an eighth embodiment.

FIG. 27 shows a circuit diagram of an induction heating cooker according to an eighth embodiment.

In FIG. 27, the induction heating cooker includes: an inverter circuit 2 for converting a direct current from a DC power source 1 into a high-frequency current; a vce2 detection circuit 24 for detecting a voltage across both terminals of the second switching element 7 of the inverter circuit 2; and a drive circuit 9 for controlling the inverter circuit 2. In this case, the DC power source 1 and the inverter circuit 2 are the same as those of the third embodiment. The input of the vce2 detection circuit 24 is connected to the collector of the IGBT 7, the output of the vce2 detection circuit 24 is connected to the drive circuit 9, and the drive circuit 9 is connected to the gates of the IGBT 5 and the IGBT 7 respectively.

The operation of the induction heating cooker constructed as above will be described.

When the induction heating cooker operates, the vce2 detection circuit 24 detects the collector-emitter voltage vce2 of the IGBT 7 based on the collector potential of the IGBT 7 which serves as the second switching element 7 and outputs a voltage corresponding to the magnitude of the voltage vce2. The drive circuit 9 sets the conducting times ton1 and ton2 of the IGBT 5 and the IGBT 7 respectively based on the magnitude of the output voltage of the vce2 detection circuit 24 and drives the IGBT 5 and the IGBT 7 according to those conducting times ton1 and ton2.

Figure 28:
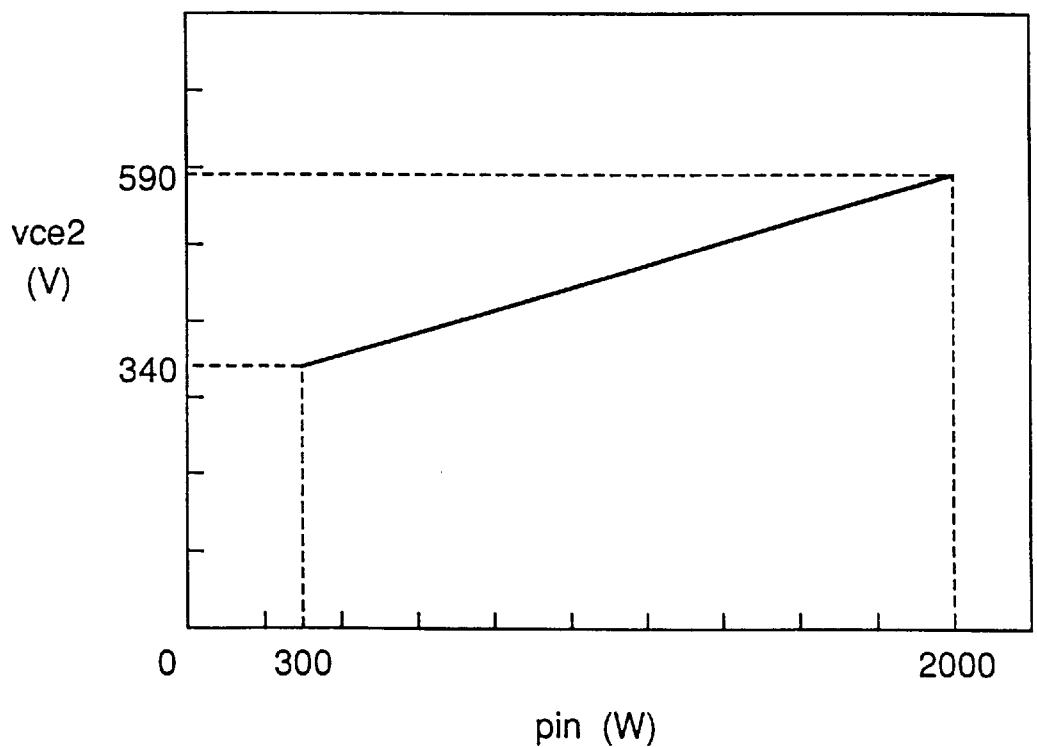
FIG. 28 is a graph of a characteristic of the input power relative to the voltage across both terminals of the second switching element of the induction heating cooker of the eighth embodiment.

FIG. 28 shows the characteristic of the collector-emitter voltage vce2 of the IGBT 7 relative to the input power $p_{in}$ of the present induction heating cooker. The drive circuit 9 is able to indirectly detect the input $p_{in}$ by the magnitude of the voltage vce2 detected by the vce2 detection circuit 24, execute feedback control of the input power $p_{in}$ by the voltage vce2 across both terminals of the second switching element 7 and correctly control the input power $p_{in}$ of the induction heating cooker similar to the third embodiment.

Embodiment 9

Figure 29:
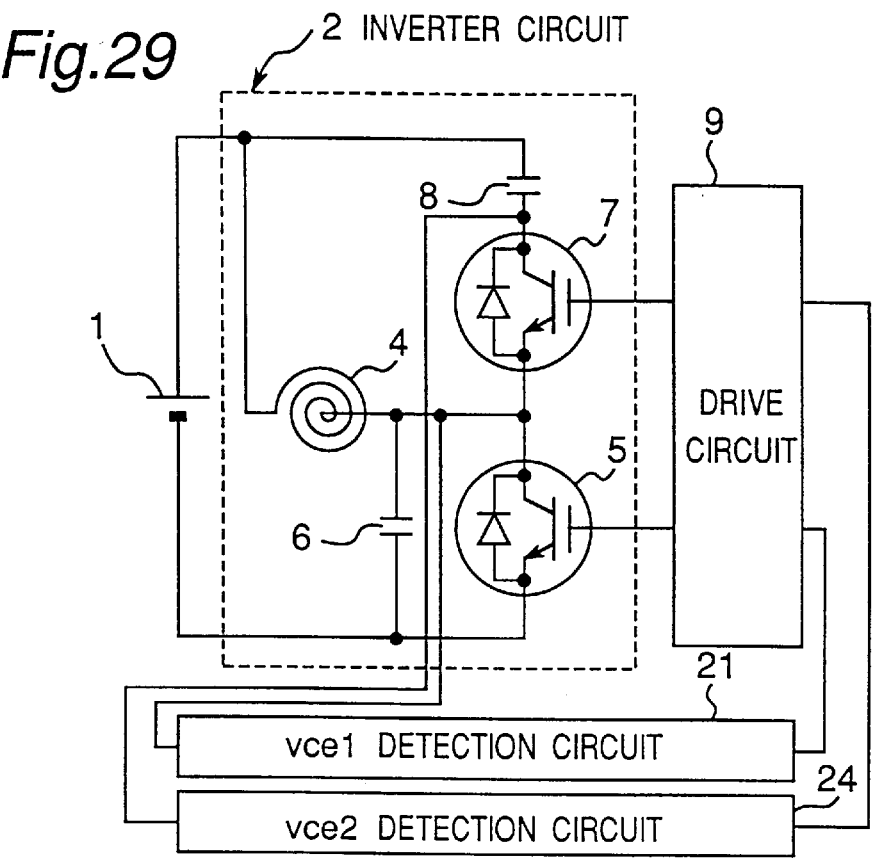
FIG. 29 is a circuit diagram of an induction heating cooker according to a ninth embodiment.

FIG. 29 shows a circuit diagram of an induction heating cooker according to a ninth embodiment.

In FIG. 29, the induction heating cooker includes: an inverter circuit 2 for converting a direct current from a DC power source 1 into a high-frequency current; a vce1 detection circuit 21 for detecting a voltage across both terminals of the first switching element 5 of the inverter circuit 2; a vce2 detection circuit 24 for detecting a voltage across both terminals of the second switching element 7 of the inverter circuit 2; and a drive circuit 9 for controlling the inverter circuit 2. In this case, the DC power source 1 and the inverter circuit 2 are the same as those of the first embodiment. The vce1 detection circuit 21 is the same as that of the sixth embodiment, while the vce2 detection circuit 24 is the same as that of the eighth embodiment.

The input of the vce1 detection circuit 21 is connected to the collector of the IGBT 5 which serves as the first switching element, and the input of the vce2 detection circuit 24 is connected to the collector of the IGBT 7 which serves as the second switching element 7. The output of the vce1 detection circuit 21 and the output of the vce2 detection circuit 24 are both connected to the drive circuit 9, and the drive circuit 9 is connected to the gates of the IGBT 5 and the IGBT 7 respectively.

The operation of the induction heating cooker constructed as above will be described.

The vce1 detection circuit 21 detects the collector-emitter voltage vce1 of the IGBT 5 and outputs a voltage corresponding to the magnitude of the voltage vce1. The vce2 detection circuit 24 detects the collector-emitter voltage vce2 of the IGBT 7 and outputs a voltage corresponding to the magnitude of the voltage vce2. The drive circuit 9 receives the output of the vce1 detection circuit 21 and the output of the vce2 detection circuit 24, sets the conducting times ton1 and ton2 of the IGBT 5 and the IGBT 7, respectively, based on these two outputs and drives the IGBT 5 and the IGBT 7 according to those conducting times ton1 and ton2.

Figure 30:
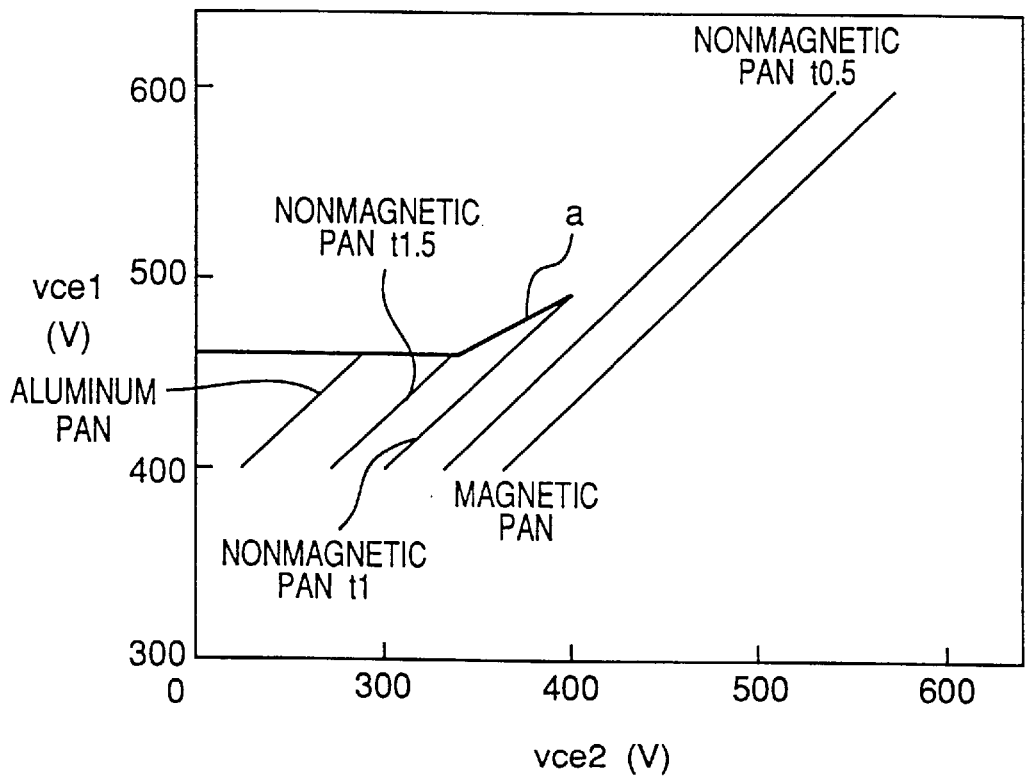
FIG. 30 is a graph of a characteristic of the voltage across both terminals of the second switching element relative to the voltage across both terminals of the first switching element of the induction heating cooker of the ninth embodiment.

FIG. 30 shows the characteristic of the voltage vce2 across both terminals of the second switching element relative to the voltage vce1 across both terminals of the first switching element with respect to a type of load. In this graph, the thick solid line "a" represents the upper limit value of the voltage across both terminals of the first switching element 5. The drive circuit 9 monitors the voltage vce1 and the voltage vce2, and controls the conduction ratio D1 so as to decrease the ratio D1 when the value of the voltage vce1 exceeds the upper limit value shown in FIG. 30.

As shown in FIG. 30, a magnetic pan and a nonmagnetic pan t0.5 are not limited by the present control, whereas a nonmagnetic pan t1, a nonmagnetic pan t1.5 and an aluminum pan are limited by the value of the thick solid line "a" shown in FIG. 30. In this case, "t" denotes the thickness of each pan; where the greater the value t is, the greater the thickness of each pan is.

By setting the upper limit value of the voltage vce1 as shown in FIG. 30, the drive circuit 9 can operate without limiting the input power $p_{in}$ with regard to the magnetic pan and the nonmagnetic pan t0.5 having a pan bottom thickness of 0.5 mm, where the loss of the components of the inverter circuit 2 is relatively small. The power loss at each element inside the circuit increases according to the input power, and therefore, the power loss at each element of the inverter circuit 2 becomes relatively great for the aluminum pan, the nonmagnetic pan t1.5 and the nonmagnetic pan t1. With regard to these pans, the upper limit of the input power $p_{in}$ is limited by the upper limit value of the voltage vce1 set according to the voltage vce2, and therefore, the loss at each element can be suppressed.

Embodiment 10

Figure 31:
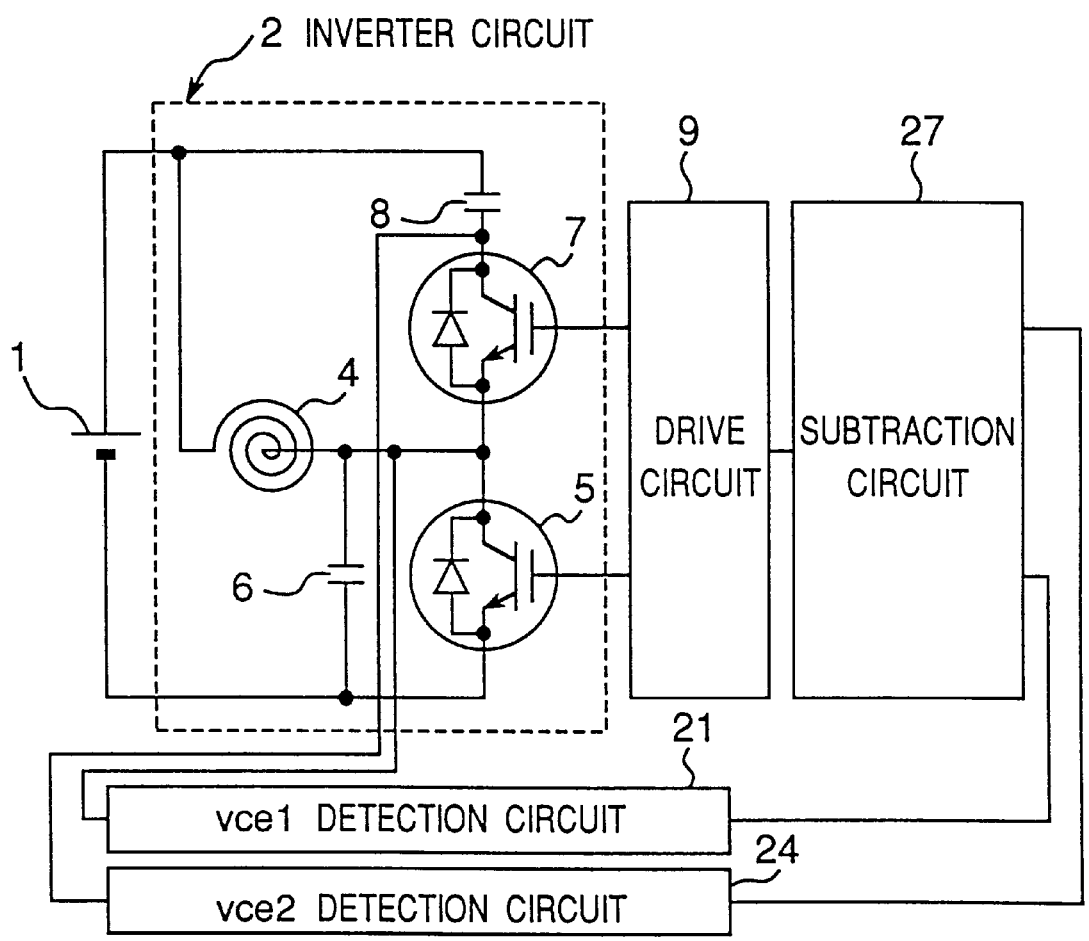
FIG. 31 is a circuit diagram of an induction heating cooker according to a tenth embodiment.

FIG. 31 shows a circuit diagram of an induction heating cooker according to a tenth embodiment.

In FIG. 31, the induction heating cooker includes: an inverter circuit 2 for converting a direct current from a DC power source 1 into a high-frequency current; a vce1 detection circuit 21 for detecting a voltage across both terminals of the first switching element 5 of the inverter circuit 2; a vce2 detection circuit 24 for detecting a voltage across both terminals of the second switching element 7 of the inverter circuit 2; a subtraction circuit 27 for outputting a difference between the voltage across both terminals of the first switching element 5 and the voltage across both terminals of the second switching element 7; and a drive circuit 9 for controlling the inverter circuit 2. In FIG. 31, the DC power source 1 and the inverter circuit 2 are the same as those of the third embodiment, while the vce1 detection circuit 21 and the vce2 detection circuit 24 are the same as those of the ninth embodiment. The input of the vce2 detection circuit 24 is connected to the collector terminal of the IGBT 7. The input of the vce1 detection circuit 21 is connected to the collector terminal of the IGBT 5. The output of the vce1 detection circuit 21 and the output of the vce2 detection circuit 24 are both connected to the subtraction circuit 27. The output of the subtraction circuit 27 is connected to the drive circuit 9.

The operation of the induction heating cooker constructed as above will be described.

Figure 32:
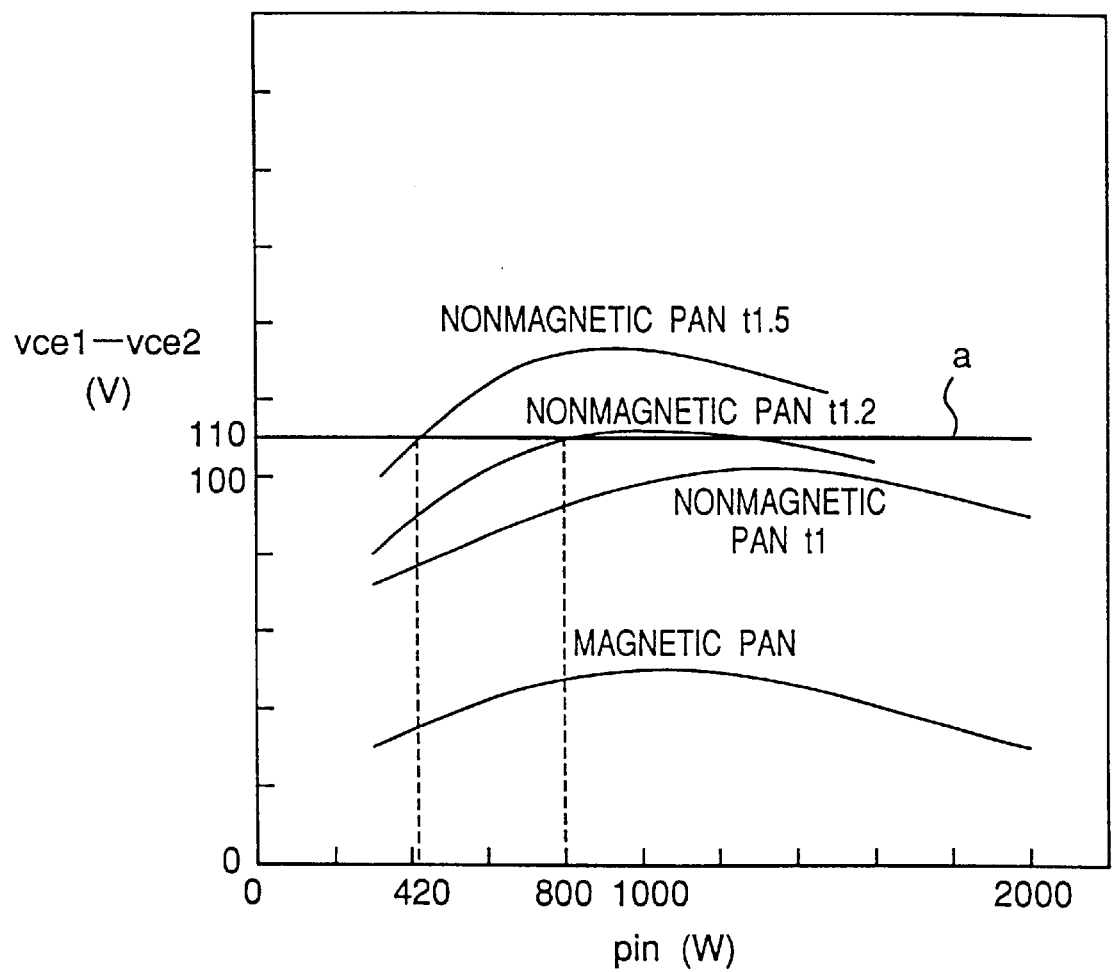
FIG. 32 is a graph of a characteristic of the input power relative to the voltage difference between the voltages across both terminals of the switching elements of the induction heating cooker of the tenth embodiment.

The vce1 detection circuit 21 detects the collector-emitter voltage vce1 of the IGBT 5 and outputs a voltage corresponding to the magnitude of the voltage vce1. The vce2 detection circuit 24 detects the collector-emitter voltage vce2 of the IGBT 7 and outputs a voltage corresponding to the magnitude of the voltage vce2. The subtraction circuit 27 outputs a value corresponding to the magnitude of the difference between the output of the vce1 detection circuit 21 and the output of the vce2 detection circuit 24, while the drive circuit 9 controls the driving of the IGBT 5 and the IGBT 7 based on the output of the subtraction circuit 27. FIG. 32 shows a graph of the characteristic of a input power $p_{in}$ relative to switching element voltage difference (vce1-vce2) with respect to a type of load. In this graph, the thick solid line "a" represents the upper limit value of the voltage difference (vce1-vce2) between the voltage vce1 across both terminals of the first switching element and the voltage vce2 across both terminals of the second switching element. As shown in this graph, the voltage difference (vce1-vce2) relative to an identical input power $p_{in}$ is greater in the case of the nonmagnetic pan than in the case of the magnetic pan. The voltage difference (vce1-vce2) becomes greater as the pan bottom thickness increases in the case of the nonmagnetic pan. On the other hand, the loss of the components in the inverter circuit 2 is greater in the case of the nonmagnetic than in the case of the magnetic pan and becomes greater as the pan bottom thickness increases in the case of the nonmagnetic pan. In the induction heating cooker of the present embodiment, by limiting the voltage difference (vce1-vce2) to the upper limit value (110 V), the input power $p_{in}$ can be suppressed with regard to a nonmagnetic pan t1.2 and a nonmagnetic pan t1.5, as a consequence of which the power loss at each element of the inverter circuit 2 can be suppressed.

Embodiment 11

Figure 33:
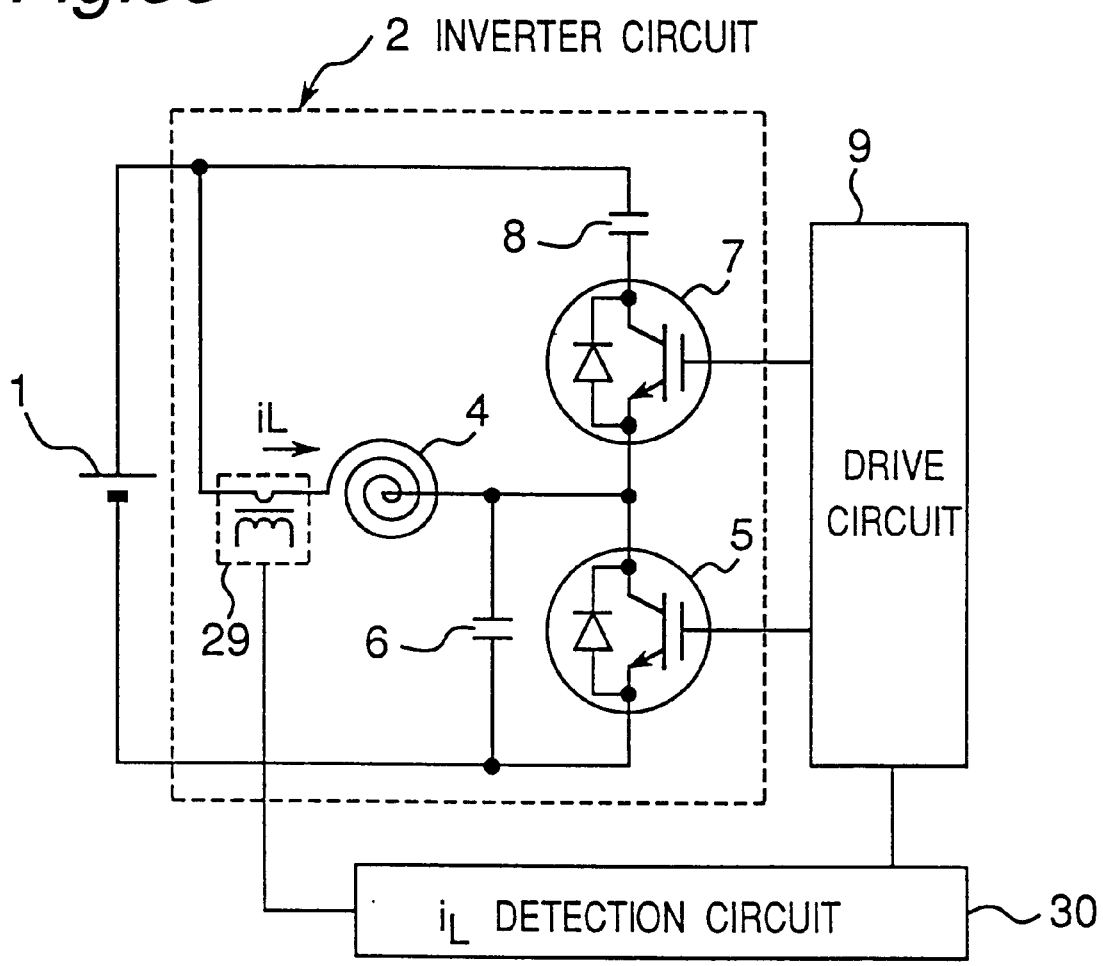
FIG. 33 is a circuit diagram of an induction heating cooker according to an eleventh embodiment.

FIG. 33 shows a circuit diagram of an induction heating cooker according to an eleventh embodiment.

In FIG. 33, the induction heating cooker includes: an inverter circuit 2 for converting a direct current from a DC power source 1 into a high-frequency current; a current transformer 29 and an $i_L$ detection circuit 30 for detecting a current flowing through a heating coil; and a drive circuit 9 for controlling the inverter circuit 2. In FIG. 33, the DC power source 1 and the inverter circuit 2 are the same as those of the third embodiment. The current transformer 29 is connected in series with the heating coil 4, and the secondary side of the current transformer 29 is connected to the $i_L$ detection circuit 30. The output of the $i_L$ detection circuit 30 is connected to the drive circuit 9, and the drive circuit 9 is connected to the gates of the IGBT 5 and the IGBT 7.

The operation of the induction heating cooker constructed as above will be described.

The current transformer 29 and the $i_L$ detection circuit 30 constitute a heating coil current detecting means. The current transformer 29 detects the current of the heating coil 4, while the $i_L$ detection circuit 30 outputs a voltage corresponding to the magnitude of the current of the heating coil 4 detected by the current transformer 29. The drive circuit 9 sets the conducting times ton1 and ton2 of the IGBT 5 and the IGBT 7 based on the magnitude of the output voltage of the $i_L$ detection circuit 30 and drives the IGBT 5 and the IGBT 7 according to the conducting times.

Figure 34:
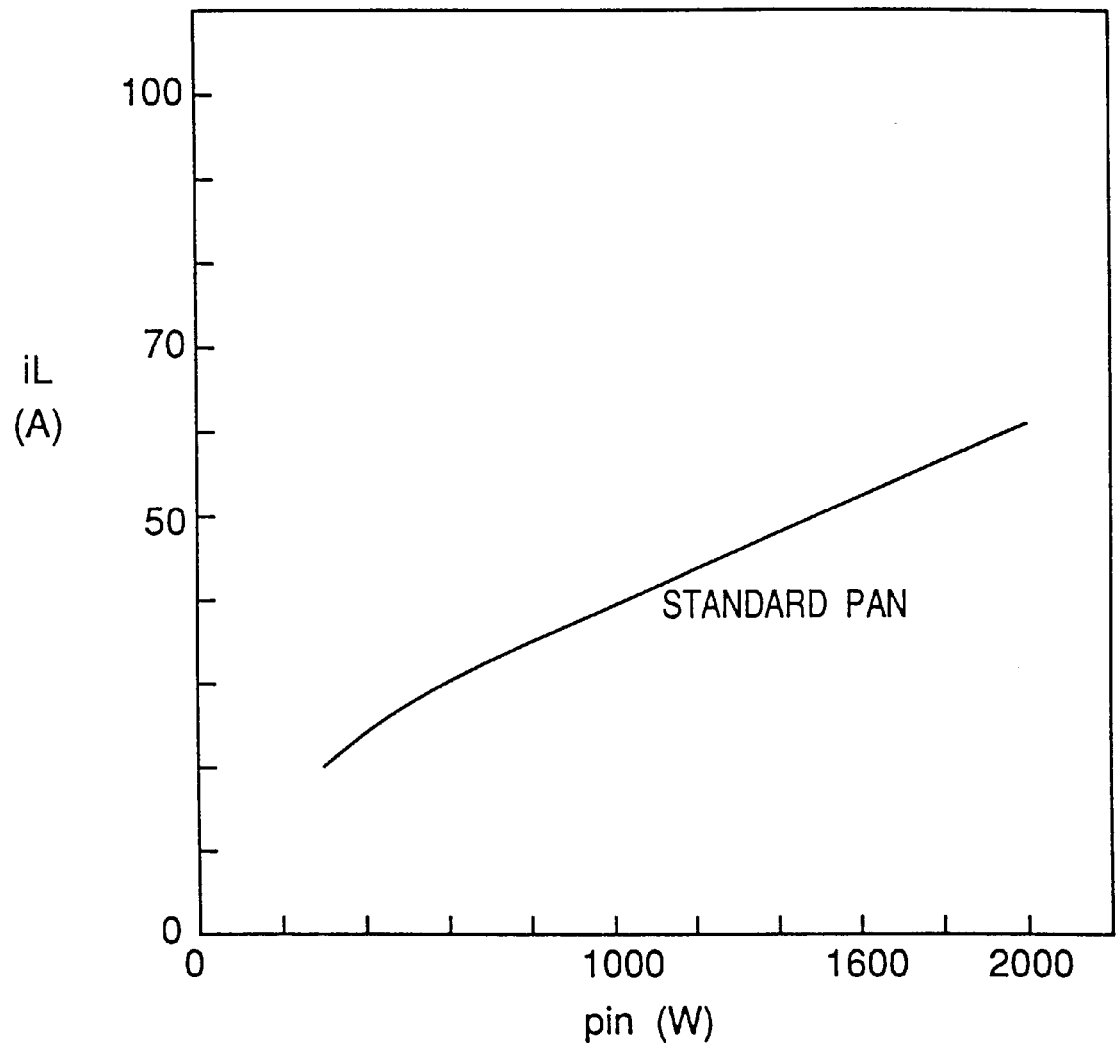
FIG. 34 is a graph of a characteristic of the input power relative to the heating coil current of the induction heating cooker of the eleventh embodiment.

FIG. 34 shows the characteristic of the current $i_L$ of the heating coil 4 relative to the input power $p_{in}$ of a standard pan. The drive circuit 9 is able to indirectly detect the input power $p_{in}$ by the magnitude of the current $i_L$ of the heating coil 4 detected by the current transformer 29 and the $i_L$ detection circuit 30 and execute feedback control of the input power $p_{in}$ by the current $i_L$ by varying the conduction ratio of the IGBT 5 and the IGBT 7 based on the magnitude of the current $i_L$ of the heating coil 4, so that the input power $p_{in}$ of the induction heating cooker can be correctly controlled similar to the third embodiment.

The drive circuit 9 detects the input power $p_{in}$ based on the current $i_L$ of the heating coil 4, compares this detection value of $p_{in}$ with a control target value of the input power and controls the conduction ratio D1 so that the input power approaches the control target value based on the difference. That is, the conduction ratio D1 is controlled in a direction in which it is decreased when the detection value $p_{in}$ of the input power is greater than the control target value, and the conduction ratio D1 is controlled in a direction in which it is increased when the detection value $p_{in}$ of the input power is smaller than the control target value.

Figure 35:
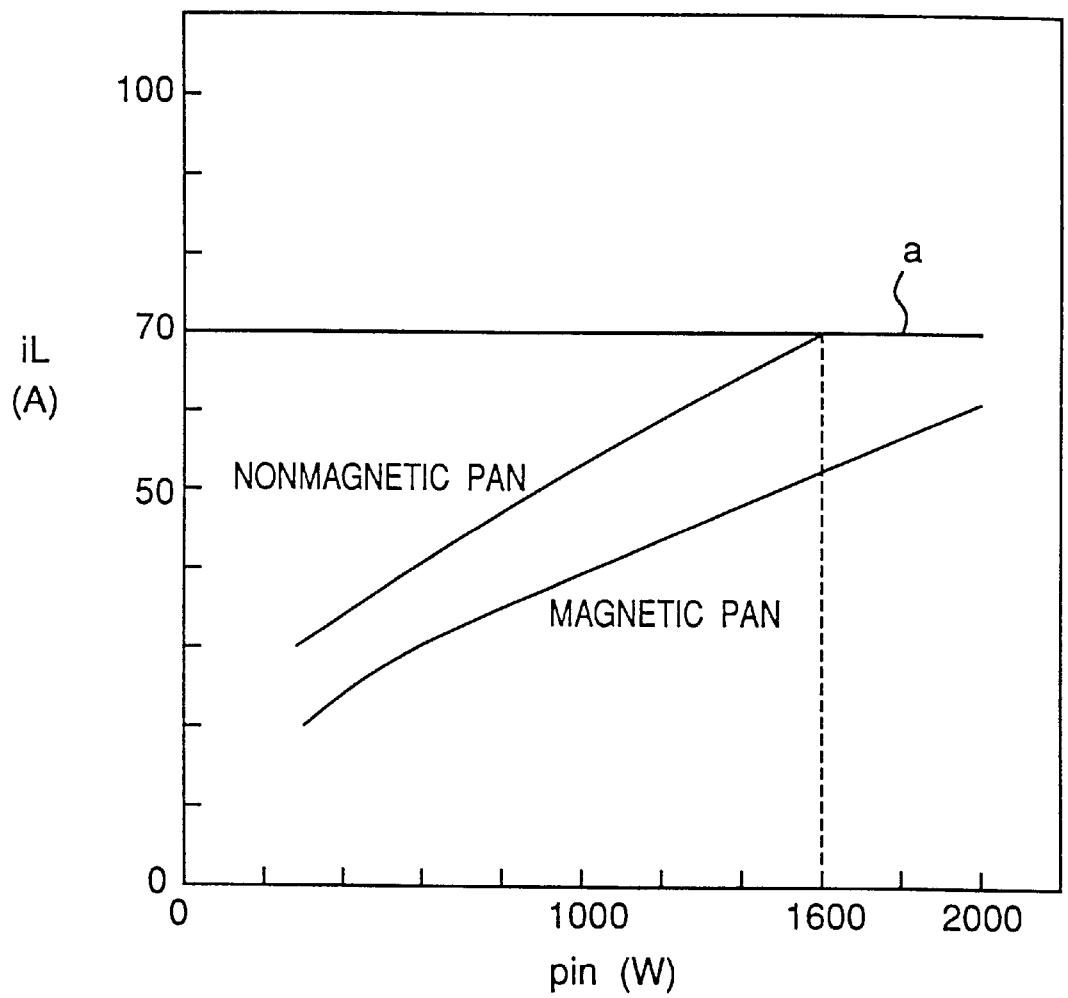
FIG. 35 is another graph of the characteristic of the input power relative to the heating coil current of the induction heating cooker of the eleventh embodiment.

FIG. 35 shows the characteristic of the current $i_L$ of the heating coil 4 relative to the input power $p_{in}$ in the case where the load is a magnetic pan or a nonmagnetic pan. As shown in the graph, the drive circuit 9 sets the upper limit value of the current $i_L$. That is, the drive circuit 9 detects the magnitude of the current $i_L$ from the output of the $i_L$ detection circuit 30 during the feedback control of the input power $p_{in}$ and controls the conduction ratio D1 so that the current $i_L$ does not exceed the upper limit indicated by the thick solid line "a" in FIG. 35. Therefore, in the induction heating cooker of the present embodiment, the upper limit value of the current $i_L$ is limited to 70 A as shown in FIG. 35, and therefore, the input power $p_{in}$ of the nonmagnetic pan can be suppressed to 1600 W, so that the loss of the inverter circuit 2 can be suppressed.

Embodiment 12

Figure 36:
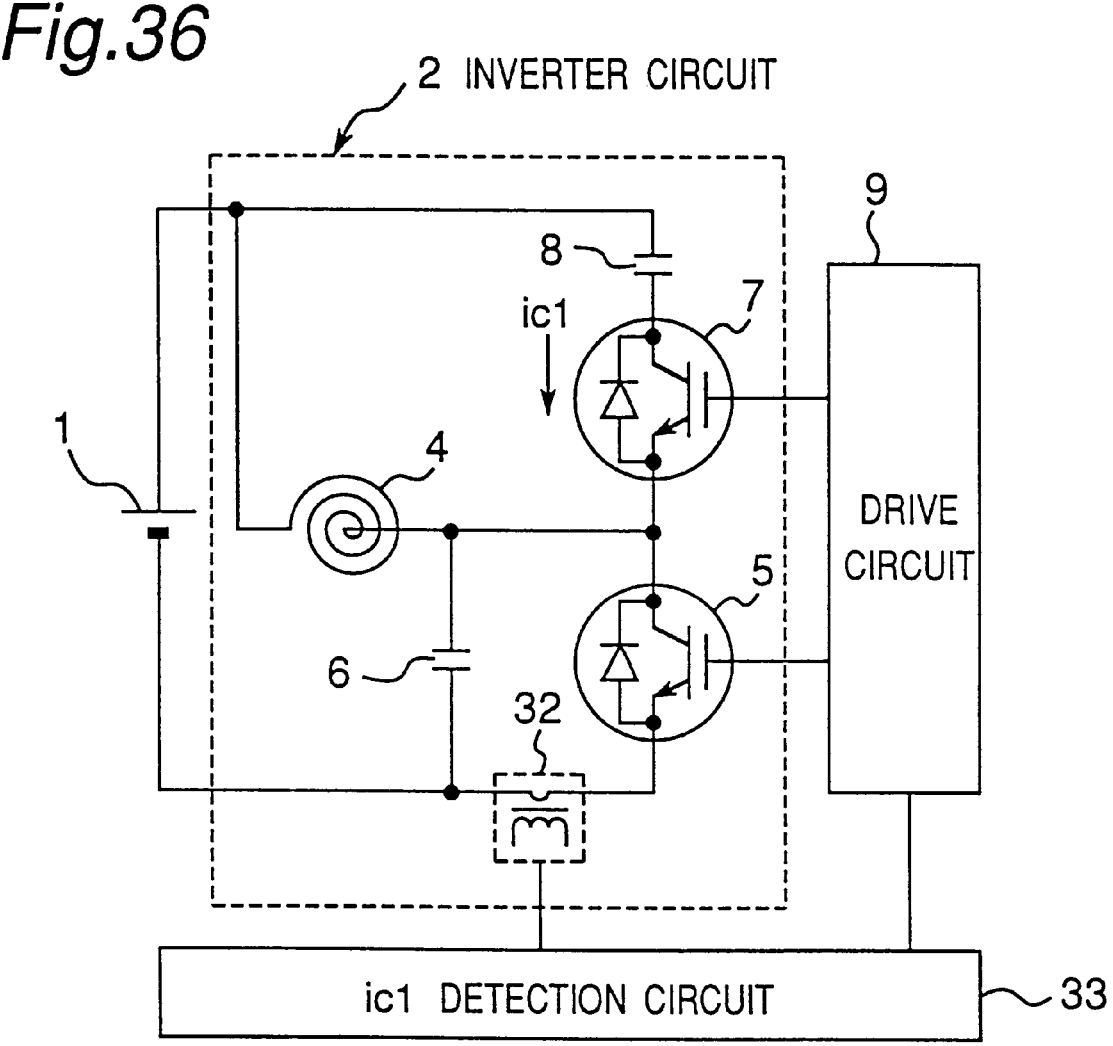
FIG. 36 is a circuit diagram of an induction heating cooker according to a twelfth embodiment.

FIG. 36 shows a circuit diagram of an induction heating cooker according to a twelfth embodiment.

In FIG. 36, the induction heating cooker includes: an inverter circuit 2 for converting a direct current from a DC power source 1 into a high-frequency current; a current transformer 32 and an ic1 detection circuit 33 for detecting a current flowing through the first switching element 5; and a drive circuit 9 for controlling the inverter circuit 2. In this case, the DC power source 1 and the inverter circuit 2 are the same as those of the third embodiment. The current transformer 32 is connected in series with the IGBT 5, and the secondary side of the current transformer 32 is connected to the input of the ic1 detection circuit 33. The output of the ic1 detection circuit 33 is connected to the drive circuit 9, and the drive circuit 9 is connected to the gates of the IGBT 5 and the IGBT 7 respectively. The current transformer 32 and the ic1 detection circuit 33 constitute a first switching element current detecting means.

The induction heating cooker of the present embodiment constructed as above executes feedback control of the input power $p_{in}$ by detecting the input power $p_{in}$ based on the collector current of the IGBT 5 which serves as the first switching element. The operation will be described below.

The current transformer 32 detects the collector current ic1 of the IGBT 5, and the ic1 detection circuit 33 outputs a voltage corresponding to the magnitude of the current ic1 based on the detection result of the current transformer 32. The drive circuit 9 sets the conducting times ton1 and ton2 of the IGBT 5 and the IGBT 7 based on the magnitude of the output voltage of the ic1 detection circuit 33, drives the IGBT 5 and the IGBT 7 according to the conducting times, respectively, and operates the inverter circuit 2.

Figure 37:
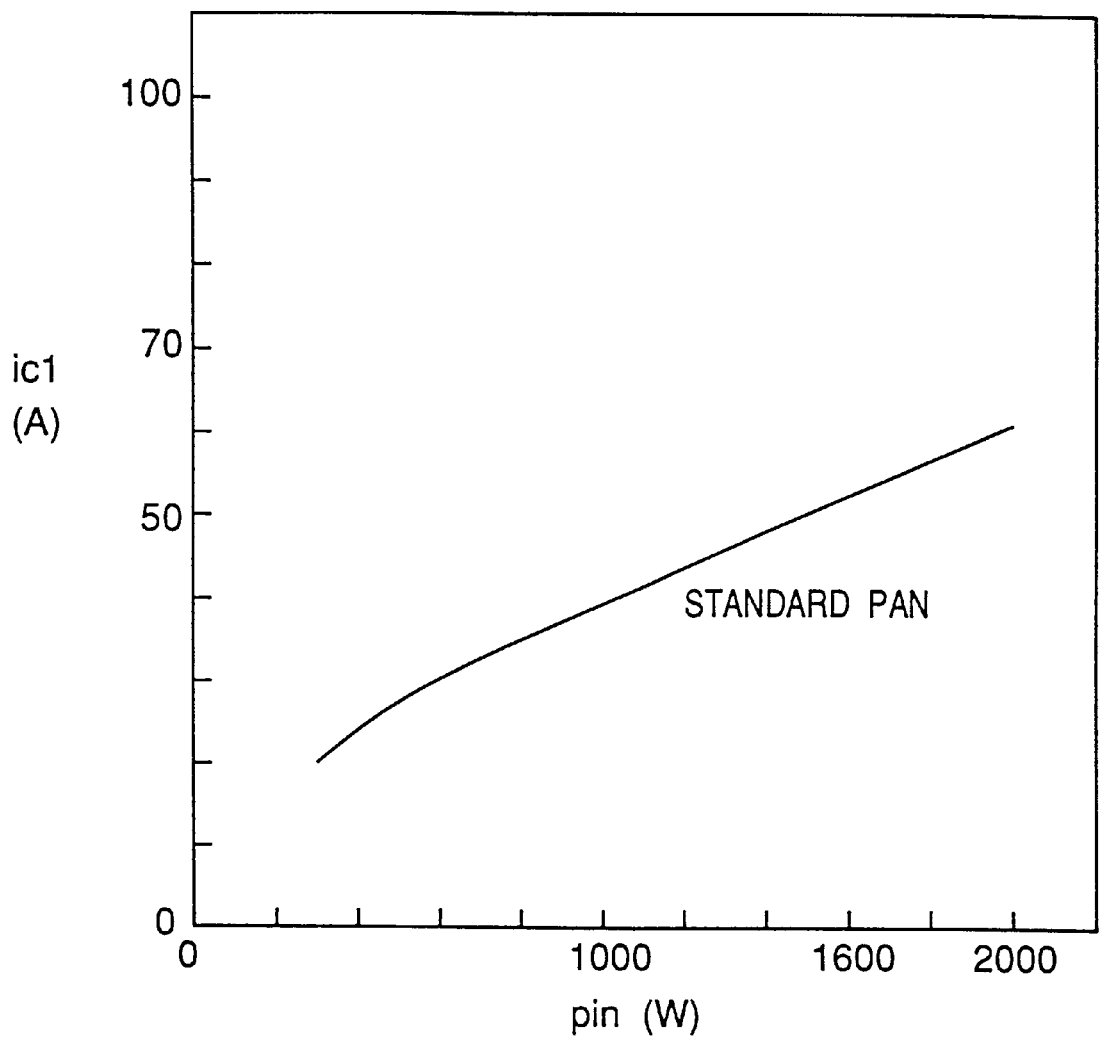
FIG. 37 is a graph of a characteristic of the input power relative to the current of the first switching element of the induction heating cooker of the twelfth embodiment.

The characteristic of the collector current ic1 of the IGBT 5 relative to the input power $p_{in}$ for the standard load is shown in FIG. 37. According to the relationship shown in FIG. 37, the drive circuit 9 is able to indirectly detect the input power $p_{in}$ by the magnitude of the collector current ic1 detected by the current transformer 32 and the ic1 detection circuit 33 and execute feedback control of the input power $p_{in}$ by the current ic1 of the first switching element, so that the input power $p_{in}$ of the induction heating cooker can be correctly controlled.

Figure 38:
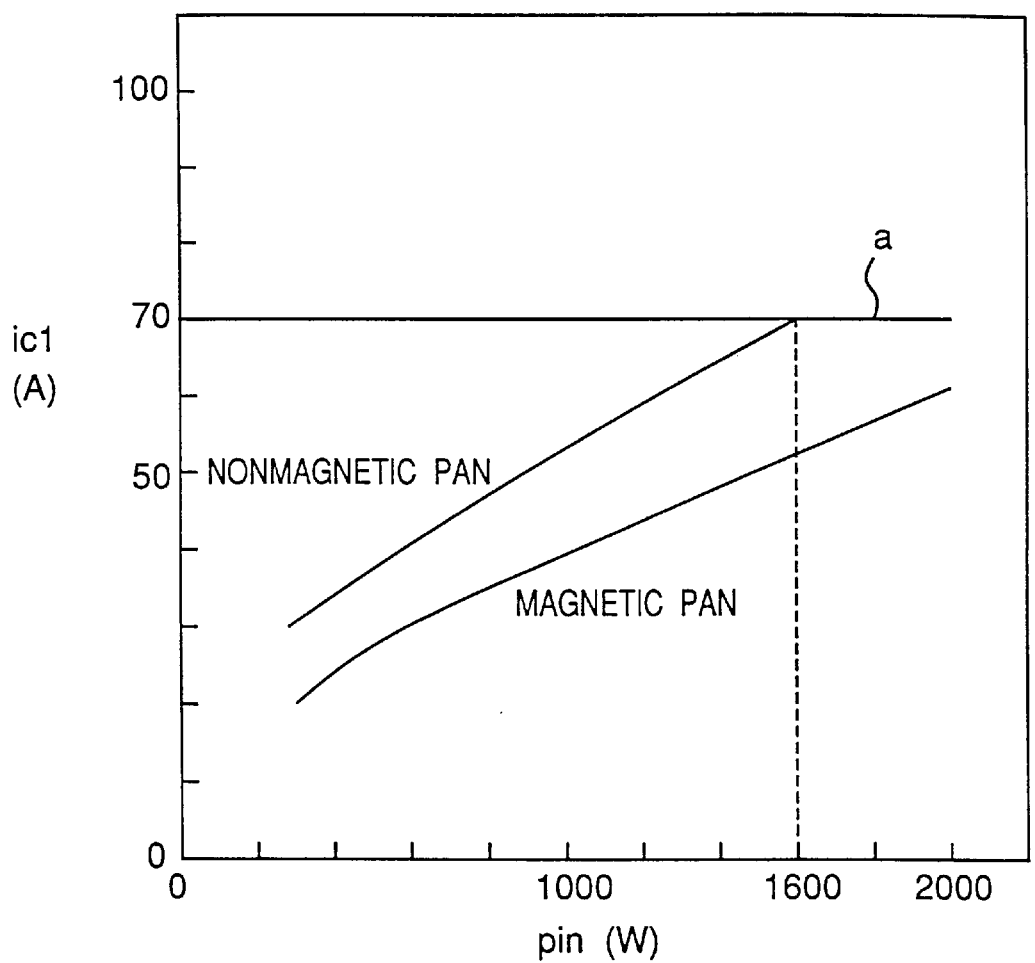
FIG. 38 is another graph of the characteristic of the input power relative to the current of the first switching element of the induction heating cooker of the twelfth embodiment.

The drive circuit 9 can detect the magnitude of the current ic1 from the output of the ic1 detection circuit 33, and therefore, the upper limit of the current ic1 can be set to, for example, 70 A as indicated by the thick solid line "a" in the graph of the $p_{in}$-ic1 characteristic shown in FIG. 38. With this arrangement, the input power $p_{in}$ of the nonmagnetic pan can be suppressed to 1600 W, so that the loss of the inverter circuit 2 can be suppressed. Normally, the collector current ic1 of the IGBT 5 is smaller than the current $i_L$ of the heating coil 4. Therefore, in the present embodiment, a current transformer having a smaller rating can be used than when detecting the current $i_L$ of the heating coil 4 as in the eleventh embodiment.

Embodiment 13

Figure 39:
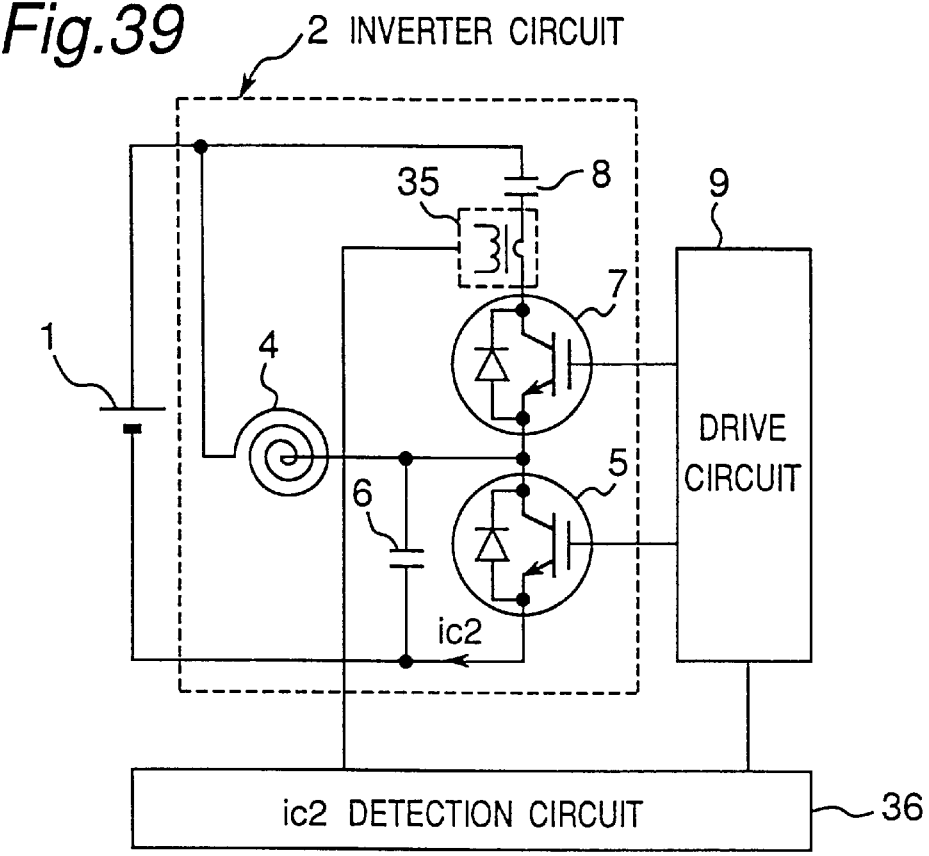
FIG. 39 is a circuit diagram of an induction heating cooker according to a thirteenth embodiment.

FIG. 39 shows a circuit diagram of an induction heating cooker according to a thirteenth embodiment.

In FIG. 39, the induction heating cooker includes: an inverter circuit 2 for converting a direct current from a DC power source 1 into a high-frequency current; a current transformer 35 and an ic2 detection circuit 36 for detecting a current flowing through the second switching element 7; and a drive circuit 9 for controlling the inverter circuit 2. In this case, the DC power source 1 and the inverter circuit 2 are the same as those of the third embodiment. The current transformer 35 is connected in series with the IGBT 7, and the secondary side of the current transformer 35 is connected to the input of the ic1 detection circuit 36. The output of the ic2 detection circuit 36 is connected to the drive circuit 9, and the drive circuit 9 is connected to the gates of the IGBT 5 and the IGBT 7. The current transformer 35 and the ic2 detection circuit 36 constitute a second switching element current detecting means.

The induction heating cooker of the present embodiment constructed as above executes feedback control of the input power $p_{in}$ by detecting the input power $p_{in}$ based on the collector current of the IGBT 7 which serves as the second switching element. The operation will be described below.

The current transformer 35 detects the collector current ic2 of the IGBT 7, while the ic2 detection circuit 36 outputs a voltage corresponding to the magnitude of the collector current ic2 of the IGBT 7 based on the output of the current transformer. The drive circuit 9 sets the conducting times ton1 and ton2 of the IGBT 5 and the IGBT 7 based on the magnitude of the output voltage of the ic2 detection circuit 36, drives the IGBT 5 and the IGBT 7 according to the conducting times, respectively, and operates the inverter circuit 2.

Figure 40:
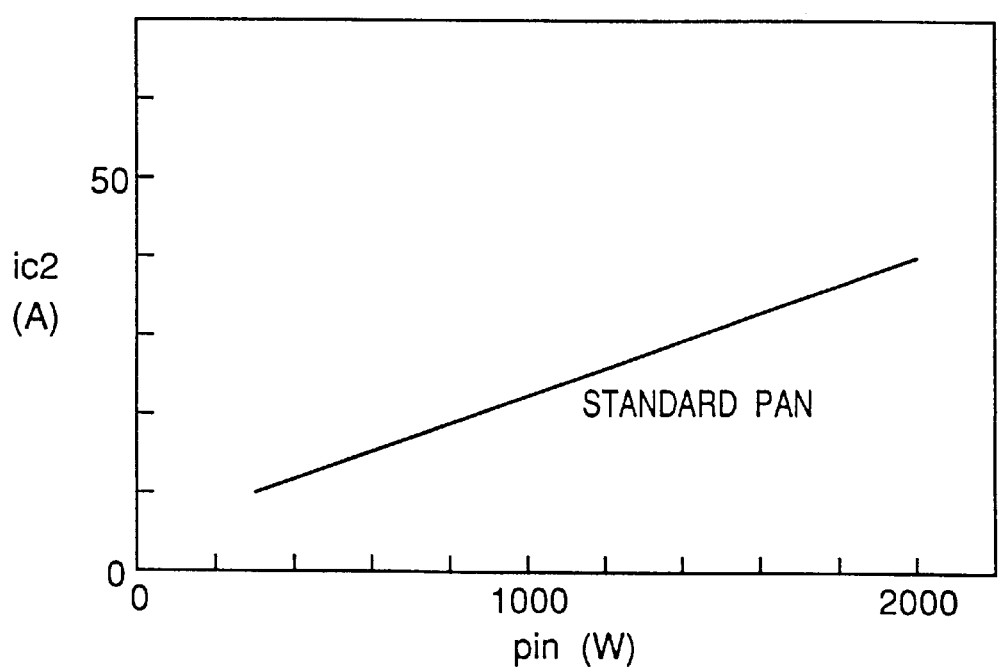
FIG. 40 is a graph of a characteristic of the input power relative to the element current of the second switching element of the induction heating cooker of the thirteenth embodiment.

The characteristic of the collector current ic2 of the IGBT 7 relative to the input power $p_{in}$ of the standard pan is shown in FIG. 40. According to the relationship shown in this graph, the drive circuit 9 is able to indirectly detect the input power $p_{in}$ by the magnitude of the collector current ic2 detected by the current transformer 35 and the ic2 detection circuit 36 and execute feedback control of the input power $p_{in}$ by the current ic2, so that the input power $p_{in}$ of the induction heating cooker can be correctly controlled similar to the third embodiment.

Figure 41:
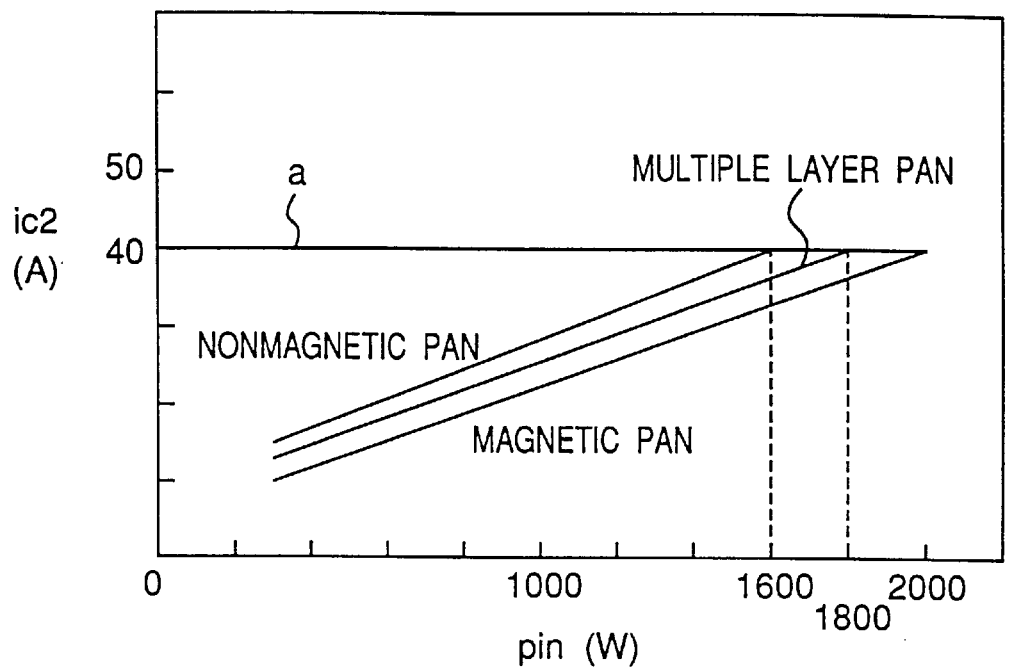
FIG. 41 is another graph of the characteristic of the input power relative to the current of the second switching element of the induction heating cooker of the thirteenth embodiment.

The drive circuit 9 can detect the magnitude of the current ic2 of the second switching element from the output of the ic2 detection circuit 36, and therefore, the upper limit of the current ic2 can be set to, for example, 40 A as indicated by the thick solid line "a" in the graph of the $p_{in}$-ic2 characteristic shown in FIG. 41. With this arrangement, the input power $p_{in}$ of the nonmagnetic pot can be suppressed to 1600 W, so that the loss of the inverter circuit 2 can be suppressed. The present embodiment can also use a current transformer having a small rating similar to the aforementioned twelfth embodiment.

Embodiment 14

Figure 42:
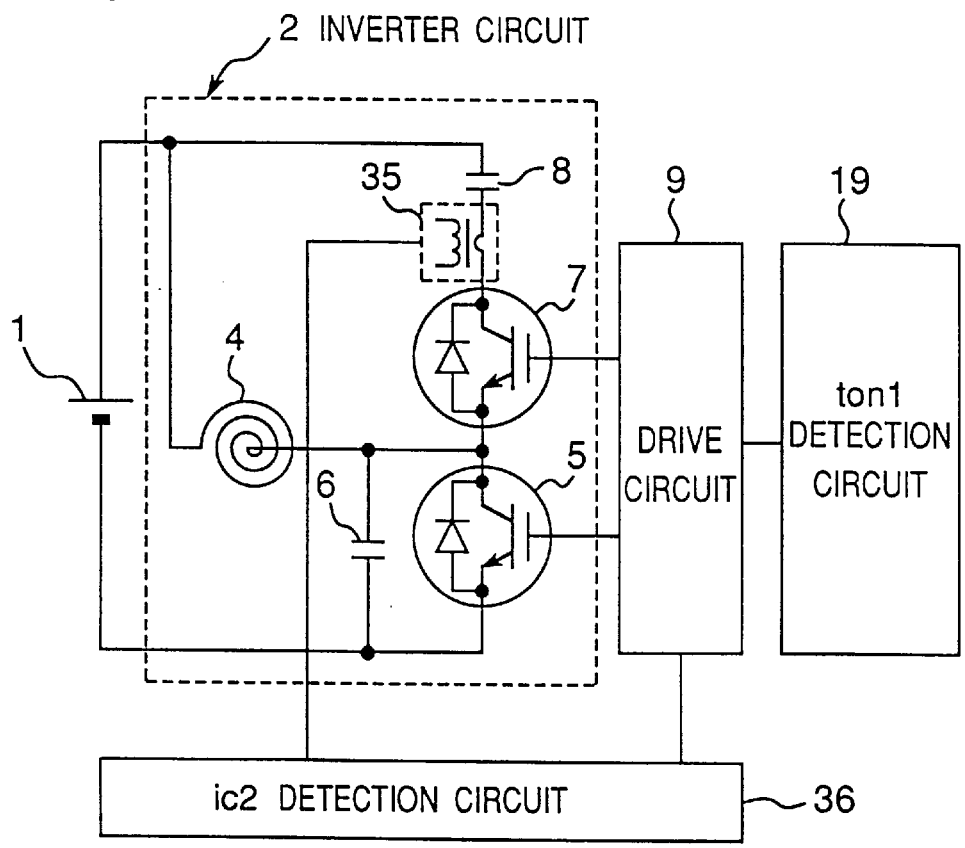
FIG. 42 is a circuit diagram of an induction heating cooker according to a fourteenth embodiment.

FIG. 42 shows a circuit diagram of an induction heating cooker according to a fourteenth embodiment.

In FIG. 42, the induction heating cooker includes: an inverter circuit 2 for converting a direct current from a DC power source 1 into a high-frequency current; a current transformer 35 and an ic2 detection circuit 36 for detecting a current flowing through the second switching element 7; a ton1 detection circuit 19 for detecting the conducting time of the first switching element 5; and a drive circuit 9 for controlling the inverter circuit 2. In this case, the DC power source 1 and the inverter circuit 2 are the same as those of the third embodiment, while the ton1 detection circuit 19 is the same as that of the fifth embodiment. The second switching element current detecting means constructed of the current transformer 35 and the ic2 detection circuit 36 is the same as that of the thirteenth embodiment. The output of the ic2 detection circuit 36 and the output of the ton1 detection circuit 19 are both connected to the drive circuit 9, and the drive circuit 9 is connected to the gates of the IGBT 5 and the IGBT 7 respectively.

The operation of the induction heating cooker constructed as above will be described.

The current transformer 35 detects the collector current ic2 of the IGBT 7, while the ic2 detection circuit 36 outputs a voltage corresponding to the magnitude of the collector current ic2 of the IGBT 7 based on the detection value of the current transformer 35. The ton1 detection circuit 19 detects the conducting time ton1 of the IGBT 5 and outputs a voltage corresponding to the duration of the conducting time ton1. The drive circuit 9 operates the inverter circuit 2 with the conduction ratio of the IGBT 5 and the IGBT 7 based on the magnitude of the output voltage of the ic2 detection circuit 36. In this stage, the conduction ratio D1 is controlled so that the magnitude of the current ic2 detected by the ic2 detection circuit 36 does not exceed the upper limit value determined according to the conducting time ton1 detected by the ton1 detection circuit 19.

Figure 43:
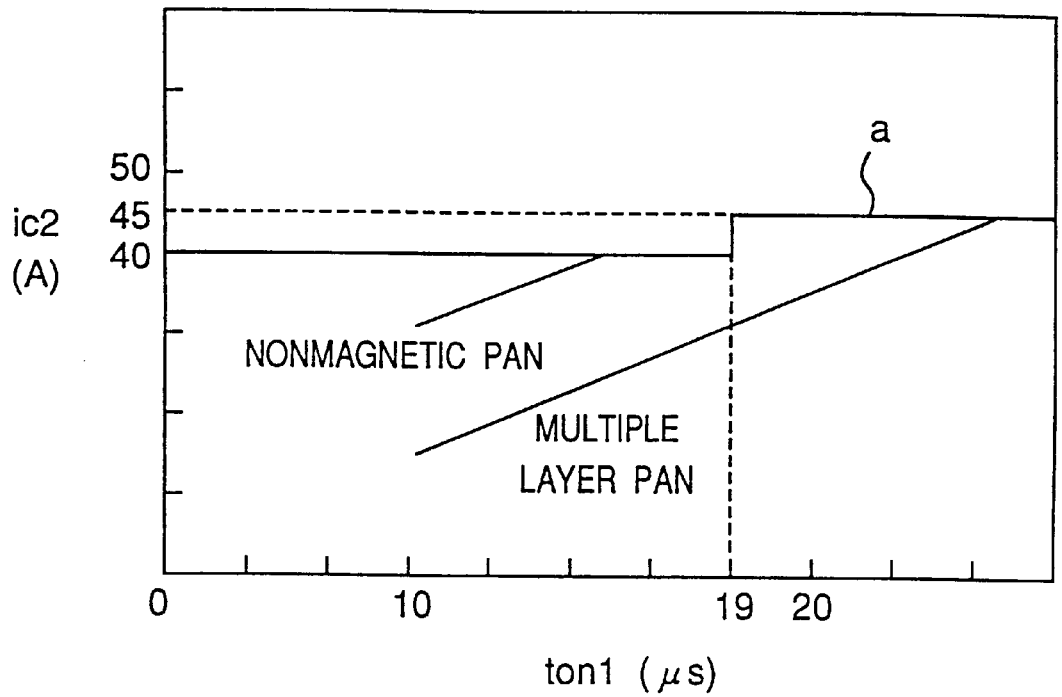
FIG. 43 is a graph of a characteristic of the conducting time of the first switching element relative to the current of the second switching element of the induction heating cooker of the fourteenth embodiment.

That is, the drive circuit 9 can set the upper limit value of the current ic2 similar to the thirteenth embodiment. Further, in the present embodiment, the upper limit value of the current ic2 is varied according to the conducting time ton1 based on the output of the ton1 detection circuit 19. For example, in the ton1-ic2 characteristic shown in FIG. 43, the upper limit value of the current ic2 indicated by the thick solid line "a" is set in two steps according to the conducting time ton1. In this case, with regard to the input power $p_{in}$ of a multi-layer pan, in contrast to the fact that it is limited to 1800 W in the thirteenth embodiment (FIG. 41), the input power $p_{in}$ can be inputted up to 2000 W according to the present embodiment since the upper limit value of the current ic2 becomes 45 A.

Figure 44:
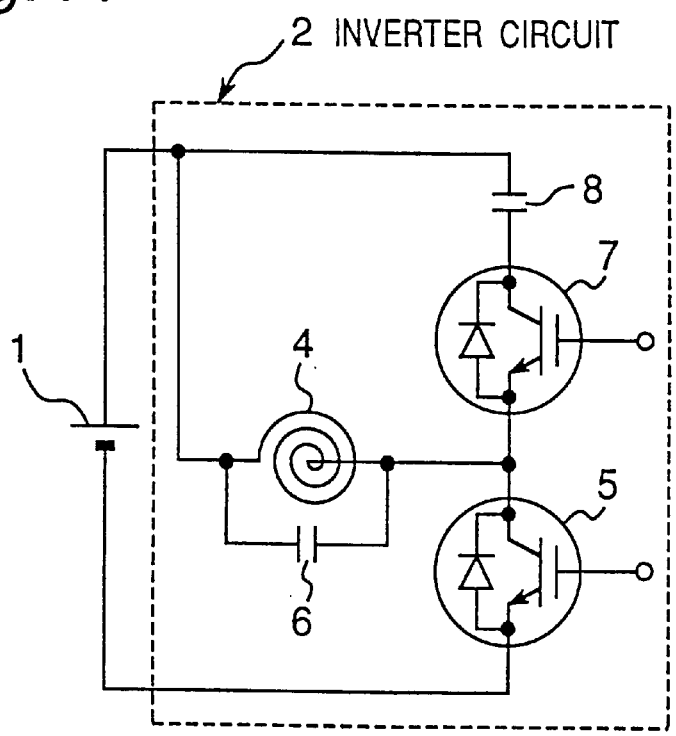
FIG. 44 is a circuit diagram of a modification example of the inverter circuit.
Figure 45:
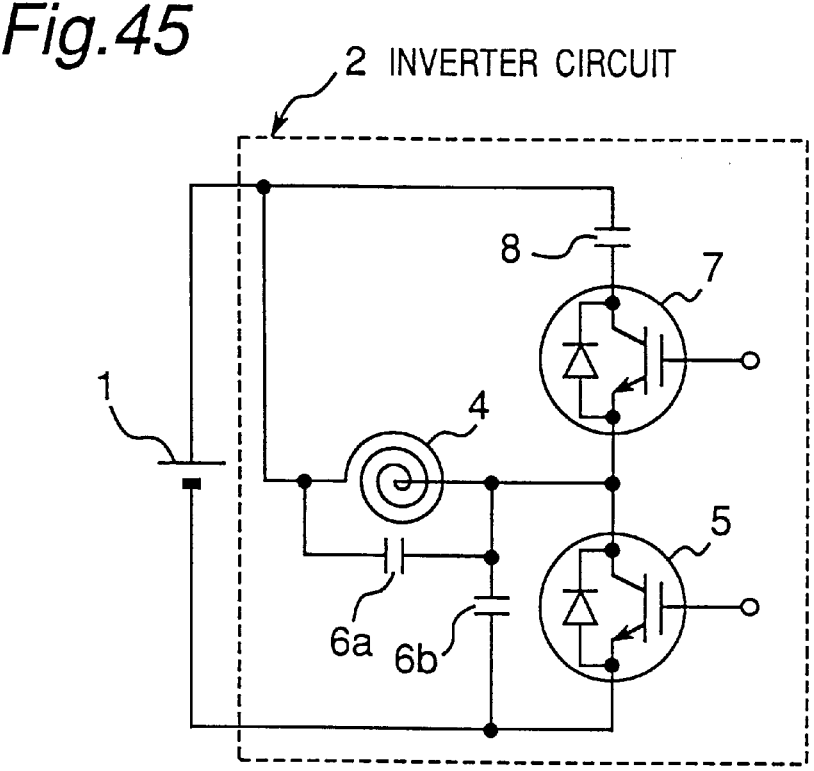
FIG. 45 is a circuit diagram of another modification example of the inverter circuit.
Figure 46:
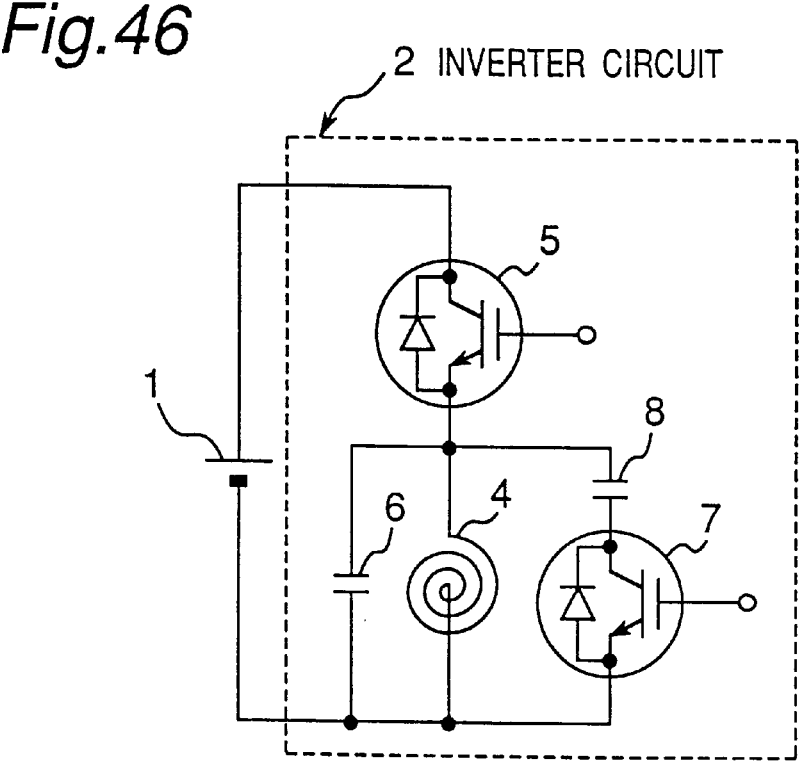
FIG. 46 is a circuit diagram of yet another modification example of the inverter circuit.
Figure 47:
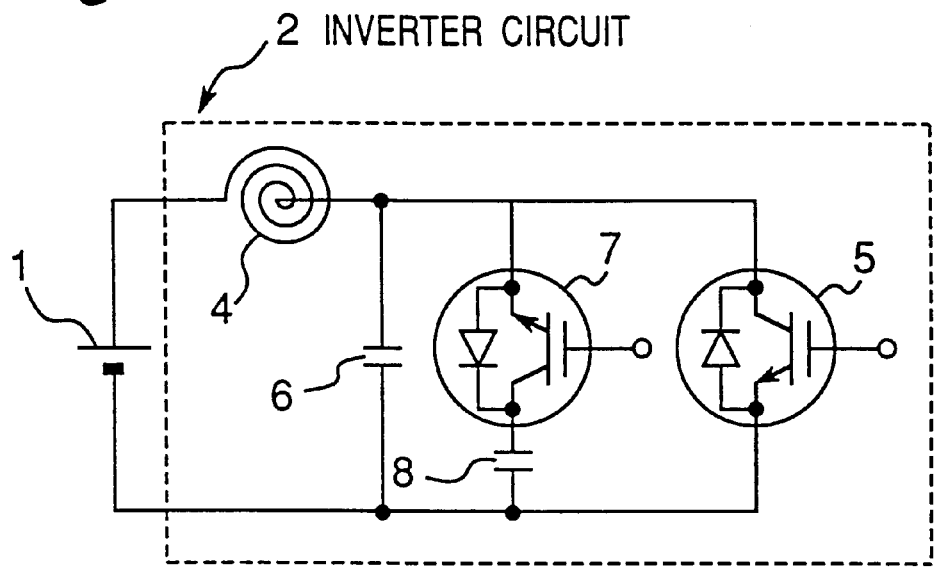
FIG. 47 is a circuit diagram of yet another modification example of the inverter circuit.
Figure 48:
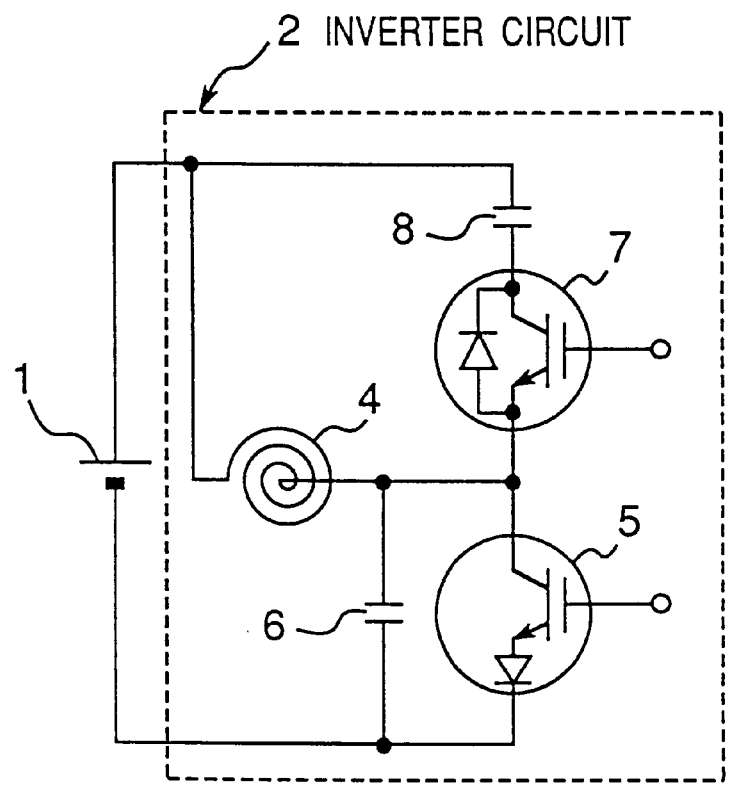
FIG. 48 is a circuit diagram of yet another modification example of the inverter circuit.

In regard to the construction of the inverter circuit 2 of the aforementioned third embodiment through twelfth embodiment, the first resonance capacitor 6 may be connected in parallel with the heating coil 4 as shown in FIG. 44, allowing a similar implementation to be achieved. As shown in FIG. 45, a resonance capacitor may be connected in parallel with both the heating coil 4 and the IGBT 5. The connection of the DC power source 1 with the heating coil 4 and the IGBT 5 may be achieved by connecting the IGBT 5 to the positive side of the DC power source 1 and connecting the heating coil 4 to the negative side of the DC power source 1 as shown in FIG. 46. The series circuit of the IGBT 7 and the second resonance capacitor 8 may be connected in parallel with the IGBT 5 as shown in FIG. 47. The first switching element may be constructed of an element of a reverse current blocking type as shown in FIG. 48. Further, it may be constructed as in the inverter circuit shown in the second embodiment.

Embodiment 15

Figure 49:
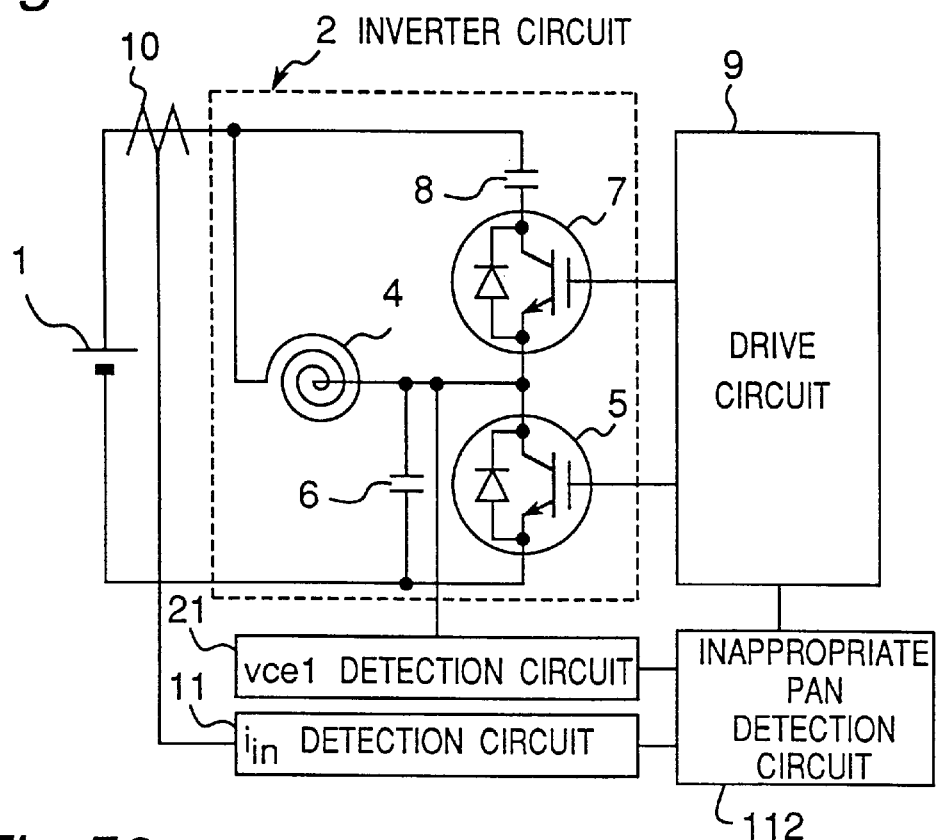
FIG. 49 is a circuit diagram of an induction heating cooker according to a fifteenth embodiment.

FIG. 49 shows a circuit diagram of an induction heating cooker according to a fifteenth embodiment. In FIG. 49, the induction heating cooker includes: an inverter circuit 2 for converting a direct current from a DC power source 1 into a high-frequency current; a vce1 detection circuit 21 for detecting a voltage across both terminals of the first switching element 5; a current sensor 10 and an $i_{in}$ detection circuit 11 for detecting an input current; an inappropriate pan detection circuit 112 for detecting an inappropriate load; and a drive circuit 9 for controlling the inverter circuit 2. In this case, the DC power source 1, inverter circuit 2, vce1 detection circuit 21 and $i_{in}$ detection circuit 11 are the same as the aforementioned ones.

The inverter circuit 2 is comprised of: a heating coil 4 having one terminal connected to the positive side of the DC power source 1; an IGBT 5 which has a built-in reverse conducting diode and serves as a first switching element connected across the other terminal of the heating coil 4 and the negative side of the DC power source 1; a first resonance capacitor 6 which is connected in parallel with the IGBT 5 so as to form a resonance circuit with the heating coil 4; and a series circuit of an IGBT 7 which has a built-in reverse conducting diode and serves as a second switching element connected in parallel with the heating coil 4 and a second resonance capacitor 8.

A current sensor 10 is connected to a line which connects the positive side of the DC power source 1 to the inverter circuit 2, and the output of the current sensor 10 is connected to the $i_{in}$ detection circuit 11. The current sensor 10 and the $i_{in}$ detection circuit 11 constitute an input current detecting means of the inverter circuit 2. The vce1 detection circuit 21 which serves as a first switching element voltage detecting means is connected to the collector terminal of the IGBT 5. The current sensor 10, the $i_{in}$ detection circuit 11 and the vce1 detection circuit 21 constitute an operating state detecting means of the inverter circuit 2. The outputs of the $i_{in}$ detection circuit 11 and the vce1 detection circuit 21 are both connected to the input of the inappropriate pan detection circuit 112 which serves as an inappropriate load detecting means, the output of the inappropriate pan detection circuit 112 is connected to the drive circuit 9, and the drive circuit 9 is connected to the gate terminal of the IGBT 5 and the gate terminal of the IGBT 7.

The operation of the induction heating cooker constructed as above will be described.

When the induction heating cooker operates, the current sensor 10 detects the input current $i_{in}$ of the inverter circuit 2, and the $i_{in}$ detection circuit 11 outputs a voltage corresponding to the magnitude of the input current $i_{in}$ based on the output from the current sensor 10. The vce1 detection circuit 21 detects the collector-emitter voltage vce1 of the IGBT 5 and outputs a voltage corresponding to the magnitude of the collector-emitter voltage vce1. The inappropriate pan detection circuit 112 detects whether the load is appropriate or inappropriate based on the collector-emitter voltage vce1 of the IGBT 5. The drive circuit 9 operates the inverter circuit 2 by alternately driving the IGBT 5 and the IGBT 7 at a specified frequency when the load is appropriate based on a detection value from the inappropriate pan detection circuit 112. When the load is inappropriate, the drive circuit 9 stops the driving of the IGBT 5 and the IGBT 7 to stop the operation of the inverter circuit 2.

Figure 50:
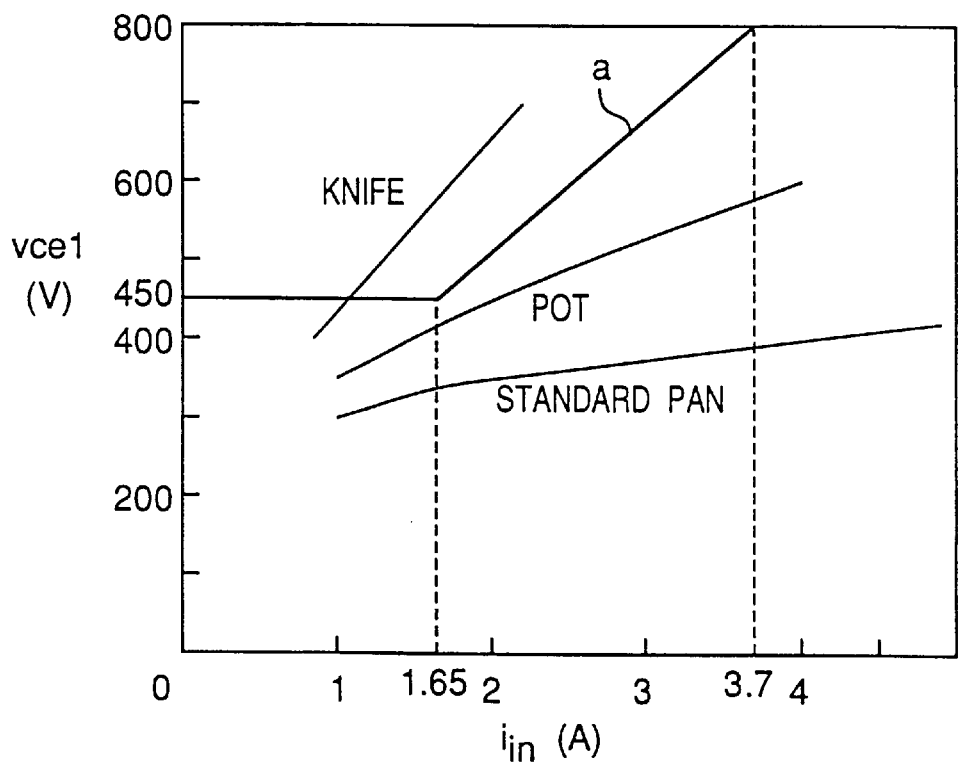
FIG. 50 is a graph of a characteristic of the input current relative to the voltage across both terminals of the first switching element of the induction heating cooker of the fifteenth embodiment.

FIG. 50 shows the characteristic of the input current $i_{in}$ of the inverter circuit 2 relative to the collector-emitter voltage vce1 of the IGBT 5 in the case where the load to be inductively heated is the standard pan, pot and knife. In the figure, the thick solid line "a" indicates a border line of the appropriateness/inappropriateness of the load. When a point determined by the input current $i_{in}$ and the collector-emitter voltage vce1 of the IGBT 5 is located in a region below the border line of FIG. 50, the inappropriate pan detection circuit 112 outputs "appropriateness" as a detection result. When the point determined by the input current $i_{in}$ and the collector-emitter voltage vce1 of the IGBT 5 is located in a region above the border line of FIG. 50, the inappropriate pan detection circuit 112 outputs "inappropriateness" as a detection result. In this case, the bottom surface areas of the standard pan, pot and knife are reduced in this order. As shown in FIG. 50, the smaller the bottom surface area of the load is, the greater the value of the voltage vce1 relative to the value of an identical input current $i_{in}$. Therefore, when the load is the standard pan and pot, they are heated, whereas the knife is not heated.

As described above, in the present induction heating cooker, the inappropriate pan detection circuit 112 detects the appropriateness/inappropriateness of the load depending on the difference in characteristic of the input current $i_{in}$ of the inverter circuit 2 and the collector-emitter voltage vce1 of the IGBT 5 with respect to each load. When the load is appropriate, the drive circuit 9 makes the IGBT 5 and the IGBT 7 alternately conductive at a predetermined operating frequency f0 and varies the conduction ratio D1, for which the input power $p_{in}$ can be variably controlled with the inverter circuit 2 operated at a predetermined frequency. When the load is inappropriate, the drive circuit 9 stops driving the IGBT 5 and the IGBT 7 and stops the operation of the inverter circuit 2 to stop the heating operation. Therefore, the inappropriate load such as a small object load can be prevented from being heated.

Embodiment 16

Figure 51:
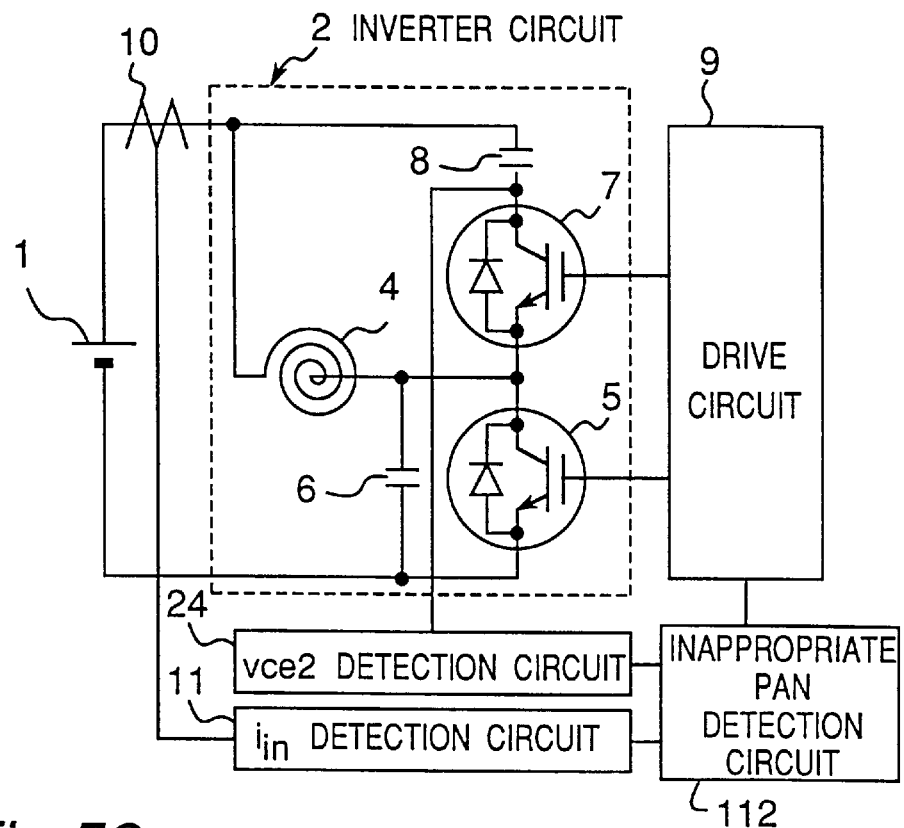
FIG. 51 is a circuit diagram of an induction heating cooker according to a sixteenth embodiment.

FIG. 51 shows a circuit diagram of an induction heating cooker according to a sixteenth embodiment. In FIG. 51, the induction heating cooker includes: an inverter circuit 2 for converting a direct current from a DC power source 1 into a high-frequency current; a vce2 detection circuit 24 for detecting the voltage across both terminals of the second switching element 7; a current sensor 10 and an $i_{in}$ detection circuit 11 for detecting an input current; an inappropriate pot detection circuit 112 for detecting an inappropriate load; and a drive circuit 9 for controlling the inverter circuit 2. In this case, the DC power source 1, inverter circuit 2, $i_{in}$ detection circuit 11 and vce2 detection circuit 24 are the same as the aforementioned ones.

The inverter circuit 2 is comprised of: a heating coil 4 having one terminal connected to the positive side of the DC power source 1; an IGBT 5 which has a built-in reverse conducting diode and serves as a first switching element connected across the other terminal of the heating coil 4 and the negative side of the DC power source 1; a first resonance capacitor 6 which is connected in parallel with the IGBT 5 so as to form a resonance circuit with the heating coil 4; and a series circuit of an IGBT 7 which has a built-in reverse conducting diode and serves as a second switching element connected in parallel with the heating coil 4 and a second resonance capacitor 8.

A current sensor 10 is connected to a line which connects the positive pole of the DC power source 1 to the inverter circuit 2, and the output of the current sensor 10 is connected to the $i_{in}$ detection circuit 11. The current sensor 10 and the $i_{in}$ detection circuit 11 constitute an input current detecting means of the inverter circuit 2.

The vce2 detection circuit 24 which serves as the second switching element voltage detecting means is connected to the collector terminal of the IGBT 7. The current sensor 10, the $i_{in}$ detection circuit 11 and the vce2 detection circuit 24 constitute the operating state detecting means of the inverter circuit 2. The outputs of the $i_{in}$ detection circuit 11 and the vce2 detection circuit 24 are both connected to the input of the inappropriate pan detection circuit 112 which serves as the inappropriate load detecting means, the output of the inappropriate pan detection circuit 112 is connected to the drive circuit 9, and the drive circuit 9 is connected to the gate terminal of the IGBT 5 and the gate terminal of the IGBT 7 respectively.

The operation of the induction heating cooker constructed as above will be described.

In the aforementioned fifteenth embodiment, the detection of the appropriateness/inappropriateness of the load is executed by the input current $i_{in}$ and the collector-emitter voltage vce1 of the IGBT 5 which serves as the first switching element. In the present embodiment, the detection of the appropriateness/inappropriateness of the load is executed by the input current $i_{in}$ and the collector-emitter voltage vce2 of the IGBT 7 which serves as the second switching element. Therefore, the basic operation is similar to the one described in the fifteenth embodiment.

Figure 52:
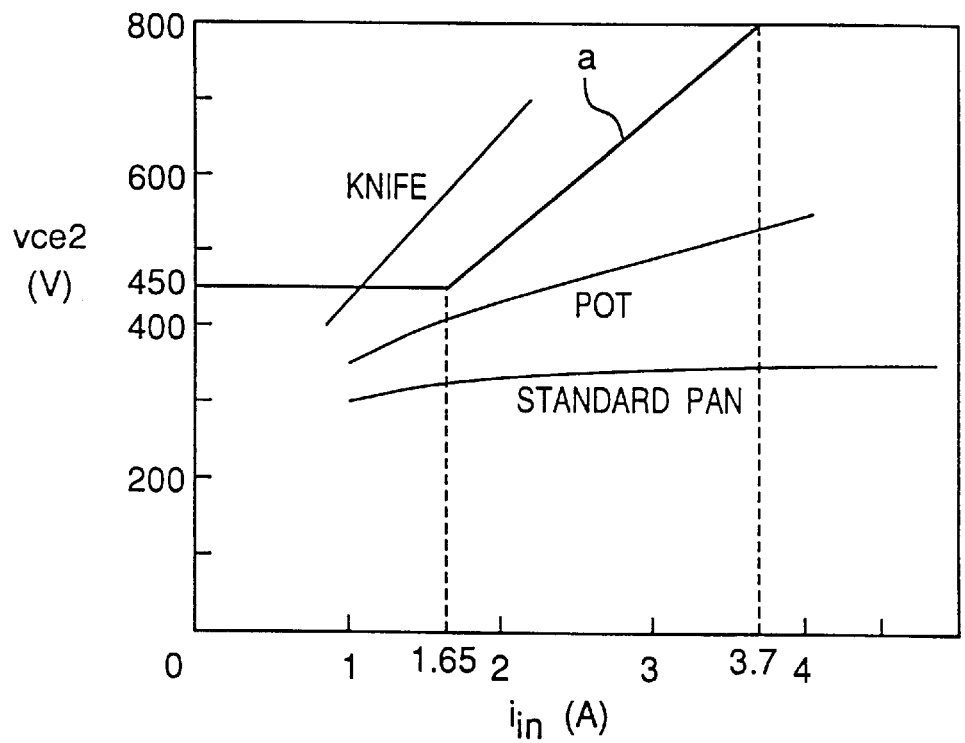
FIG. 52 is a graph of a characteristic of the input current relative to the voltage across both terminals of the second switching element of the induction heating cooker of the sixteenth embodiment.

FIG. 52 shows the characteristic of the input current $i_{in}$ of the inverter circuit 2 relative to the collector-emitter voltage vce2 of the IGBT 7 in the case where the load to be inductively heated is the standard pan, pot and knife. In the figure, the thick solid line "a" indicates the border line of the appropriateness/inappropriateness of the load. When a point determined by the input current $i_{in}$ and the collector-emitter voltage vce2 of the IGBT 7 is located in a region below the border line of FIG. 52, the inappropriate pan detection circuit 112 of the induction heating cooker of the present embodiment outputs "appropriateness" as a detection result. When the point determined by the input current $i_{in}$ and the collector-emitter voltage vce2 of the IGBT 7 is located in a region above the border line of FIG. 52, "inappropriateness" is outputted as a detection result. Based on the detection result from the inappropriate pan detection circuit 112, the drive circuit 9 operates the inverter circuit 2 when the appropriateness of the load is detected and stops the inverter circuit 2 when the inappropriateness of the load is detected.

As described above, the inappropriate load such as a knife can be detected by means of the inappropriate pan detection circuit 112, and therefore, the inappropriate load such as the small object load can be prevented from being heated.

Embodiment 17

Figure 53:
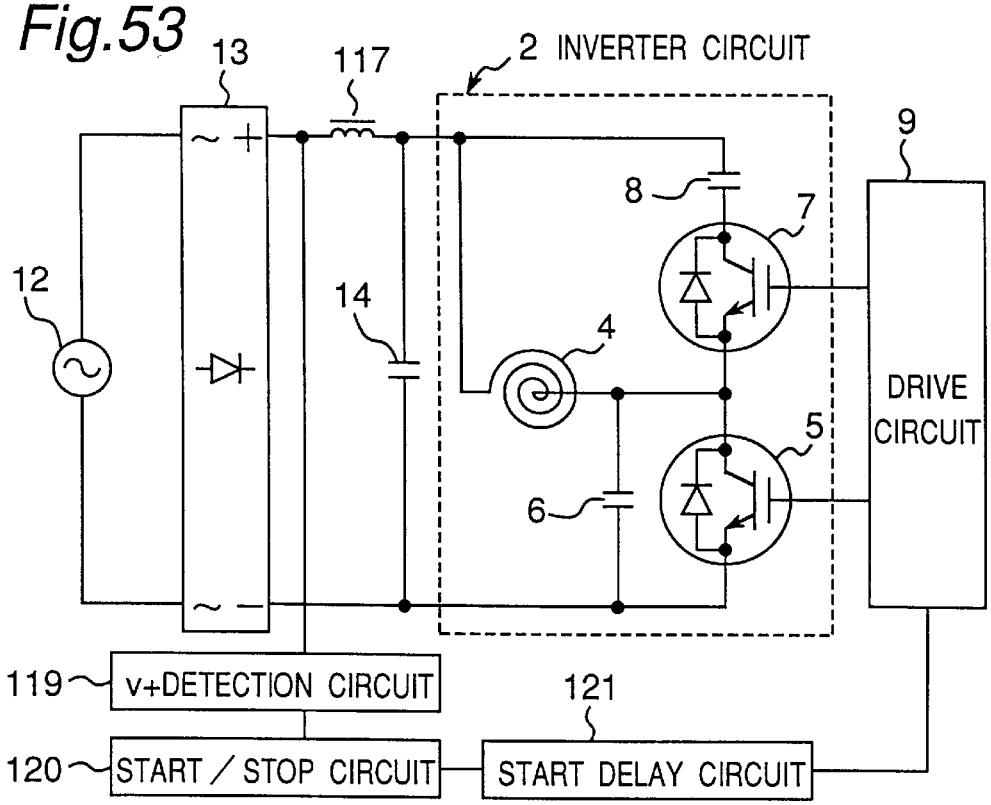
FIG. 53 is a circuit diagram of an induction heating cooker according to a seventeenth embodiment.

FIG. 53 shows a circuit diagram of an induction heating cooker according to a seventeenth embodiment. In FIG. 53, the induction heating cooker includes: an inverter circuit 2 for converting a direct current from a DC power source 1 into a high-frequency current; a v+ detection circuit 119 for detecting the power voltage; a start/stop circuit 120 for outputting a signal for starting or stopping; a start delay circuit 121 for delaying the signal for starting; and a drive circuit 9 for controlling the inverter circuit 2. In FIG. 53, the reference numeral 12 denotes a commercial power source, while the reference numeral 13 denotes a diode bridge which serves as a rectifier connected to the commercial power source 12. One terminal of a choke coil 117 is connected to the positive side output of the diode bridge 13, while the other terminal of the choke coil 117 is connected to one terminal of a smoothing capacitor 14. The other terminal of the smoothing capacitor 14 is connected to the negative side output of the diode bridge 13, while the smoothing capacitor 14 has the role of a DC power source to be supplied to the inverter circuit 2. The choke coil 117 has the role of a filter.

The inverter circuit 2 is comprised of: a heating coil 4 whose one terminal is connected to the positive side of the smoothing capacitor 14; an IGBT 5 which has a built-in reverse conducting diode and serves as a first switching element connected across the other terminal of the heating coil 4 and the negative pole side of the smoothing capacitor 14; a first resonance capacitor 6 which is connected in parallel with the IGBT 5 so as to form a resonance circuit with the heating coil 4; and a series circuit of an IGBT 7 which has a built-in reverse conducting diode and serves as a second switching element connected in parallel with the heating coil 4 and a second resonance capacitor 8.

The positive side output of the diode bridge 13 is connected to the v+ detection circuit 119 which serves as a commercial power source monitoring means. The output of the v+ detection circuit 119 is connected to the start/stop circuit 120 which serves as a start and stop means, and the output of the start/stop circuit 120 is connected to the start delay circuit 121 which serves as a start delay means. The output of the start delay circuit 121 is connected to the drive circuit 9, and the output of the drive circuit 9 is connected to the gate terminals of the IGBT 5 and the IGBT 7.

The operation of the induction heating cooker constructed as above will be described.

The v+ detection circuit 119 of the present embodiment receives the voltage of the commercial power source 12 as an input thereto, outputs a detection result of "normal" when the voltage is lower than a predetermined value and outputs a detection result of "abnormal" when the voltage is not lower than the predetermined value.

First, a case where the induction heating cooker starts its operation in a state in which the commercial power source 12 is normal will be described. In this case, the v+ detection circuit 119 outputs a detection result of "normal state" based on the voltage of the commercial power source 12. Upon receiving an input of the detection result of the normal state of the commercial power source 12 from the v+ detection circuit 119, the start/stop circuit 120 outputs a start signal for starting the operation of the inverter circuit 2. Upon receiving the start signal from the start/stop circuit 120, the start delay circuit 121 outputs the start signal after a lapse of a predetermined time (assumed to be two seconds in this case). Upon receiving the start signal from the start delay circuit 121, the drive circuit 9 starts the driving of the IGBT 5 and the IGBT 7 and starts the operation of the inverter circuit 2.

Next, the operation in the case where the commercial power source 12 enters into an abnormal state will be described.

For example, when a thunderbolt surge voltage is applied to the commercial power source 12, the voltage of the positive side output of the diode bridge 13 increases from a value in the steady state by the energy of the thunderbolt surge, consequently becoming higher than the predetermined value. The v+ detection circuit 119 detects that the commercial power source 12 has abnormally increased to become high and outputs a detection result representing the "abnormal state". Upon receiving an input of the detection result of the abnormal state of the commercial power source 12 from the v+ detection circuit 119, the start/stop circuit 120 outputs a stop signal for stopping the operation of the inverter circuit 2. Upon receiving the stop signal from the start/stop circuit 120, the start delay circuit 121 instantaneously outputs the stop signal. Upon receiving the stop signal from the start delay circuit 121, the drive circuit 9 stops driving the IGBT 5 and the IGBT 7 and stops the operation of the inverter circuit 2.

Subsequently, when the thunderbolt surge energy disappears and the voltage of the commercial power source 12 is restored into the normal state, the v+ detection circuit 119 detects that the commercial power source 12 has become normal and forms an output of the fact. The start/stop circuit 120 receives an input of the detection result of the normal state of the commercial power source 12 from the v+ detection circuit 119 and outputs a start signal for restarting the operation of the inverter circuit 2. Upon receiving an input of the start signal from the start/stop circuit 120, the start delay circuit 121 outputs the start signal after a lapse of two seconds. The drive circuit 9 restarts the driving of the IGBT 5 and the IGBT 7 and the operation of the inverter circuit 2 after receiving the input of the start signal from the start delay circuit 121.

As described above, the v+ detection circuit 119 can monitor the state of the commercial power source 12, and the start/stop circuit 120 can control the start/stop of the inverter circuit 2 according to the detection result of the v+ detection circuit 119. Therefore, when the commercial power source 12 enters into the abnormal state due to the application of the thunderbolt surge or the like, the operation of the inverter circuit 2 is stopped, so that the possible occurrence of the damage of the inverter circuit 2 can be prevented.

The start delay circuit 121 transfers the start signal to the drive circuit 9 after a lapse of a specified time (two seconds in this case) when it receives the start signal from the start/stop circuit 120 or instantaneously transfers the stop signal to the drive circuit 9 when it receives the stop signal from the start/stop circuit 120. Therefore, when the v+ detection circuit 119 detects the abnormality of the commercial power source 12, the operation of the inverter circuit 2 is immediately stopped. Subsequently, when the v+ detection circuit 119 detects the restoration of the commercial power source 12 into the normal state, the operation of the inverter circuit 2 is restarted after a lapse of a predetermined time. Even if the commercial power source 12 is repeating transitionally the normal state and the abnormal state after the application of the thunderbolt surge to it, the system can wait for the complete stability of commercial power source 12 by virtue of the predetermined start delay time, so that the inverter circuit 2 can be prevented from being damaged regardless of the start, stop and restart.

Embodiment 18

Figure 54:
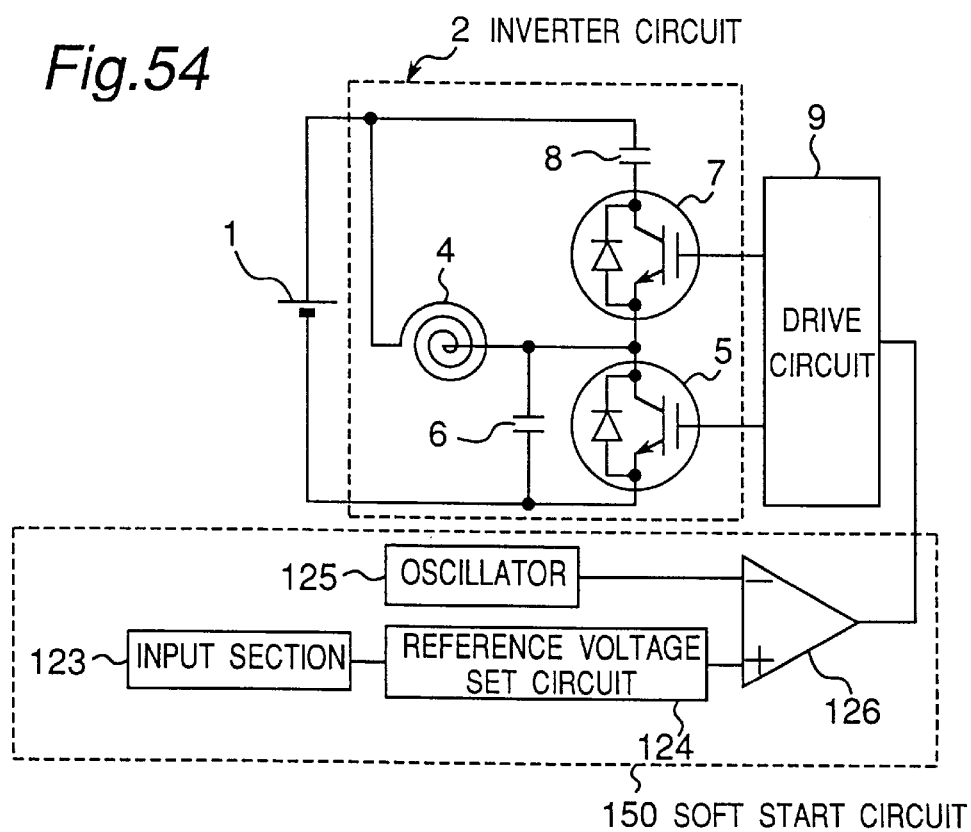
FIG. 54 is a circuit diagram of an induction heating cooker according to an eighteenth embodiment.

FIG. 54 shows a circuit diagram of an induction heating cooker according to an eighteenth embodiment. In FIG. 54, the induction heating cooker includes: an inverter circuit 2 for converting a direct current from a DC power source 1 into a high-frequency current; a soft start circuit 150 for slowly starting the inverter circuit 2; and a drive circuit 9 for controlling the inverter circuit 2.

The inverter circuit 2 is comprised of: a heating coil 4 having one terminal connected to the positive side of the DC power source 1; an IGBT 5 which has a built-in reverse conducting diode and serves as a first switching element connected across the other terminal of the heating coil 4 and the negative side of the DC power source 1; a first resonance capacitor 6 which is connected in parallel with the IGBT 5 so as to form a resonance circuit with the heating coil 4; and a series circuit of an IGBT 7 which has a built-in reverse conducting diode and serves as a second switching element connected in parallel with the heating coil 4 and a second resonance capacitor 8.

The soft start circuit 150 is comprised of: an input section 123 which serves as an input setting means for setting the input power $p_{in}$ of the inverter circuit 2; a reference voltage set circuit 124 whose input is connected to the output of the input section 123; an oscillator 125; and a comparator 126 of which a positive input is connected to the output of the reference voltage set circuit 124 and a negative input is connected to the output of the oscillator circuit 125. The output of the comparator 126 is connected to the drive circuit 9, and the output of the drive circuit 9 is connected to the gate terminal of the IGBT 5 and the gate terminal of the IGBT 7.

The operation of the induction heating cooker constructed as above will be described.

Figure 55:
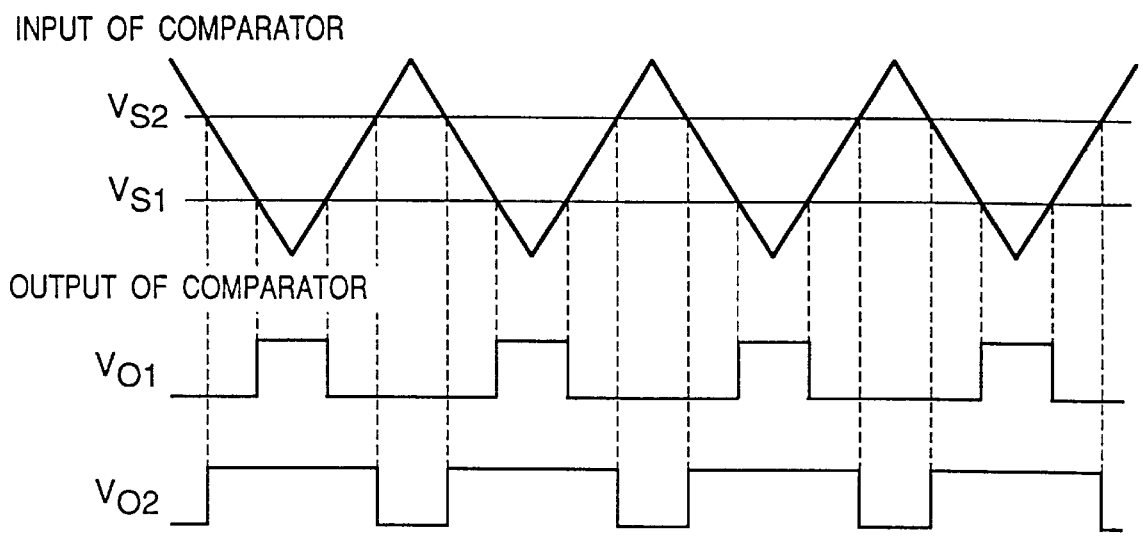
FIG. 55 is a chart showing the input voltage and the output voltage of the comparator of the eighteenth embodiment.

When the input power $p_{in}$ is set by the input section 123, the input section 123 forms an output corresponding to the set value of the input power. The oscillator 125 generates a triangular wave of a predetermined frequency. The reference voltage set circuit 124 gradually increases its voltage level from a minimum DC voltage as the initial value and finally outputs a DC voltage of a level corresponding to the set value of input power $p_{in}$. The comparator 126 compares the voltage of the triangular wave as the output of the oscillator 125 with the DC voltage as the output of the reference voltage set circuit 124. The comparator 126 outputs a high-level signal in a period in which the DC voltage is greater than the voltage of the triangular wave and outputs a low-level signal in a period in which the DC voltage is smaller than the voltage of the triangular wave. The reference voltage set circuit 124 gradually increases its DC output level from the minimum DC voltage Vs1 as shown in FIG. 55 to vary the same until it becomes a DC voltage Vs2 corresponding to the input power $p_{in}$. Consequently, the pulse width of the high-level signal outputted from the comparator 126 gradually increases, and the pulse width of the low-level signal gradually decreases. The drive circuit 9 gradually increases the conduction ratio D1 that is a ratio of the conducting time ton1 of the IGBT 5 relative to a constant operating cycle t0 from its minimum value. Finally, by controlling it to the conduction ratio D1 at which the input power $p_{in}$ set in the input section 123 can be obtained, the IGBT 5 and the IGBT 7 are driven.

As described above, the drive circuit 9 gradually increases the conduction ratio D1 (=ton1/t0) from the minimum value at a constant operating frequency f0 (=1/t0) based on the output of the soft start circuit 150 comprised of the reference voltage set circuit 124, the oscillator 125 and the comparator 126, and drives the IGBT 5 and the IGBT 7 at this conduction ratio D1. Consequently, the input power $p_{in}$ gradually increases from the minimum value and comes to have a value corresponding to the set value after a lapse of a predetermined time. Therefore, the operation in the starting stage of the inverter circuit 2 can be made safer than in the case where it comes to have a value set by the input section 123 from the beginning in the starting stage. For example, if an aluminum pan is used as a load, when the operation is started with the conduction ratio corresponding to the final input power set by the input section 123, then an excessive current flows through the inverter circuit 2 to damage the inverter circuit 2. Accordingly, by separately providing an aluminum pan detection circuit in the present induction heating cooker and starting the apparatus while gradually increasing the input power from the minimum value, the aluminum pan can be detected before the inverter circuit 2 will be damaged, so that the inverter circuit 2 can be protected by stopping the operation at the time of detecting the aluminum pan.

Embodiment 19

Figure 56:
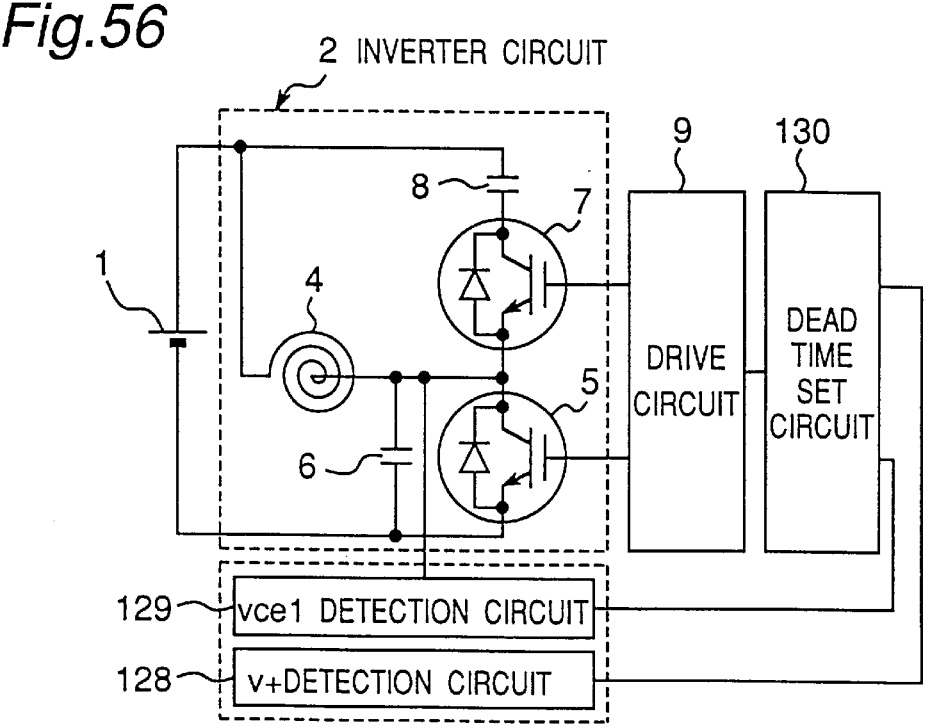
FIG. 56 is a circuit diagram of an induction heating cooker according to a nineteenth embodiment.

FIG. 56 shows a circuit diagram of an induction heating cooker according to a nineteenth embodiment. In FIG. 56, the induction heating cooker includes: an inverter circuit 2 for converting a direct current from a DC power source 1 into a high-frequency current; a dead time set circuit 130 for setting a dead time; a v+ detection circuit 128 for detecting the voltage of the DC power source 1; a vce1 detection circuit 129 for detecting the voltage of the first switching element 5 in the inverter circuit; and a drive circuit 9 for controlling the inverter circuit 2.

The inverter circuit 2 is comprised of: a heating coil 4 whose one terminal is connected to the positive side of the DC power source 1; an IGBT 5 which has a built-in reverse conducting diode and serves as a first switching element connected across the other terminal of the heating coil 4 and the negative side of the DC power source 1; a first resonance capacitor 6 which is connected in parallel with the IGBT 5 so as to form a resonance circuit with the heating coil 4; and a series circuit of an IGBT 7 which has a built-in reverse conducting diode and serves as a second switching element connected in parallel with the heating coil 4 and a second resonance capacitor 8. The v+ detection circuit 128 is connected to the positive pole of the DC power source 1, and the vce1 detection circuit 129 is connected to the collector of the IGBT 5, these components constituting the operating state detecting means of the inverter circuit 2. The output of the v+ detection circuit 128 and the output of the vce1 detection circuit 129 are both connected to the dead time set circuit 130 which serves as a dead time setting means, the output of the dead time set circuit 130 is connected to the drive circuit 9, and the drive circuit 9 is connected to the gate terminal of the IGBT 5 and the gate terminal of the IGBT 7.

The operation of the induction heating cooker constructed as above will be described.

Figure 57:
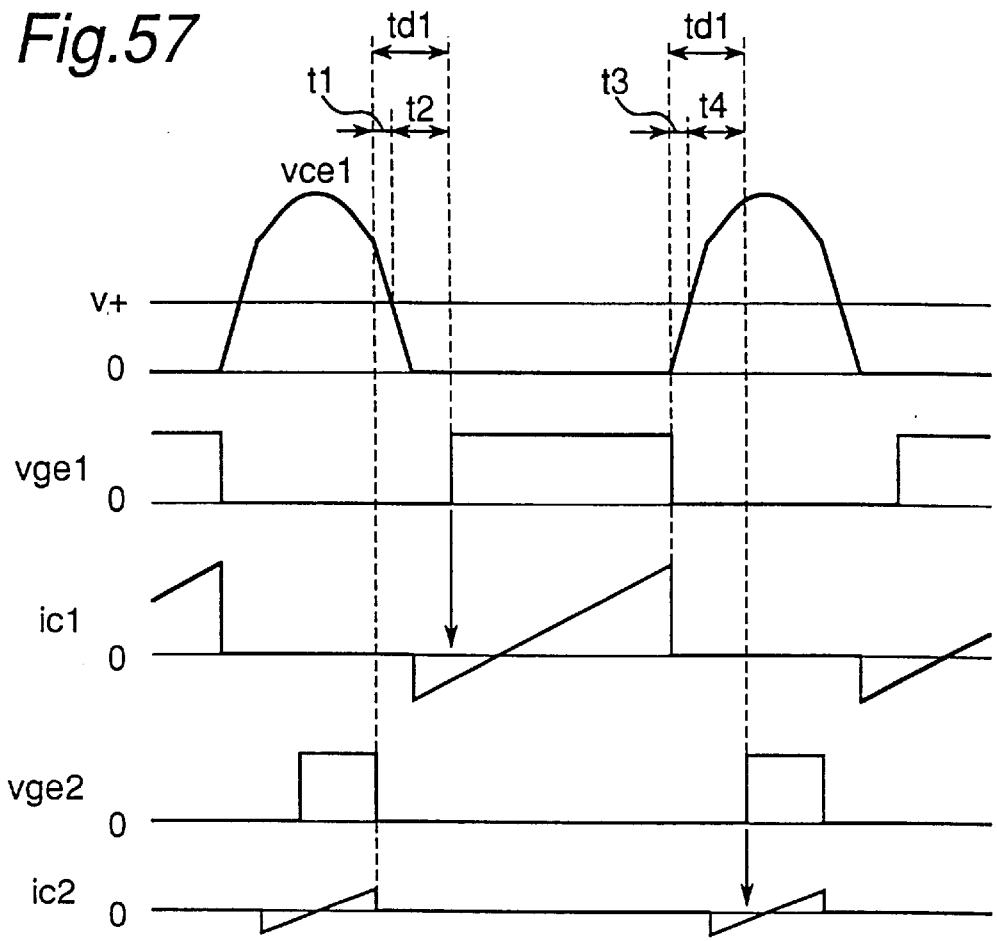
FIG. 57 is a timing chart for explaining the operation of the induction heating cooker of the nineteenth embodiment.

The v+ detection circuit 128 detects the voltage of the DC power source 1, while the vce1 detection circuit 129 detects the collector-emitter voltage vce1 of the IGBT 5 which serves as the first switching element. In this stage, the dead time set circuit 130 receives the output of the v+ detection circuit 128 and the output of the vce1 detection circuit 129 as inputs thereto and sets the dead time based on these two inputs. In concrete, as shown in FIG. 57, when the gate-emitter voltage vge2 of the IGBT 7 becomes 0 V and the IGBT 7 is turned off, the collector-emitter voltage vce1 of the IGBT 5 falls. Subsequently, when the value of the voltage vce1 becomes equal to the voltage v+ of the DC power source 1 after a lapse of a time t1, the dead time set circuit 130 makes the gate-emitter voltage vge1 of the IGBT 5 have a high level after a lapse of a specified time t2 from the point of time, thereby turning on the IGBT 5. Subsequently, when the gate-emitter voltage vge1 of the IGBT 5 becomes 0 V and the IGBT 5 is turned off, the collector-emitter voltage vce1 of the IGBT 5 rises. When the value of the collector-emitter voltage vce1 of the IGBT 5 becomes equal to the value of the voltage v+ of the DC power source 1 after a lapse of a time t3, the dead time set circuit 130 makes the gate-emitter voltage vge2 of the IGBT 7 have a high level after a lapse of a specified time t4 from the point of time, thereby turning on the IGBT 7. As described above, the dead time set circuit 130 sets a dead time (td1=t1+t2) from the time when the IGBT 7 is turned off to the time when the IGBT 5 is turned on as well as a dead time (td1=t3+t4) from the time when the IGBT 5 is turned off to the time when the IGBT 7 is turned on.

As described above, the dead time set circuit 130 detects the operating state of the inverter circuit 2 by the voltage of the DC power source 1 and the voltage across both terminals of the first switching element and sets the dead time based on the operating state of the inverter circuit. With this arrangement, the IGBT 5 and the IGBT 7 do not become simultaneously conductive, so that the inverter circuit 2 can be prevented from being damaged.

Furthermore, the dead time td1 is set based on the operating state of the inverter circuit 2 varying depending on the load, and therefore, the value is set to an appropriate value corresponding to the load, so that the stable switching operations of the IGBT 5 and the IGBT 7 can be achieved.

Embodiment 20

Figure 58:
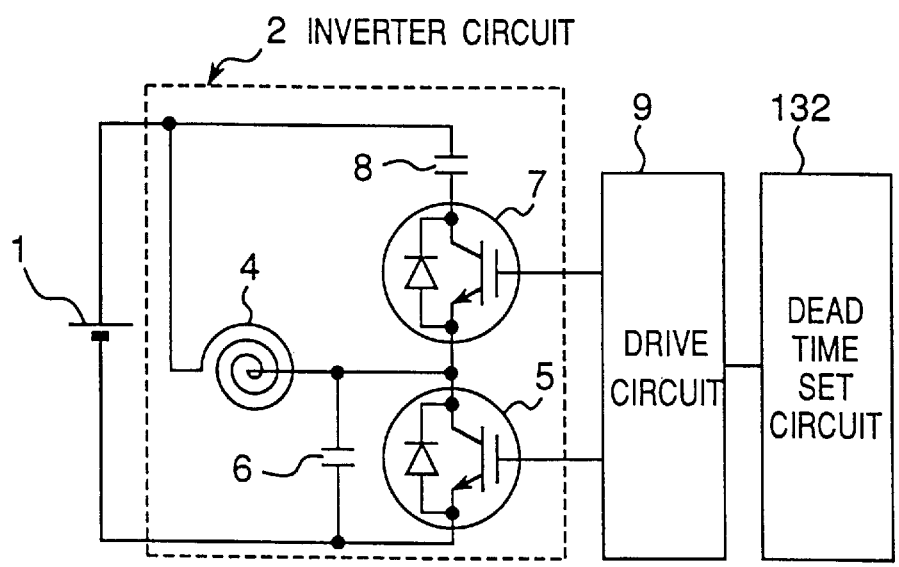
FIG. 58 is a circuit diagram of an induction heating cooker according to a twentieth embodiment and a twenty-first embodiment.

FIG. 58 shows a circuit diagram of an induction heating cooker according to a twentieth embodiment. In FIG. 58, the induction heating cooker includes: an inverter circuit 2 for converting a direct current from a DC power source 1 into a high-frequency current; a drive circuit 9 for controlling the inverter circuit 2; and a dead time set circuit 132 for setting a dead time. The construction of the inverter circuit 2 is identical to that of the nineteenth embodiment, and therefore, no description is provided for it here.

The output of the dead time set circuit 132 is connected to the drive circuit 9, and the drive circuit 9 is connected to the gate terminal of the IGBT 5 and the gate terminal of the IGBT 7 in the inverter circuit 2.

The operation of the induction heating cooker of the present embodiment constructed as above will be described with reference to FIG. 59.

Figure 59:
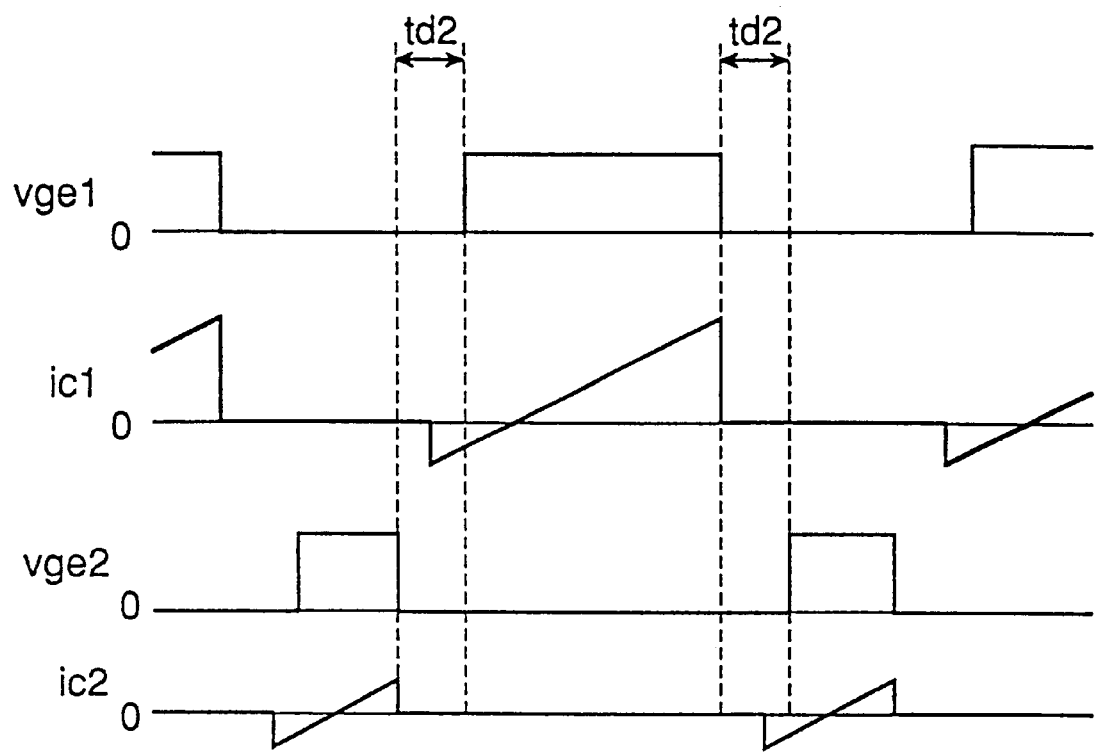
FIG. 59 is a timing chart for explaining the operation of the induction heating cooker of the twentieth embodiment.

In FIG. 59, when the gate-emitter voltage vge2 of the IGBT 7 becomes 0 V and the IGBT 7 is turned off, the dead time set circuit 132 outputs to the drive circuit 9 a turning-off signal for turning off both the IGBT 5 and the IGBT 7 during a specified time td2 from when the gate-emitter voltage vge2 of the IGBT 7 becomes 0 V. The drive circuit 9 turns off both the IGBT 5 and the IGBT 7 during the time td2 upon receiving this turning-off signal. After a lapse of the time td2, the dead time set circuit 132 stops outputting the turning-off signal, by which the drive circuit 9 changes the gate-emitter voltage vge1 of the IGBT 5 from 0 V to the high level, thereby turning on the IGBT 5. Then, after a lapse of a specified conducting time, it changes the gate-emitter voltage vge1 of the IGBT 5 from the high level to 0 V to turn off the IGBT 5. When the IGBT 5 is turned off and the gate-emitter voltage vge1 of the IGBT 5 becomes 0 V, the dead time set circuit 132 outputs to the drive circuit 9 the turning-off signal for turning off both the IGBT 5 and the IGBT 7 during the specified time td2 from when the gate-emitter voltage vge1 of the IGBT 5 becomes 0 V. The drive circuit 9 turns off both the IGBT 5 and the IGBT 7 during the time td2 upon receiving this turning-off signal. After a lapse of the time td2, the dead time set circuit stops outputting the turning-off signal, by which the drive circuit 9 changes the gate-emitter voltage vge2 of the IGBT 7 from 0 V to the high level, thereby turning on the IGBT 7. Subsequently, after a lapse of a predetermined conducting time, it changes the gate-emitter voltage vge2 of the IGBT 7 from the high level to 0 V, thereby turning off the IGBT 7. Subsequently, the operation will be repeated.

As described above, the dead time set circuit 132 can set the dead time from the time when the IGBT 7 is turned off to the time when the IGBT 5 is turned on to the time td2 and also set the dead time from the time when the IGBT 5 is turned off to the time when the IGBT 7 is turned on to td2 without using the operating state detecting means of the inverter circuit 2. Therefore, the IGBT 5 and the IGBT 7 do not be simultaneously conductive, so that the inverter circuit 2 can be prevented from being damaged in inexpensive circuits.

Embodiment 21

An induction heating cooker according to a twenty-first embodiment will be described below. The induction heating cooker of the present embodiment has the same construction as that of the twentieth embodiment shown in FIG. 58 and differs from the twentieth embodiment in the operation of the dead time set circuit.

The operation of the induction heating cooker will be described below with reference to FIG. 60 and FIG. 61.

Figure 60:
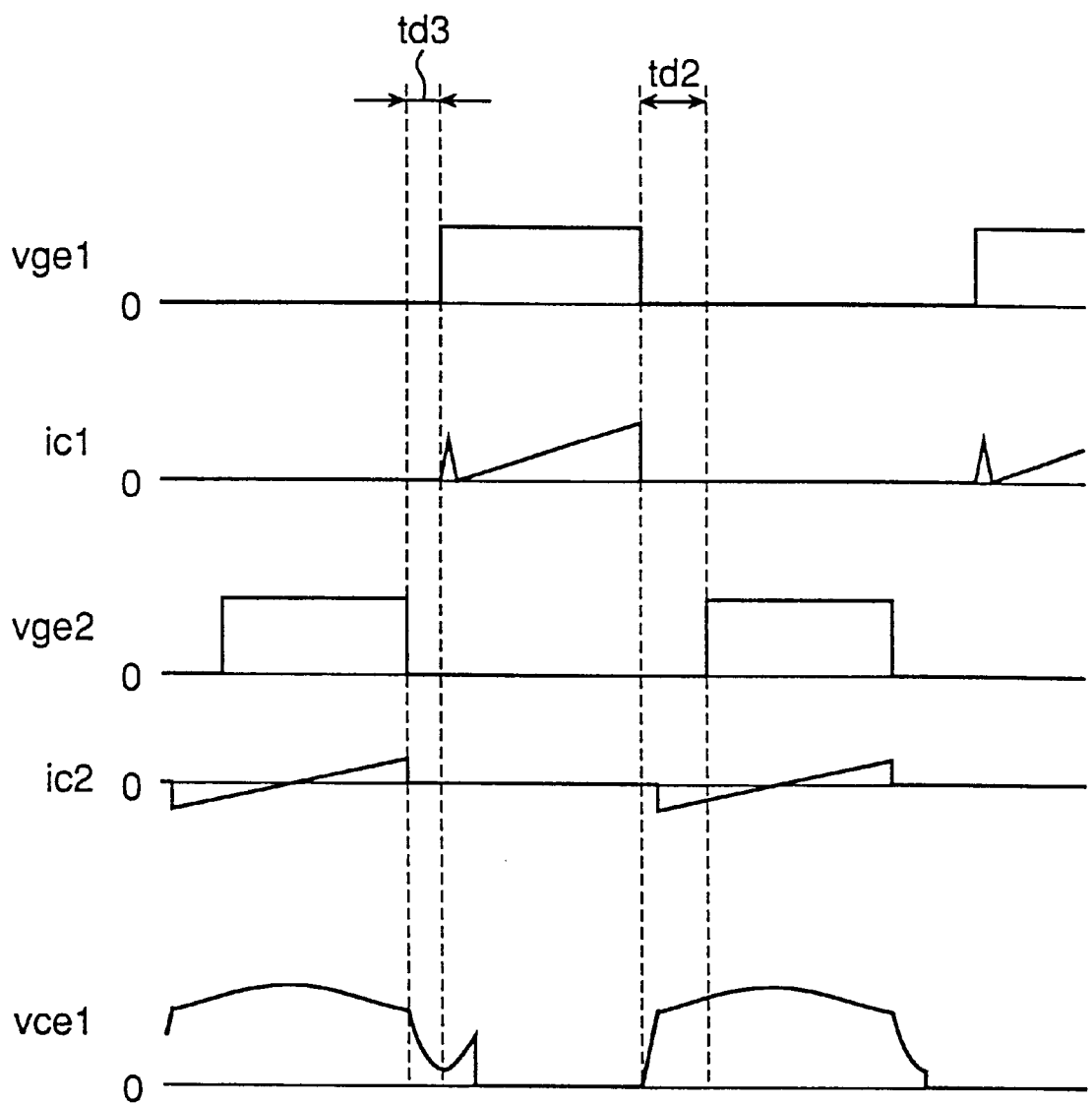
FIG. 60 is a timing chart for explaining the operation of the induction heating cooker of the twenty-first embodiment when the input power is small.

FIG. 60 shows the operating waveforms at several parts of the IGBT 5 and the IGBT 7 in the case where the input power $p_{in}$ is small. As shown in FIG. 60, when the gate-emitter voltage vge2 of the IGBT 7 becomes 0 V and the IGBT 7 is turned off, the dead time set circuit 132 outputs to the drive circuit 9 a turning-off signal for turning off both the IGBT 5 and the IGBT 7 during a predetermined time td3 from when the gate-emitter voltage vge2 of the IGBT 7 becomes 0 V. The drive circuit 9 turns off both the IGBT 5 and the IGBT 7 upon receiving this signal. After a lapse of the time td3, the dead time set circuit 132 stops outputting the signal for turning off both the switching elements 5 and 7. The drive circuit 9 changes the gate-emitter voltage vge1 of the IGBT 5 from 0 V to the high level, thereby turning on the IGBT 5. Then, after a lapse of a specified conducting time, it changes the gate-emitter voltage vge1 of the IGBT 5 from the high level to 0 V, thereby turning off the IGBT 5.

In this case, the time td3 is set as follows. That is, as shown in FIG. 60, after the gate-emitter voltage vge2 of the IGBT 7 becomes 0 V and the IGBT 7 is turned off, the collector-emitter voltage vce1 of the IGBT 5 gradually decreases to be small. When the input power $p_{in}$ is small, as shown in the figure, the collector-emitter voltage vce1 of the IGBT 5 does not decrease to 0 V but conversely increases so as to have a minimum value on the way to decreasing. The time td3 is set to a time from a time when the gate-emitter voltage vge2 of the IGBT 7 becomes 0 V to the time when the value of the collector-emitter voltage vce1 of the IGBT 5 comes to have the minimum value.

Subsequently, when the gate-emitter voltage vge1 of the IGBT 5 becomes 0 V and the IGBT 5 is turned off, a dead time set circuit 132 outputs to the drive circuit 9 a turning-off signal for turning off both the IGBT 5 and the IGBT 7 from a time when the gate-emitter voltage vge1 of the IGBT 5 becomes 0 V for the time td2. The drive circuit 9 turns off both the IGBT 5 and the IGBT 7 upon receiving this signal. After a lapse of the time td2, the drive circuit 9 changes the gate-emitter voltage vge2 of the IGBT 7 from 0 V to the high level, thereby turning on the IGBT 7. Subsequently, after a lapse of a predetermined conducting time, it changes the gate-emitter voltage vge2 of the IGBT 7 from the high level to 0 V, thereby turning off the IGBT 7. Subsequently, the operation will be repeated. In this case, the dead time td2 is set to about a half of a period from the time when the gate-emitter voltage vge1 of the IGBT 5 becomes 0 V to the time when the collector-emitter current ic2 of the IGBT 7 becomes a negative current (current of a built-in free-wheel diode in the IGBT 7).

As described above, the dead time set circuit 132 sets the dead time from the time when the IGBT 7 is turned off to the time when the IGBT 5 is turned on to the time td3, sets the dead time from the time when the IGBT 5 is turned off to the time when the IGBT 7 is turned on to the time td2 without using the operating state detecting means of the inverter circuit 2, thereby making the times td2 and td3 have respective optimum values. With this arrangement, the possible occurrence of the damage of the inverter circuit 2 due to the simultaneous conduction of the IGBT 5 and the IGBT 7 can be prevented by means of inexpensive circuits, and optimum switching operations of the IGBT 5 and the IGBT 7 can be achieved.

Figure 61:
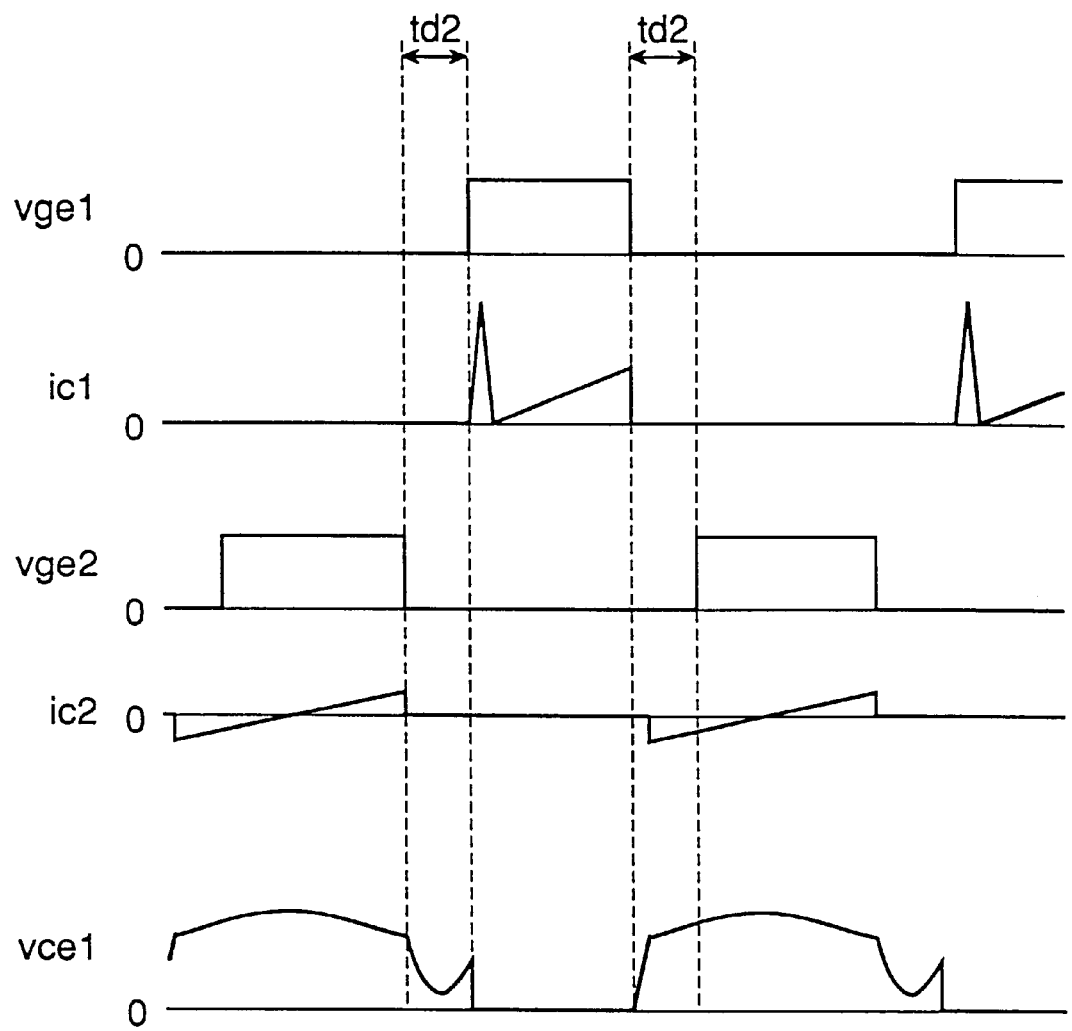
FIG. 61 is a timing chart for explaining the operation of the induction heating cooker of the twentieth embodiment when the input power is small.

FIG. 61 shows the operating waveforms at several parts of the IGBT 5 and the IGBT 7 in the case where the input power $p_{in}$ of the induction heating cooker of the twentieth embodiment is small. When the input power $p_{in}$ is small, the voltage vce1 does not become zero volt but remains immediately before the IGBT 5 is turned on, and therefore, the apparatus enters into an operation mode in which this remaining voltage is short-circuited. In the present embodiment, a short-circuit voltage in this stage is allowed to have the minimum value, and therefore, the generation of the power loss and noises at the IGBT 5 can be reduced as compared with the case shown in FIG. 61.

In regard to the construction of the inverter circuit 2 of the aforementioned fifteenth embodiment through the twenty-first embodiment, the first resonance capacitor 6 may be connected in parallel with the heating coil 4 as shown in FIG. 44, allowing a similar implementation to be achieved. As shown in FIG. 45, the resonance capacitor may be connected in parallel with both the heating coil 4 and the IGBT 5. In regard to the connection of the DC power source 1, heating coil 4 and the IGBT 5, it is acceptable to connect the IGBT 5 to the positive side of the DC power source 1 and connect the heating coil 4 to the negative side of the DC power source 1 as shown in FIG. 46. In regard to the connection of the series circuit of the IGBT 7 and the second resonance capacitor 8, it may be connected in parallel with the IGBT 5 as shown in FIG. 47. The first switching element may be constructed of a reverse current blocking type element as shown in FIG. 48. Furthermore, the inverter circuit may have a construction as shown in the second embodiment.

Embodiment 22

Figure 62:
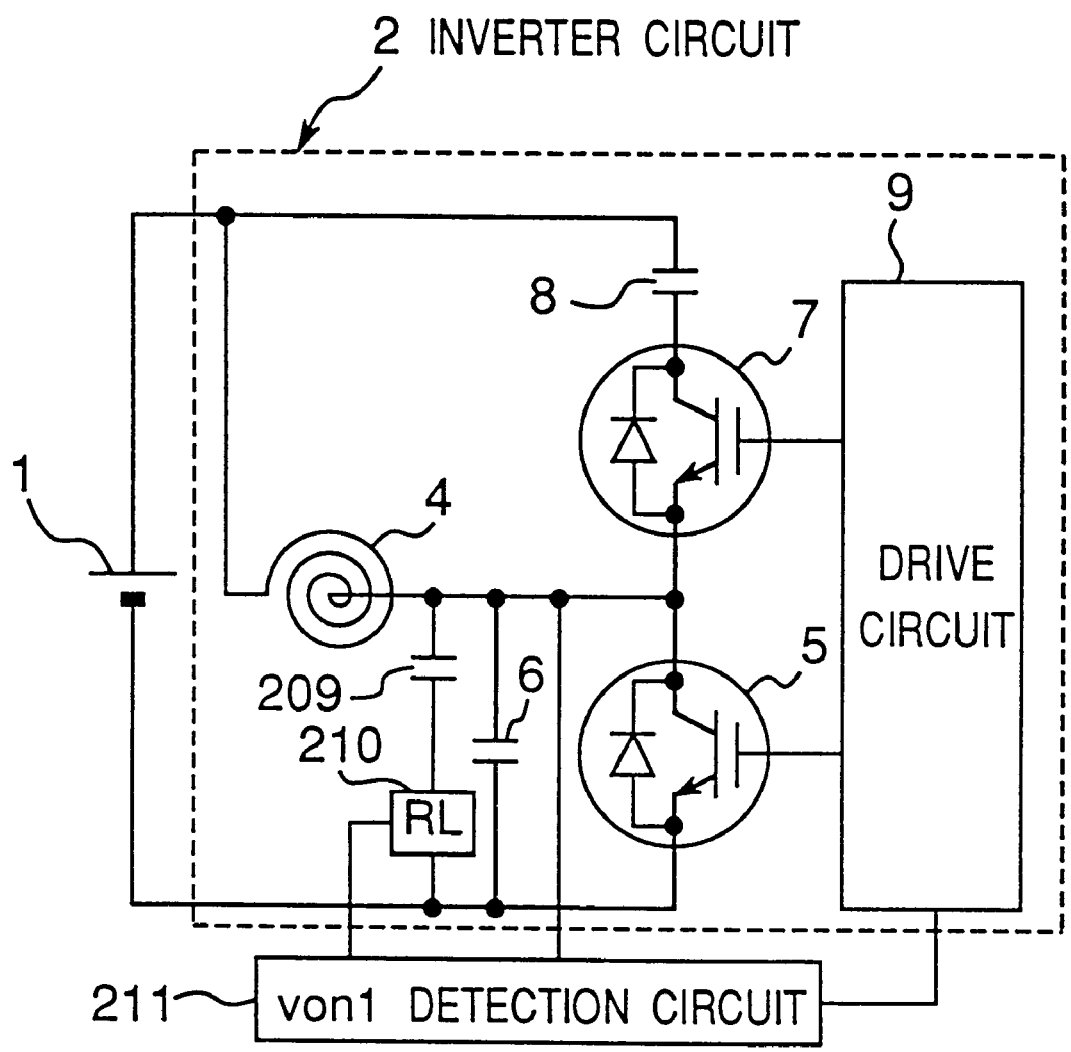
FIG. 62 is a circuit diagram of an induction heating cooker according to a twenty-second embodiment.

FIG. 62 shows a circuit diagram of an induction heating cooker according to a twenty-second embodiment. In FIG. 62, the induction heating cooker includes: an inverter circuit 2 for converting a direct current from a DC power source 1 into a high-frequency current; a drive circuit 9 for controlling the inverter circuit 2; and a von1 detection circuit 211 for detecting a voltage immediately before the conduction of the first switching element in the inverter circuit 2.

The inverter circuit 2 is comprised of a heating coil 4 whose one terminal is connected to the positive side of the DC power source 1; an IGBT 5 which has a built-in reverse conducting diode and serves as a first switching element connected across the other terminal of the heating coil 4 and the negative pole of the DC power source 1; a first resonance capacitor 6 which is connected in parallel with the IGBT 5 so as to form a resonance circuit with the heating coil 4; a series circuit of an IGBT 7 which has a built-in reverse conducting diode and serves as a second switching element connected in parallel with the heating coil 4 and a second resonance capacitor 8; and a series circuit of a third resonance capacitor 209 and a relay (RL) 210 connected in parallel with the first resonance capacitor 6. The third resonance capacitor 209 and the relay 210 constitute a first resonance capacitor changeover means for changing the capacitance of the first resonance capacitor 6.

The collector of the IGBT 5 is connected to the input of the von1 detection circuit 211 which serves as the operating state detecting means of the inverter circuit, and the output of the von1 detection circuit 211 is connected to the relay 210 and the drive circuit 9.

The operation of the induction heating cooker constructed as above will be described.

Figure 63:
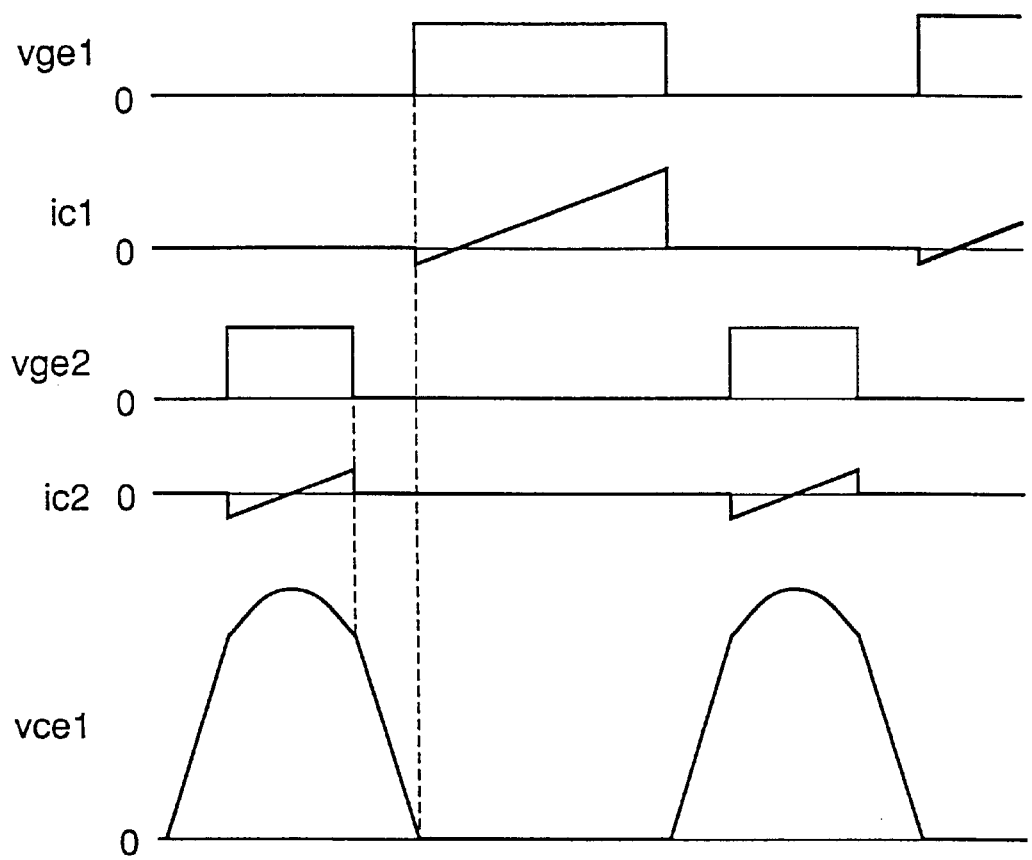
FIG. 63 is a timing chart for explaining the operation of the induction heating cooker of the twenty-second embodiment operating with a rated power consumption.

When the induction heating cooker starts its operation, the drive circuit 9 operates the inverter circuit 2 by making the IGBT 5 and the IGBT 7 alternately conductive with a conduction ratio corresponding to a rated power consumption at a constant frequency, and the von1 detection circuit 211 detects a collector-emitter voltage von1 (referred to as a "remaining voltage" hereinafter) of the IGBT 5 immediately before the IGBT 5 is turned on. The waveforms at several parts of the inverter circuit 2 become as shown in FIG. 63. In this case, the remaining voltage von1 becomes zero volt, and the von1 detection circuit 211 does not detect von1. The von1 detection circuit 211 keeps the relay 210 on when it does not detect the remaining voltage von1.

Figure 64:
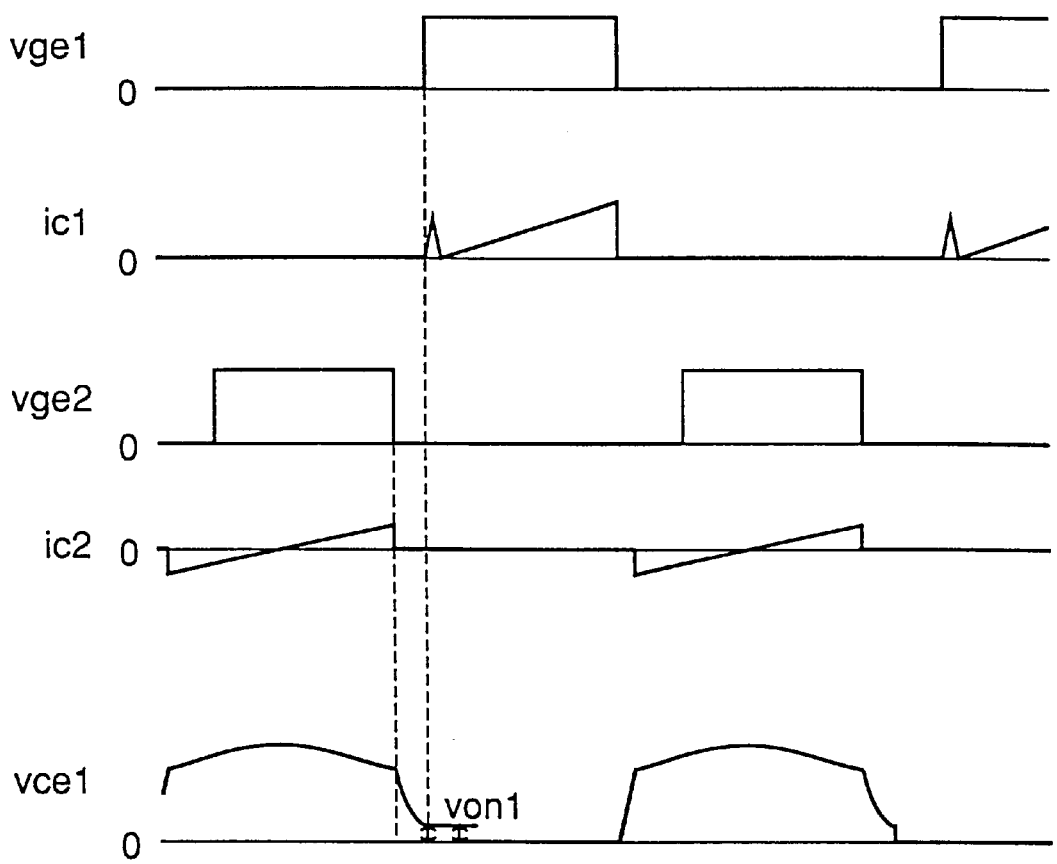
Figure 65:
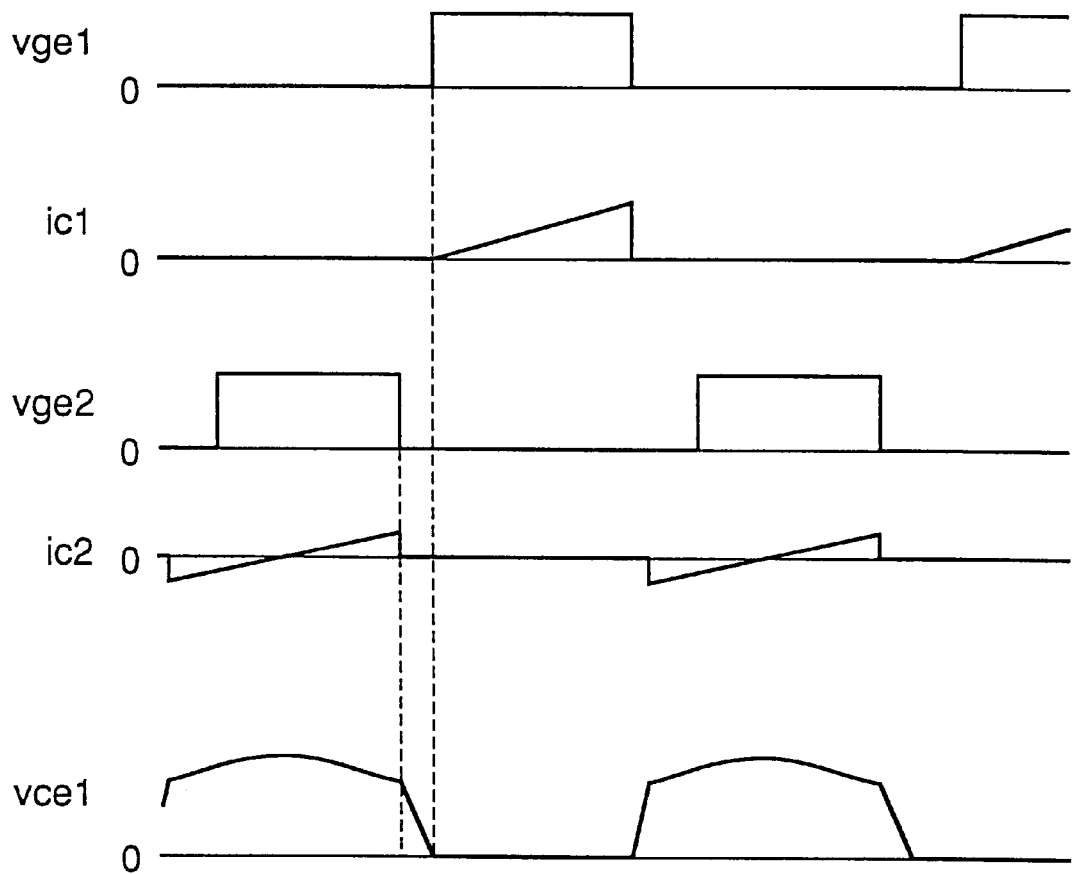
FIG. 65 is a timing chart for explaining the operation of the induction heating cooker of the twenty-second embodiment when the relay is turned off.

When the input power is decreased in this state, the operating waveforms of the inverter circuit 2 become as shown in FIG. 64. That is, the remaining voltage von1 is not lowered to zero volt in the collector-emitter voltage immediately before the IGBT 5 is turned on. For this reason, the von1 detection circuit 211 detects the remaining voltage von1. This remaining voltage von1 is also generated when the load is a specified type such as a magnetic pan whose surface is coated with copper (referred to as a copper-clad pan hereinafter). When the von1 detection circuit 211 detects the remaining voltage von1, the von1 detection circuit 211 firstly outputs to the drive circuit 9 a control signal for stopping the inverter circuit. Upon receiving this control signal, the drive circuit 9 stops the operation of the inverter circuit 2. When the inverter circuit 2 is stopped, the von1 detection circuit 211 outputs a control signal for turning off the relay 210, thereby turning off the relay 210. By this operation, the third resonance capacitor 209 is disconnected from the inverter circuit 2. As a result, the resonance capacitor which forms a resonance circuit with the heating coil 4 (the capacitor referred to as a "functional first resonance capacitor" hereinafter) changes from the parallel connection of the first resonance capacitor 6 and a third resonance capacitor 209 to only the first resonance capacitor 6. In this case, a capacitance of the functional first resonance capacitor decreases. Therefore, the waveforms at the parts of the inverter circuit 2 become as shown in FIG. 65, where the generation of the remaining voltage von1 disappears even when the input power is small.

As described above, when the von1 detection circuit 211 detects the remaining voltage von1 generated in the case where the input power is decreased or in the case where the load is the specified type, the functional first resonance capacitor is changed from the parallel connection of the first resonance capacitor 6 and the third resonance capacitor 209 to only the first resonance capacitor 6, thereby decreasing the capacitance. By this operation, the inverter circuit 2 can be operated in a state in which the remaining voltage von1 is not generated, so that the power loss and noises at the IGBT 5 can be reduced.

Embodiment 23

Figure 66:
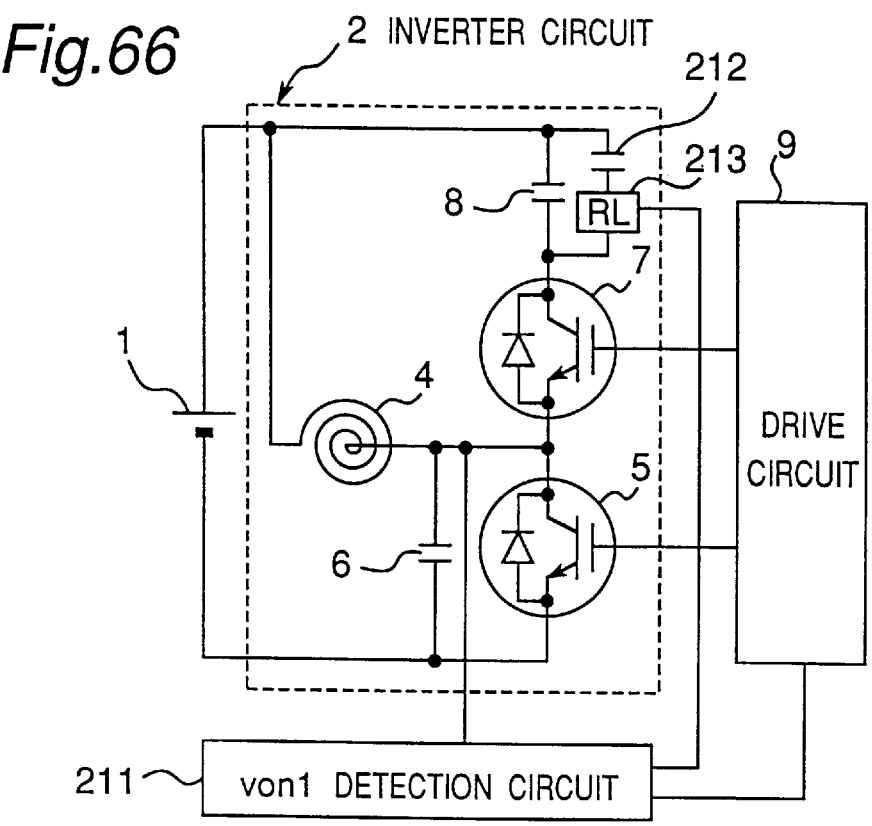
FIG. 66 is a circuit diagram of an induction heating cooker according to a twenty-third embodiment.

FIG. 66 shows a circuit diagram of an induction heating cooker according to a twenty-third embodiment. In FIG. 66, the induction heating cooker includes: an inverter circuit 2 for converting a direct current from a DC power source 1 into a high-frequency current; a drive circuit 9 for driving the inverter circuit 2; and a von1 detection circuit 211 for detecting the conducting time of the switching element in the inverter circuit 2.

The inverter circuit 2 is comprised of: a heating coil 4 whose one terminal is connected to the positive side of the DC power source 1; an IGBT 5 which has a built-in reverse conducting diode and serves as a first switching element connected across the other terminal of the heating coil 4 and the negative side of the DC power source 1; a first resonance capacitor 6 which is connected in parallel with the IGBT 5 so as to form a resonance circuit with the heating coil 4; a series circuit of an IGBT 7 which has a built-in reverse conducting diode and serves as a second switching element connected in parallel with the heating coil 4 and a second resonance capacitor 8; and a series circuit of a fourth resonance capacitor 212 and a relay 213 connected in parallel with the second resonance capacitor 8.

The fourth resonance capacitor 212 and the relay 213 constitute a second resonance capacitor changeover means for changing the capacitance of the second resonance capacitor 8.

The operation of the induction heating cooker constructed as above will be described. The basic operation is the same as that of the aforementioned twenty-second embodiment.

In the operation of the inverter circuit 2, the remaining voltage von1 decreases when capacitance of the resonance capacitor which forms a series circuit with the second switching element 7 (the capacitor referred to as a "functional second resonance capacitor" hereinafter) increases. Therefore, in the case of the present embodiment, the von1 detection circuit detects the generation of the remaining voltage von1, outputs a control signal to the relay 213 so as to turn on the relay 213 when the generation of the remaining voltage is detected, or outputs the control signal to the relay 213 so as to turn off the relay 213 when the generation of the remaining voltage is not detected. By this operation, the fourth resonance capacitor 212 is connected to the inverter circuit 2 when the remaining voltage is generated, therefore the capacitance of the functional second resonance capacitor increases. When no remaining voltage is generated, the fourth resonance capacitor 212 is disconnected from the inverter circuit 2, therefore the capacitance of the functional second resonance capacitor decreases.

As described above, when the von1 detection circuit 211 detects the remaining voltage generated in the case where the input power is decreased or in the case where the load is a specified type such as a copper-clad pan, the functional second resonance capacitor is changed from only the second resonance capacitor 8 to the parallel connection of the second resonance capacitor 8 and the fourth resonance capacitor 212, thereby increasing the capacitance of it. By this operation, the inverter circuit 2 can be operated in a state in which the remaining voltage von1 is not generated, so that the power loss and noises at the IGBT 5 can be reduced.

Embodiment 24

Figure 67:
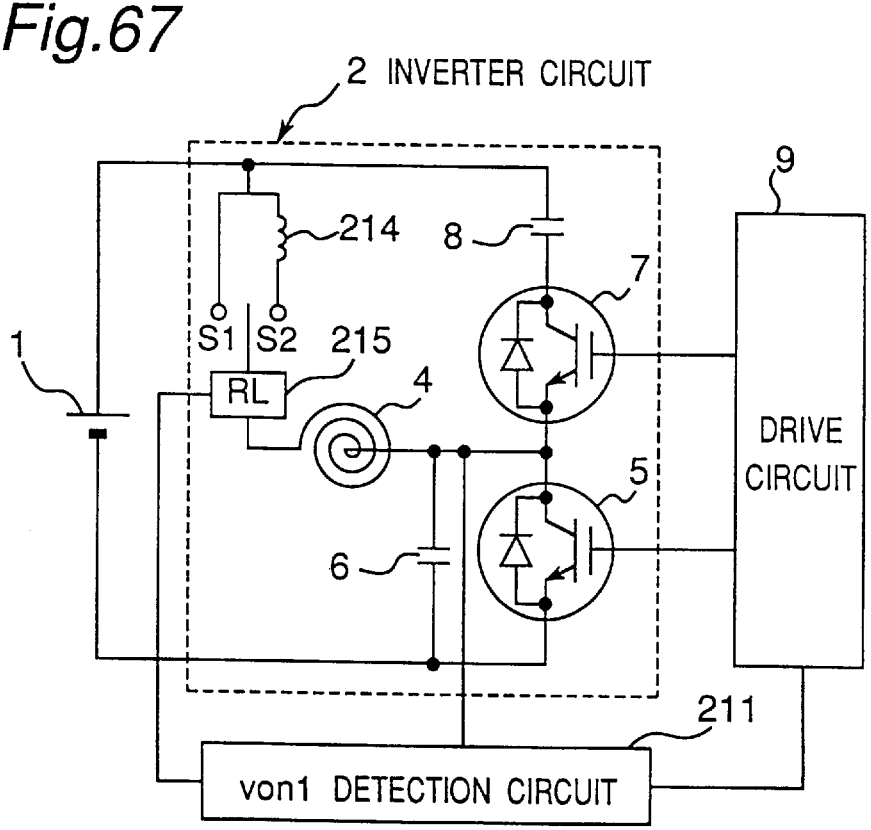
FIG. 67 is a circuit diagram of an induction heating cooker according to a twenty-fourth embodiment.

FIG. 67 shows a circuit diagram of an induction heating cooker according to a twenty-fourth embodiment. In FIG. 67, the induction heating cooker includes: an inverter circuit 2 for converting a direct current from a DC power source 1 into a high-frequency current; a drive circuit 9 for driving the inverter circuit 2; and a von1 detection circuit 211 for detecting a voltage immediately before the conduction of the first switching element in the inverter circuit 2.

The inverter circuit 2 is comprised of: a heating coil 4 whose one terminal is connected to the positive side of the DC power source 1 via a coil 214 and a relay 215; an IGBT 5 which has a built-in reverse conducting diode and serves as a first switching element connected across the other terminal of the heating coil 4 and the negative side of the DC power source 1; a first resonance capacitor 6 which is connected in parallel with the IGBT 5 so as to form a resonance circuit with the heating coil 4; and a series circuit of an IGBT 7 which has a built-in reverse conducting diode and serves as a second switching element connected in parallel with the heating coil 4 and a second resonance capacitor 8. The coil 214 and the relay 215 constitute a heating coil changeover means.

The operation of the induction heating cooker constructed as above will be described. The basic operation is the same as that of the aforementioned twenty-second embodiment.

During the operation of the inverter circuit 2, when the inductance of the resonance coil increases, the remaining voltage von1 decreases. Therefore, in the case of the present embodiment, the von1 detection circuit detects the generation of the remaining voltage von1, and then outputs a control signal to the relay 213 so that the relay 215 closes a switch S1 when the generation of the remaining voltage von1 is not detected, or outputs the control signal to the relay 213 so that the relay 215 closes a switch S2 when the generation of the remaining voltage von1 is detected. By this operation, the coil 214 is connected to the inverter circuit 2 when the remaining voltage von1 is generated, therefore the inductance value of the resonance coil increases.

As described above, when the von1 detection circuit 211 detects the remaining voltage von1 generated in the case where the input power is decreased or in the case where the load is a specified type such as a copper-clad pot, the resonance coil is changed from only the heating coil 4 to the series connection of the heating coil 4 and the coil 214, thereby increasing the inductance of it. By this operation, the inverter circuit 2 can be operated in a state in which the remaining voltage von1 is not generated, so that the power loss and noises at the IGBT 5 can be reduced.

Embodiment 25

Figure 68:
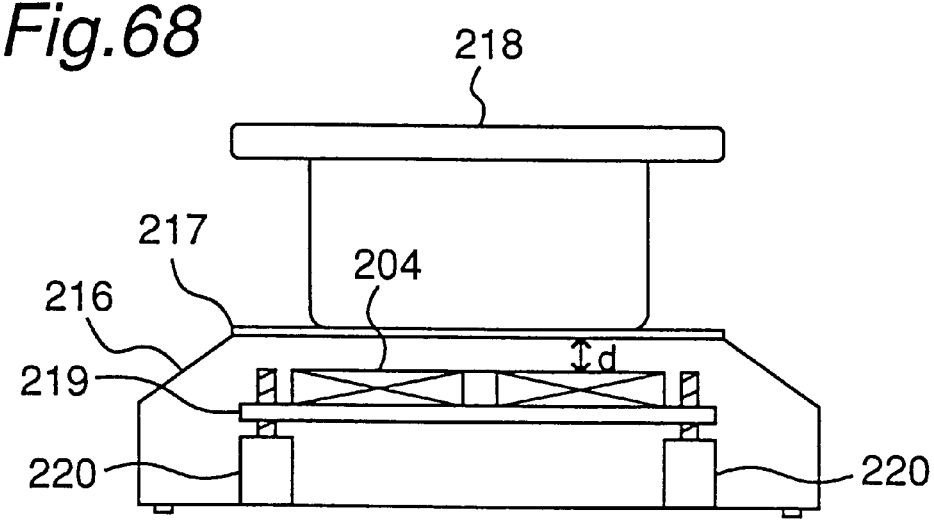
FIG. 68 is a circuit diagram of an induction heating cooker according to a twenty-fifth embodiment.

FIG. 68 shows a circuit diagram of an induction heating cooker according to a twenty-fifth embodiment. In FIG. 68, the reference numeral 216 denotes the main body of the induction heating cooker, the reference numeral 217 denotes a top plate of the induction heating cooker 216, and a pot 218 as a load is placed on the top plate 217.

Inside the induction heating cooker 216, a heating coil 204 is fixed on a heating coil base 219, and the heating coil base 219 is mounted on a gap adjusting unit 220 which serves as a gap changing means. The gap adjusting unit 220 is driven by a motor.

The operation of the induction heating cooker constructed as above will be described. The basic operation is the same as that of the aforementioned twenty-second embodiment.

During the operation of the inverter circuit (not shown), when a gap d, i.e., the gap between the heating coil 204 and the pot 218 increases, the remaining voltage von1 decreases. In the case of the present embodiment, the gap adjusting unit 220 increases the gap d that is the gap between the heating coil 204 and the pot 218 when the remaining voltage von1 is generated.

As described above, the von1 detection circuit (not shown) provided inside the induction heating cooker 216 detects the remaining voltage von1 generated in the case where the input power is decreased or in the case where the load is a specified type such as a copper-clad pot, and the gap adjusting unit 220 increases the gap d. Therefore, the inverter circuit can be operated in a state in which no remaining voltage von1 is generated, so that the loss and noises at the switching element (not shown) can be reduced.

Embodiment 26

Figure 69:
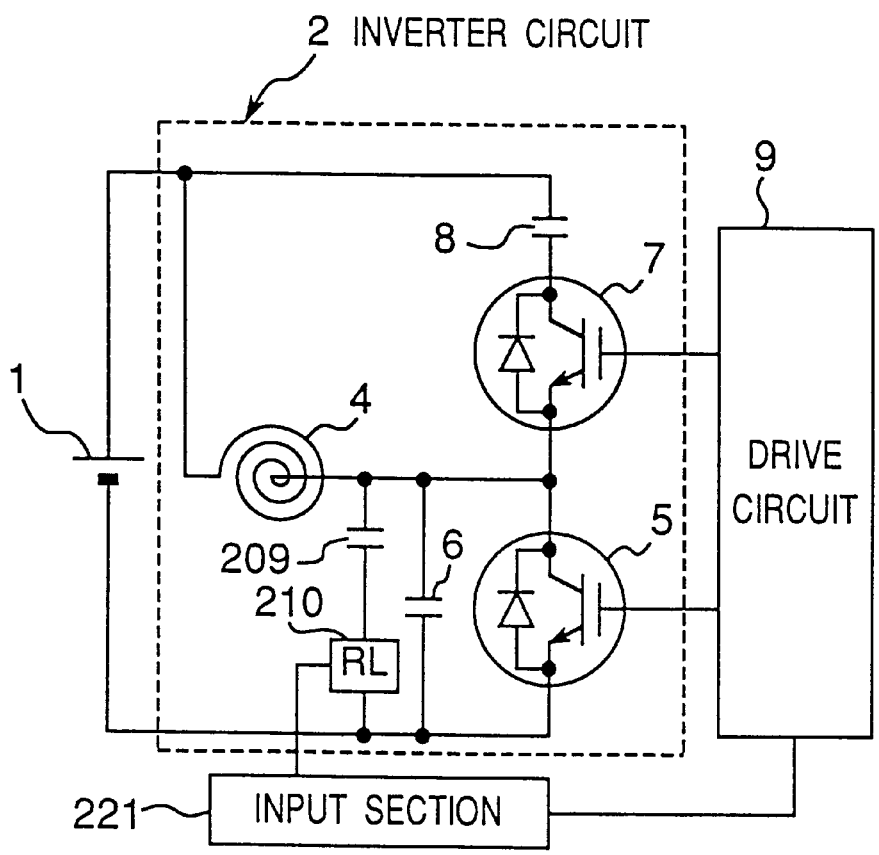
FIG. 69 is a circuit diagram of an induction heating cooker according to a twenty-sixth embodiment.

FIG. 69 shows a circuit diagram of an induction heating cooker according to a twenty-sixth embodiment. In FIG. 69, the induction heating cooker includes: an inverter circuit 2 for converting a direct current from a DC power source 1 into a high-frequency current; a drive circuit 9 for controlling the inverter circuit 2; and an input section 221 for inputting a set value of the input power. The inverter circuit 2 is the same as that of the aforementioned twenty-second embodiment. The input section 221 is connected to the relay 210 and the drive circuit 9.

The operation of the induction heating cooker constructed as above will be described.

When the input power set by the input section 221 is greater than a predetermined value, the input section 221 turns on the relay 210. By this operation, a capacitor 209 is connected to the inverter circuit, so that the capacitance value of the functional first resonance capacitor increases. At the same time, the input section 221 outputs a voltage corresponding to the input set value to the drive circuit 9. The drive circuit 9 operates the inverter circuit 2 by making the IGBT 5 and the IGBT 7 alternately conductive with a conduction ratio corresponding to the input power set at a constant frequency based on the output voltage of the input section 221.

When the input power set by the input section 221 is smaller than the predetermined value, the input section 221 turns off the relay 210. By this operation, the capacitor 209 is disconnected from the inverter circuit, and the capacitance value of the functional first resonance capacitor decreases as compared with the case where the input power is greater than the predetermined value. At the same time, the input section 221 outputs a voltage corresponding to the input set value to the drive circuit 9. The drive circuit 9 operates the inverter circuit 2 by making the IGBT 5 and the IGBT 7 alternately conductive with a conduction ratio corresponding to the input power set at a predetermined frequency based on the output voltage of the input section 221.

As described in the twenty-second embodiment, the remaining voltage von1 increases when the input power is small. By decreasing the capacitance of the functional first resonance capacitor forming the resonance circuit with the heating coil 4, the magnitude of the remaining voltage von1 generated at the time can be decreased. For this reason, in the present embodiment, when the input power set by the input section 221 is small, the generation of the remaining voltage von1 can be prevented or the remaining voltage von1 can be suppressed in magnitude even if it is generated, by decreasing the capacitance of the functional first resonance capacitor. Therefore, the loss and noises at the IGBT 5 can be reduced.

Embodiment 27

Figure 70:
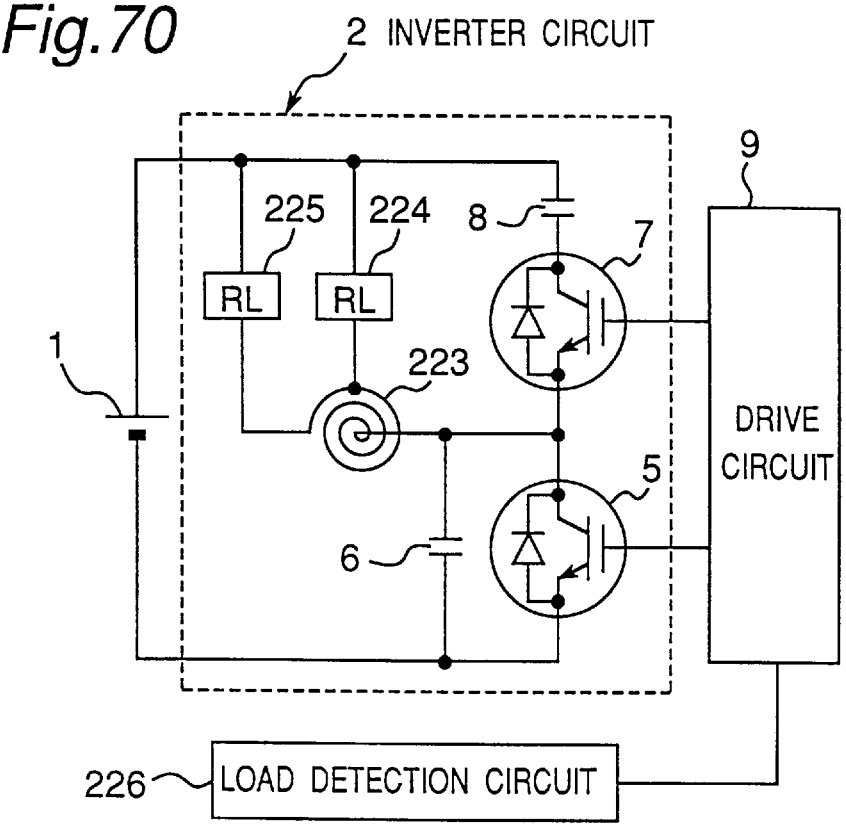
FIG. 70 is a circuit diagram of an induction heating cooker according to a twenty-seventh embodiment.
Figure 71:
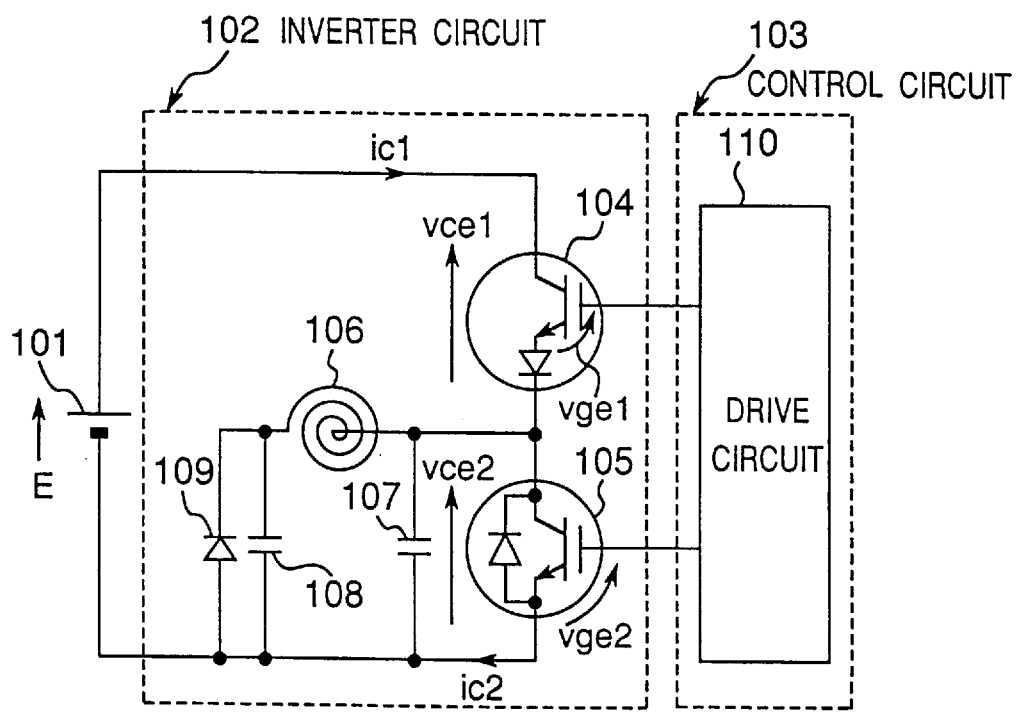
FIG. 71 is a circuit diagram of a prior art induction heating cooker.
Figure 72:
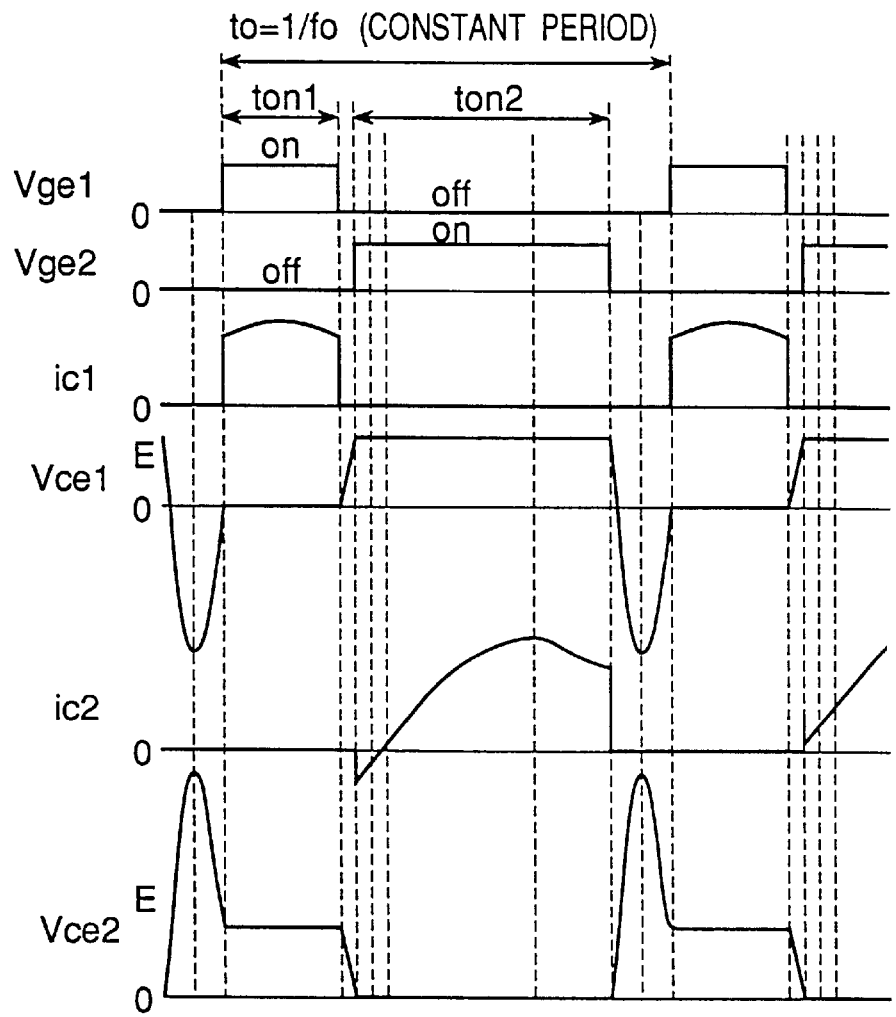
FIG. 72 is a timing chart for explaining the operation of the prior art induction heating cooker.
Figure 73:
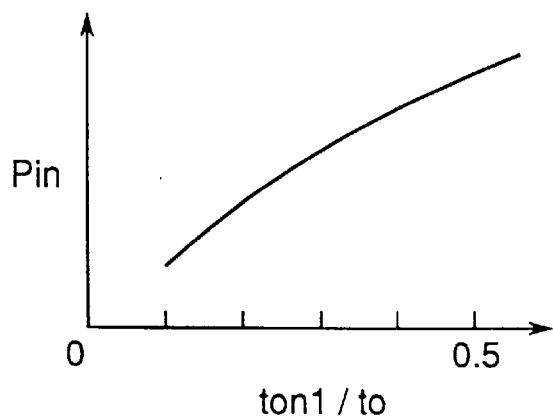
FIG. 73 is a graph of a characteristic of the conduction ratio relative to the input power of the prior art induction heating cooker.

FIG. 70 shows a circuit diagram of an induction heating cooker according to a twenty-seventh embodiment. In FIG. 70, the induction heating cooker includes: an inverter circuit 2 for converting a direct current from a DC power source 1 into a high-frequency current; a drive circuit 9 for driving the inverter circuit 2; and a load detection circuit 226 for detecting a load.

The inverter circuit 2 is provided with a heating coil 223 having a total of three terminals comprised of two terminals located outside and one terminal located inside, where the two terminals located outside of the heating coil 223 are connected to the positive side of the DC power source 1 via a relay 224 and a relay 225, respectively. The one terminal located inside of the heating coil 223 is connected to the collector terminal of the IGBT 5 which has a built-in reverse conducting diode and serves as a first switching element, while the emitter terminal of the IGBT 5 is connected to the negative side of the DC power source 1. The first resonance capacitor 6 is connected in parallel with the IGBT 5 so as to form a resonance circuit with the heating coil 223, while a series circuit of an IGBT 7 which has a built-in reverse conducting diode and serves as a second switching element and a second resonance capacitor 8 is connected in parallel with the heating coil 223.

The load detection circuit 226 has a magnet switch and is connected to the input of the drive circuit 9. The output of the drive circuit 9 is connected to the gate terminal of the IGBT 5 and the gate terminal of the IGBT 7, respectively.

The operation of the induction heating cooker constructed as above will be described.

The load detection circuit 226 constructed of the magnet switch decides whether the load is magnetic or nonmagnetic. The inverter circuit 2 operates in a state in which the relay 224 is turned on and the relay 225 is turned off in the case of the magnetic load, and operates in a state in which the relay 224 is turned off and the relay 225 is turned on in the case of the nonmagnetic load.

When the load is loaded, the inductance of the heating coil 223 for a nonmagnetic load becomes smaller than that for a magnetic load. In the inverter circuit 2 of the present embodiment, the relay 224 is turned on and the relay 225 is turned off in the case of the magnetic load, therefore the inductance of a part of the heating coil 223 connected to the inverter circuit 2 becomes small. The relay 224 is turned off and the relay 225 is turned on in the case of the nonmagnetic load, therefore the inductance of a part of the heating coil 223 connected to the inverter circuit 2 becomes large. That is, when the load is loaded, the inductance of the heating coil 223 is controlled to be an approximately equal either in the case where the load is magnetic or in the case where the load is nonmagnetic. Therefore, following problems can be solved: the problem that the input power cannot be sufficiently obtained when the load is the magnetic load; and the problem that the operating voltage and current of the inverter circuit 2 become excessive when the load is the nonmagnetic load and so on.

In the aforementioned embodiments, the capacitance of the functional first resonance capacitor, the capacitance of the functional second resonance capacitor, the inductance of the heating coil, the length of the gap and so on are not required to be changed in two steps as in the aforementioned embodiments, and they may be changed in three or more steps.

Although the present invention has been described in connection with specified embodiments thereof, many other modifications, corrections and applications are apparent to those skilled in this art. Therefore, the present invention is not limited by the disclosure provided herein but limited only to the scope of the appended claims.

What is claimed is:

1. A high-frequency inverter comprising:

a coil whose one terminal connected to a DC power source;

a first switching element connected in series with said coil to said DC power source;

a first resonance capacitor connected so as to form a resonance circuit with said coil;

a series circuit comprised of a second resonance capacitor and a second switching element, said series circuit connected in parallel with said coil or said first switching element; and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle.

2. A high-frequency inverter according to claim 1, wherein said first resonance capacitor has its one terminal connected to a connection point of said second switching element and said second resonance capacitor.

3. A high-frequency inverter according to claim 1, wherein the capacitance of said first resonance capacitor is smaller than the capacitance of said second resonance capacitor.

4. A high-frequency inverter according to claim 1, wherein said first or second switching element is comprised of an IGBT having a built-in reverse conducting diode.

5. A high-frequency inverter according to claim 1, wherein said first switching element is a reverse blocking type.

6. An induction heating cooker comprising:

a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and an input current detecting means for detecting an input current to be inputted to the high-frequency inverter, said control means controlling said conduction ratios of said first and second switching elements based on an output of said input current detecting means.

7. An induction heating cooker according to claim 6, further comprising an input setting means for setting a magnitude of said input current, said control means controlling said conduction ratio of said first and second switching elements based on an output of said input setting means.

8. An induction heating cooker according to claim 6, wherein said control means controls said conduction ratio so that said input current is within a specified range set according to conducting times of said first and second switching elements.

9. A high-frequency inverter according to claim 6, wherein said first resonance capacitor has its one terminal connected to a connection point of said second switching element and said second resonance capacitor.

10. A high-frequency inverter according to claim 6, wherein the capacitance of said first resonance capacitor is smaller than the capacitance of said second resonance capacitor.

11. A high-frequency inverter according to claim 6, wherein said first or second switching element is comprised of an IGBT having a built-in reverse conducting diode.

12. A high-frequency inverter according to claim 6, wherein said first switching element is a reverse blocking type.

13. An induction heating cooker comprising:

a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said first switching element being a ratio of a conducting time of said first switching element relative to a duration of one cycle; and a first switching element voltage detecting means for detecting a voltage across both terminals of said first switching element, said control means controlling the conduction ratios of said first and second switching elements based on an output of said first switching element voltage detecting means.

14. A high-frequency inverter according to claim 13, wherein said first resonance capacitor has its one terminal connected to a connection point of said second switching element and said second resonance capacitor.

15. A high-frequency inverter according to claim 13, wherein the capacitance of said first resonance capacitor is smaller than the capacitance of said second resonance capacitor.

16. A high-frequency inverter according to claim 13, wherein said first or second switching element is comprised of an IGBT having a built-in reverse conducting diode.

17. A high-frequency inverter according to claim 13, wherein said first switching element is a reverse blocking type.

18. An induction heating cooker comprising:

a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and a second switching element voltage detecting means for detecting a voltage across both terminals of said second switching element, said control means controlling the conduction ratios of said first and second switching elements based on an output of said second switching element voltage detecting means.

19. An induction heating cooker according to claim 18, further comprising a first switching element voltage detecting means for detecting a voltage across both terminals of said first switching element, said control means controlling the conduction ratios of said first and second switching elements so that the voltage across both terminals of said first switching element is within a specified range set according to the voltage across both terminals of said second switching element.

20. An induction heating cooker according to claim 18, further comprising:
   a first switching element voltage detecting means for detecting a voltage across both terminals of said first switching element; and
   a subtracting means for detecting a voltage difference between the voltage across both terminals of said first switching element and the voltage across both terminals of said second switching element,
   said control means controlling the conduction ratios of said first and second switching elements so that an output of said subtracting means becomes not greater than a predetermined value.

21. A high-frequency inverter according to claim 18, wherein said first resonance capacitor has its one terminal connected to a connection point of said second switching element and said second resonance capacitor.

22. A high-frequency inverter according to claim 18, wherein the capacitance of said first resonance capacitor is smaller than the capacitance of said second resonance capacitor.

23. A high-frequency inverter according to claim 18, wherein said first or second switching element is comprised of an IGBT having a built-in reverse conducting diode.

24. A high-frequency inverter according to claim 18, wherein said first switching element is a reverse blocking type.

25. An induction heating cooker comprising:
   a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and
   a coil current detecting means for detecting a current flowing through said coil,
   said control means controlling the conduction ratios of said first and second switching elements based on an output of said coil current detecting means.

26. A high-frequency inverter according to claim 25, wherein said first resonance capacitor has its one terminal connected to a connection point of said second switching element and said second resonance capacitor.

27. A high-frequency inverter according to claim 25, wherein the capacitance of said first resonance capacitor is smaller than the capacitance of said second resonance capacitor.

28. A high-frequency inverter according to claim 25, wherein said first or second switching element is comprised of an IGBT having a built-in reverse conducting diode.

29. A high-frequency inverter according to claim 25, wherein said first switching element is a reverse blocking type.

30. An induction heating cooker comprising:
   a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, conduction ratio of said first switching element being a ratio of a conducting time of said first switching element relative to a duration of one cycle; and
   a first switching element current detecting means for detecting a current of said first switching element,
   said control means controlling the conduction ratios of said first and second switching elements based on an output of said first switching element current detecting means.

31. A high-frequency inverter according to claim 30, wherein said first resonance capacitor has its one terminal connected to a connection point of said second switching element and said second resonance capacitor.

32. A high-frequency inverter according to claim 30, wherein the capacitance of said first resonance capacitor is smaller than the capacitance of said second resonance capacitor.

33. A high-frequency inverter according to claim 30, wherein said first or second switching element is comprised of an IGBT having a built-in reverse conducting diode.

34. A high-frequency inverter according to claim 30, wherein said first switching element is a reverse blocking type.

35. An induction heating cooker comprising:
   a high-frequency inverter including a coil whose one terminal is connected to a DC power source, a first switching element connected in series with said coil to said DC power source, a first resonance capacitor which is connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and
   a second switching element current detecting means for detecting a current of said second switching element,
   said control means controlling the conduction ratios for both said switching elements based on an output of said second switching element current detecting means.

36. An induction heating cooker according to claim 35, wherein said control means controls the conduction ratio within a range where the current flowing through said second switching element is within a predetermined range set based on the conducting times of said first and second switching elements.

37. A high-frequency inverter according to claim 35, wherein said first resonance capacitor has its one terminal connected to a connection point of said second switching element and said second resonance capacitor.

38. A high-frequency inverter according to claim 35, wherein the capacitance of said first resonance capacitor is smaller than the capacitance of said second resonance capacitor.

39. A high-frequency inverter according to claim 35, wherein said first or second switching element is comprised of an IGBT having a built-in reverse conducting diode.

40. A high-frequency inverter according to claim 35, wherein said first switching element is a reverse blocking type.

41. An induction heating cooker comprising:
a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and
an inappropriate load detecting means for detecting an inappropriate load,
said control means stopping driving said first and second switching elements when said inappropriate load detecting means detects an inappropriate load.

42. An induction heating cooker according to claim 41, further comprising an operating state detecting means for detecting an operating state of said high-frequency inverter, said inappropriate load detecting means detects an inappropriate load based on an output from said operating state detecting means.

43. An induction heating cooker according to claim 42, wherein
said operating state detecting means comprises an input current detecting means for detecting an input current flowing into said high-frequency inverter and a first switching element voltage detecting means for detecting the voltage of said first switching element, and
said inappropriate load detecting means detects the inappropriate load based on an input current value detected by said input current detecting means and a voltage value detected by said first switching element voltage detecting means.

44. An induction heating cooker according to claim 42, wherein
said operating state detecting means comprises an input current detecting means for detecting an input current flowing into said high-frequency inverter and a second switching element voltage detecting means for detecting the voltage of said second switching element,
said inappropriate load detecting means detects the inappropriate load based on an input current value detected by said input current detecting means and a voltage value detected by said second switching element voltage detecting means.

45. A high-frequency inverter according to claim 41, wherein said first resonance capacitor has its one terminal connected to a connection point of said second switching element and said second resonance capacitor.

46. A high-frequency inverter according to claim 41, wherein the capacitance of said first resonance capacitor is smaller than the capacitance of said second resonance capacitor.

47. A high-frequency inverter according to claim 41, wherein said first or second switching element is comprised of an IGBT having a built-in reverse conducting diode.

48. A high-frequency inverter according to claim 41, wherein said first switching element is a reverse blocking type.

49. An induction heating cooker comprising:
a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio for first switching element being a ratio of a conducting time of said first switching element relative to a duration of one cycle; and
a start and stop means for outputting a start signal for starting said high-frequency inverter and a stop signal for stopping said high-frequency inverter,
said control means starting said first and second switching elements after a lapse of a predetermined delay time after receiving said start signal from said start and stop means.

50. A high-frequency inverter according to claim 49, wherein said first resonance capacitor has its one terminal connected to a connection point of said second switching element and said second resonance capacitor.

51. A high-frequency inverter according to claim 49, wherein the capacitance of said first resonance capacitor is smaller than the capacitance of said second resonance capacitor.

52. A high-frequency inverter according to claim 49, wherein said first or second switching element is comprised of an IGBT having a built-in reverse conducting diode.

53. A high-frequency inverter according to claim 49, wherein said first switching element is a reverse blocking type.

54. An induction heating cooker comprising:
a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle, said DC power source comprised of a commercial power source, a rectifier for rectifying an output from said commercial power source and a smoothing capacitor connected to an output of said rectifier;

a commercial power source monitoring means for monitoring a power source state of said commercial power source, said control means stopping driving said first and second switching elements when said commercial power source monitoring means detects an abnormal state of said commercial power source.

55. A high-frequency inverter according to claim 54, wherein said first resonance capacitor has its one terminal connected to a connection point of said second switching element and said second resonance capacitor.

56. A high-frequency inverter according to claim 54, wherein the capacitance of said first resonance capacitor is smaller than the capacitance of said second resonance capacitor.

57. A high-frequency inverter according to claim 54, wherein said first or second switching element is comprised of an IGBT having a built-in reverse conducting diode.

58. A high-frequency inverter according to claim 54, wherein said first switching element is a reverse blocking type.

59. An induction heating cooker comprising:
 a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and
 a soft start means for outputting a signal for gradually increasing the input power from a predetermined minimum input power at the time of starting said high-frequency inverter,
 said control means controlling said conduction ratio between the first and second switching elements based on an output of said soft start means.

60. An induction heating cooker according to claim 59, wherein
 said soft start means comprises an input setting means for setting the input power of said high-frequency inverter, a reference voltage setting means for gradually varying its output voltage to a reference voltage set based on an output of said input setting means, a oscillating means for generating a triangular wave and a comparing means for comparing an output of said reference voltage setting means with an output of said oscillating means, and said control means controls said conduction ratios of said first and second switching elements based on an output of said comparing means.

61. A high-frequency inverter according to claim 59, wherein said first resonance capacitor has its one terminal connected to a connection point of said second switching element and said second resonance capacitor.

62. A high-frequency inverter according to claim 59, wherein the capacitance of said first resonance capacitor is smaller than the capacitance of said second resonance capacitor.

63. A high-frequency inverter according to claim 59, wherein said first or second switching element is comprised of an IGBT having a built-in reverse conducting diode.

64. A high-frequency inverter according to claim 59, wherein said first switching element is a reverse blocking type.

65. A high-frequency inverter comprising:
 a coil whose one terminal is connected to a DC power source, a first switching element connected in series with said coil to said DC power source;
 a first resonance capacitor connected so as to form a resonance circuit with said coil;
 a series circuit comprised of a second resonance capacitor and a second switching element and connected in parallel with said coil or said first switching element; and
 a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle,
 said high-frequency inverter having a dead time which is a period in which both said first and second switching elements become nonconductive at a changeover time of the conducting periods of said first and second switching elements.

66. A high-frequency inverter according to claim 65, further comprising a dead time setting means for setting said dead time based on an operating state of said high-frequency inverter.

67. A high-frequency inverter according to claim 65, wherein said dead time is set to a predetermined time.

68. A high-frequency inverter according to claim 65, wherein a dead time from a time point at which the conducting period of said first switching element ends to a time point at which the conducting period of said second switching element starts is made different from a dead time from a time point at which the conducting period of said second switching element ends to a time point at which the conducting period of said first switching element starts.

69. A high-frequency inverter according to claim 65, wherein said first resonance capacitor has its one terminal connected to a connection point of said second switching element and said second resonance capacitor.

70. A high-frequency inverter according to claim 65, wherein the capacitance of said first resonance capacitor is smaller than the capacitance of said second resonance capacitor.

71. A high-frequency inverter according to claim 65, wherein said first or second switching element is comprised of an IGBT having a built-in reverse conducting diode.

72. A high-frequency inverter according to claim 65, wherein said first switching element is a reverse blocking type.

73. An induction heating cooker comprising:
 a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and a first resonance capacitor changeover means for changing the capacitance of said first resonance capacitor according to a load to be heated by said coil.

74. An induction heating cooker according to claim 73, comprising a load detecting means for detecting the load to be inductively heated.

75. A high-frequency inverter according to claim 73, wherein said first resonance capacitor has its one terminal connected to a connection point of said second switching element and said second resonance capacitor.

76. A high-frequency inverter according to claim 73, wherein the capacitance of said first resonance capacitor is smaller than the capacitance of said second resonance capacitor.

77. A high-frequency inverter according to claim 73, wherein said first or second switching element is comprised of an IGBT having a built-in reverse conducting diode.

78. A high-frequency inverter according to claim 73, wherein said first switching element is a reverse blocking type.

79. An induction heating cooker comprising:

a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and a second resonance capacitor changeover means for changing the capacitance of said second resonance capacitor according to a load to be heated by said coil.

80. An induction heating cooker according to claim 79, comprising a load detecting means for detecting the load to be inductively heated.

81. A high-frequency inverter according to claim 79, wherein said first resonance capacitor has its one terminal connected to a connection point of said second switching element and said second resonance capacitor.

82. A high-frequency inverter according to claim 79, wherein the capacitance of said first resonance capacitor is smaller than the capacitance of said second resonance capacitor.

83. A high-frequency inverter according to claim 79, wherein said first or second switching element is comprised of an IGBT having a built-in reverse conducting diode.

84. A high-frequency inverter according to claim 79, wherein said first switching element is a reverse blocking type.

85. An induction heating cooker comprising:

a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and a coil changeover means for changing the inductance of said coil according to a load to be heated by said coil.

86. An induction heating cooker according to claim 85, comprising a load detecting means for detecting the load to be inductively heated.

87. A high-frequency inverter according to claim 85, wherein said first resonance capacitor has its one terminal connected to a connection point of said second switching element and said second resonance capacitor.

88. A high-frequency inverter according to claim 85, wherein the capacitance of said first resonance capacitor is smaller than the capacitance of said second resonance capacitor.

89. A high-frequency inverter according to claim 85, wherein said first or second switching element is comprised of an IGBT having a built-in reverse conducting diode.

90. A high-frequency inverter according to claim 85, wherein said first switching element is a reverse blocking type.

91. An induction heating cooker comprising:

a high-frequency inverter including a coil whose one terminal is connected to a DC power source, a first switching element connected in series with said coil to said DC power source, a first resonance capacitor connected so as to form a resonance circuit with said coil, a series circuit comprised of a second resonance capacitor and a second switching element and connected in parallel with said coil or said first switching element, and a control means for controlling the conduction of said first and second switching elements alternately at a constant frequency and changing a conduction ratio of said first switching element to control input power, said conduction ratio of said first switching element being a ratio of a conducting time of said first switching element relative to a duration of one cycle; and a gap changeover means for changing the length of a gap between said coil and a load to be heated by said coil according to the load.

92. An induction heating cooker according to claim 91, comprising a load detecting means for detecting the load to be inductively heated.

93. A high-frequency inverter according to claim 91, wherein said first resonance capacitor has its one terminal connected to a connection point of said second switching element and said second resonance capacitor.

94. A high-frequency inverter according to claim 91, wherein the capacitance of said first resonance capacitor is smaller than the capacitance of said second resonance capacitor.

95. A high-frequency inverter according to claim 91, wherein said first or second switching element is comprised of an IGBT having a built-in reverse conducting diode.

96. A high-frequency inverter according to claim 91, wherein said first switching element is a reverse blocking type.

* * * * *